(12) United States Patent
Mittal et al.

(10) Patent No.: US 10,855,733 B2
(45) Date of Patent: *Dec. 1, 2020

(54) METHOD AND SYSTEM FOR INSPECTING UNICAST NETWORK TRAFFIC BETWEEN END POINTS RESIDING WITHIN A SAME ZONE

(71) Applicant: Arista Networks, Inc., Santa Clara, CA (US)

(72) Inventors: Anuraag Mittal, Santa Clara, CA (US); Aparna Sushrut Karanjkar, Santa Clara, CA (US); Nitin Ravindra Karkhanis, Santa Clara, CA (US); Thejesh Ajjikariappla Panchappa, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/209,899

(22) Filed: Dec. 4, 2018

(65) Prior Publication Data

US 2020/0177654 A1 Jun. 4, 2020

(51) Int. Cl.
*G06F 15/16* (2006.01)
*H04L 29/06* (2006.01)
*H04L 29/12* (2006.01)
*H04L 12/46* (2006.01)

(52) U.S. Cl.
CPC ...... *H04L 65/4076* (2013.01); *H04L 12/4633* (2013.01); *H04L 12/4645* (2013.01); *H04L 61/6022* (2013.01)

(58) Field of Classification Search
CPC ............ H04L 12/4633; H04L 12/4645; H04L 61/6022; H04L 65/4076; H04L 12/46; H04L 2012/4629; H04L 45/00; H04L 45/74; H04L 49/20; H04L 49/70
See application file for complete search history.

(56) References Cited

U.S. PATENT DOCUMENTS

| | | | |
|---|---|---|---|
| 8,477,715 | B2 | 7/2013 | Bahini et al. |
| 8,811,409 | B2 | 8/2014 | Allan |
| 8,948,054 | B2 | 2/2015 | Kreeger et al. |
| 9,143,400 | B1 | 9/2015 | Roskind et al. |
| 9,204,345 | B1 | 12/2015 | Roskind |

(Continued)

FOREIGN PATENT DOCUMENTS

EP 2182694 A1 5/2010

OTHER PUBLICATIONS

International Search Report and Written Opinion issued in corresponding PCT/US2019/049134, dated Oct. 30, 2019. (14 pages).

*Primary Examiner* — Ryan J Jakovac
(74) *Attorney, Agent, or Firm* — Chamberlain, Hrdlicka, White, Williams & Aughtry

(57) ABSTRACT

A method and system for inspecting unicast network traffic between end points residing within a same zone. Specifically, the method and system disclosed herein entail the provisioning of unique forward-service and reverse-service virtual network identifiers (VNIs), and corresponding virtual layer-2 (VL2) forward-service and reverse-service broadcast domains, respectively, to communications originating from and destined to intercept hosts.

20 Claims, 51 Drawing Sheets

(56) References Cited

U.S. PATENT DOCUMENTS

| | | |
|---|---|---|
| 9,462,502 B2 | 10/2016 | Kim et al. |
| 9,509,603 B2 | 11/2016 | Duda et al. |
| 9,596,099 B2 | 3/2017 | Yang et al. |
| 9,621,508 B2 | 4/2017 | Duda |
| 9,654,300 B2 | 5/2017 | Pani |
| 9,654,409 B2 | 5/2017 | Yadav et al. |
| 10,187,302 B2 | 1/2019 | Chu et al. |
| 10,298,538 B2 | 5/2019 | Yang et al. |
| 2001/0023456 A1 | 9/2001 | Nakashima |
| 2006/0002324 A1 | 1/2006 | Babbar et al. |
| 2008/0019319 A1 | 1/2008 | Bahini et al. |
| 2008/0205377 A1 | 8/2008 | Chao et al. |
| 2014/0006706 A1 | 1/2014 | Wang |
| 2014/0064091 A1 | 3/2014 | Basso et al. |
| 2014/0112122 A1 | 4/2014 | Kapadia et al. |
| 2014/0198647 A1 | 7/2014 | Chowdhury et al. |
| 2015/0023352 A1 | 1/2015 | Yang et al. |
| 2015/0058470 A1 | 2/2015 | Duda |
| 2015/0098359 A1 | 4/2015 | Yen et al. |
| 2015/0103679 A1 | 4/2015 | Tessmer et al. |
| 2015/0124586 A1 | 5/2015 | Pani |
| 2015/0149657 A1 | 5/2015 | Reddy et al. |
| 2015/0381495 A1 | 12/2015 | Cherian et al. |
| 2016/0014241 A1 | 1/2016 | Tai |
| 2016/0036703 A1 | 2/2016 | Josyula |
| 2016/0080247 A1 | 3/2016 | Yang et al. |
| 2016/0156560 A1 | 6/2016 | Yasuda |
| 2016/0173529 A1 | 6/2016 | Baig et al. |
| 2016/0182382 A1 | 6/2016 | Singaravelu et al. |
| 2016/0277497 A1 | 9/2016 | Bannister et al. |
| 2016/0330046 A1 | 11/2016 | Yang et al. |
| 2016/0381015 A1 | 12/2016 | Ravinutala et al. |
| 2017/0093758 A1 | 3/2017 | Chanda |
| 2017/0099182 A1 | 4/2017 | DeBolle et al. |
| 2017/0214549 A1 | 7/2017 | Yoshino et al. |
| 2017/0289031 A1 | 10/2017 | Duda |
| 2017/0308828 A1 | 10/2017 | Viquez Calderon |
| 2017/0346736 A1 | 11/2017 | Chandler et al. |
| 2018/0123827 A1 | 5/2018 | Josyula |
| 2018/0139098 A1 | 5/2018 | Sunavala et al. |
| 2019/0028424 A1 | 1/2019 | Mittal et al. |
| 2019/0173888 A1 | 6/2019 | Li et al. |
| 2019/0215175 A1 | 7/2019 | Mathew et al. |
| 2019/0238365 A1* | 8/2019 | Sudhakaran ........ H04L 12/4641 |

* cited by examiner

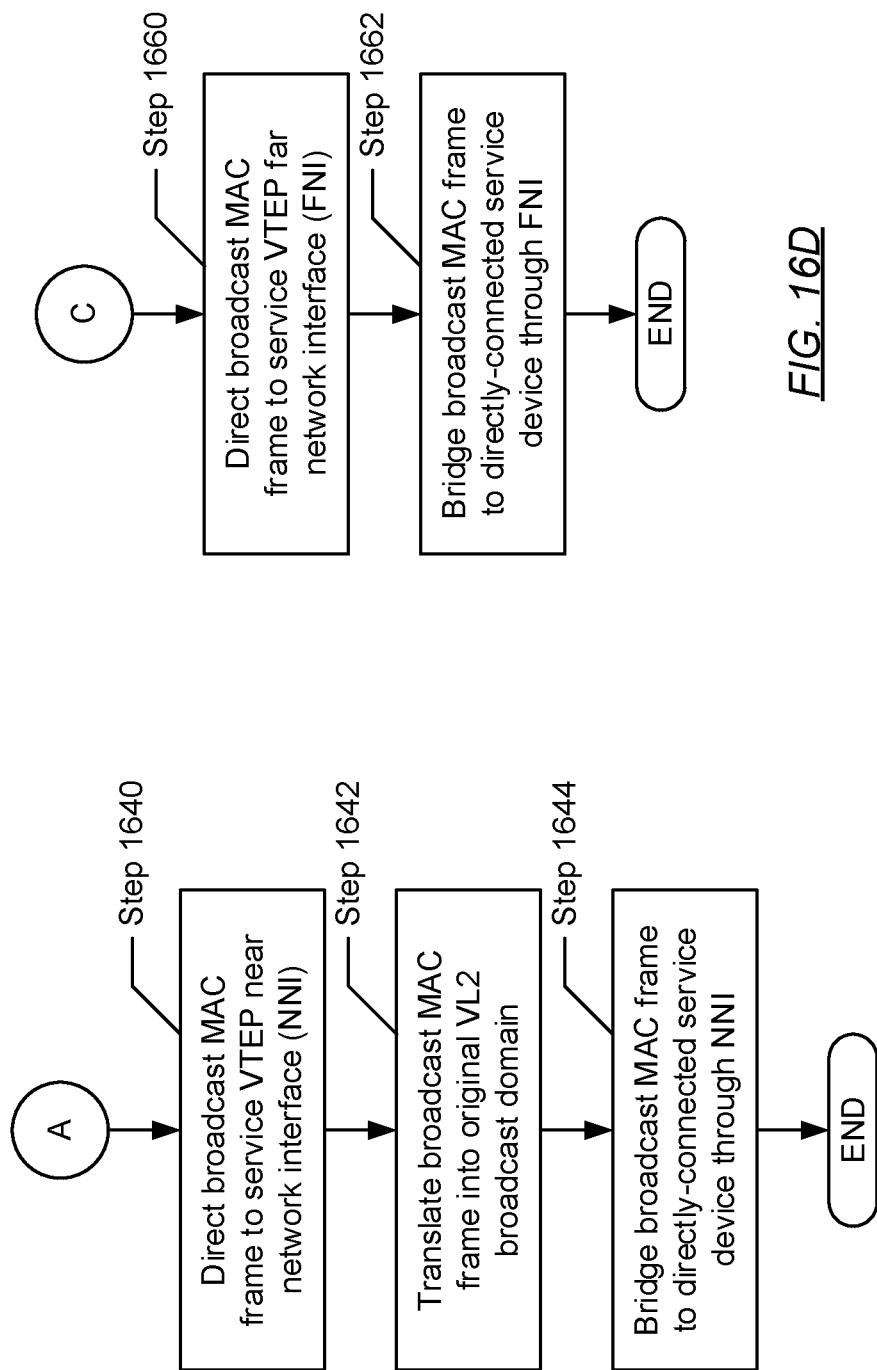

METHOD AND SYSTEM FOR INSPECTING UNICAST NETWORK TRAFFIC BETWEEN END POINTS RESIDING WITHIN A SAME ZONE

BACKGROUND

Typically, the insertion of a transparent service device in the network traffic path between end points results in the segmentation of the layer-2 domain into two zones. All end points in any given zone can communicate directly with one another while communication between end points in different zones traverses through the service device.

SUMMARY

In general, in one aspect, the invention relates to a method for processing network traffic. The method includes receiving, from a first remote virtual tunnel end point (VTEP), a first virtual layer-3 (VL3) frame comprising a forward-service virtual network identifier (VNI), decapsulating the first VL3 frame to obtain a first unicast media access control (MAC) frame originating from a first source, wherein the first unicast MAC frame comprises a forward-service virtual layer-2 (VL2) broadcast domain tag associated with a forward-service VL2 broadcast domain, making a first determination, using a first destination MAC address associated with a first destination, that the first destination MAC address is known on the forward-service VNI, translating, based on the first determination, the first unicast MAC frame into an original VL2 broadcast domain, to obtain a second unicast MAC frame, and bridging, through a near network interface (NNI), the second unicast MAC frame to a service device.

In general, in one aspect, the invention relates to a non-transitory computer readable medium (CRM). The non-transitory CRM includes computer readable program code, which when executed by a computer processor, enables the computer processor to receive, from a first remote virtual tunnel end point (VTEP), a first virtual layer-3 (VL3) frame comprising a forward-service virtual network identifier (VNI), decapsulate the first VL3 frame to obtain a first unicast media access control (MAC) frame originating from a first source, wherein the first unicast MAC frame comprises a forward-service virtual layer-2 (VL2) broadcast domain tag associated with a forward-service VL2 broadcast domain, make a first determination, using a first destination MAC address associated with a first destination, that the first destination MAC address is known on the forward-service VNI, translate, based on the first determination, the first unicast MAC frame into an original VL2 broadcast domain, to obtain a second unicast MAC frame, and bridge, through a near network interface (NNI), the second unicast MAC frame to a service device.

Other aspects of the invention will be apparent from the following description and the appended claims.

BRIEF DESCRIPTION OF DRAWINGS

FIGS. 16A-16D shows a flowchart describing a method for receiving redirected broadcast network traffic within a zone in accordance with one or more embodiments of the invention.

DETAILED DESCRIPTION

Figure 1:
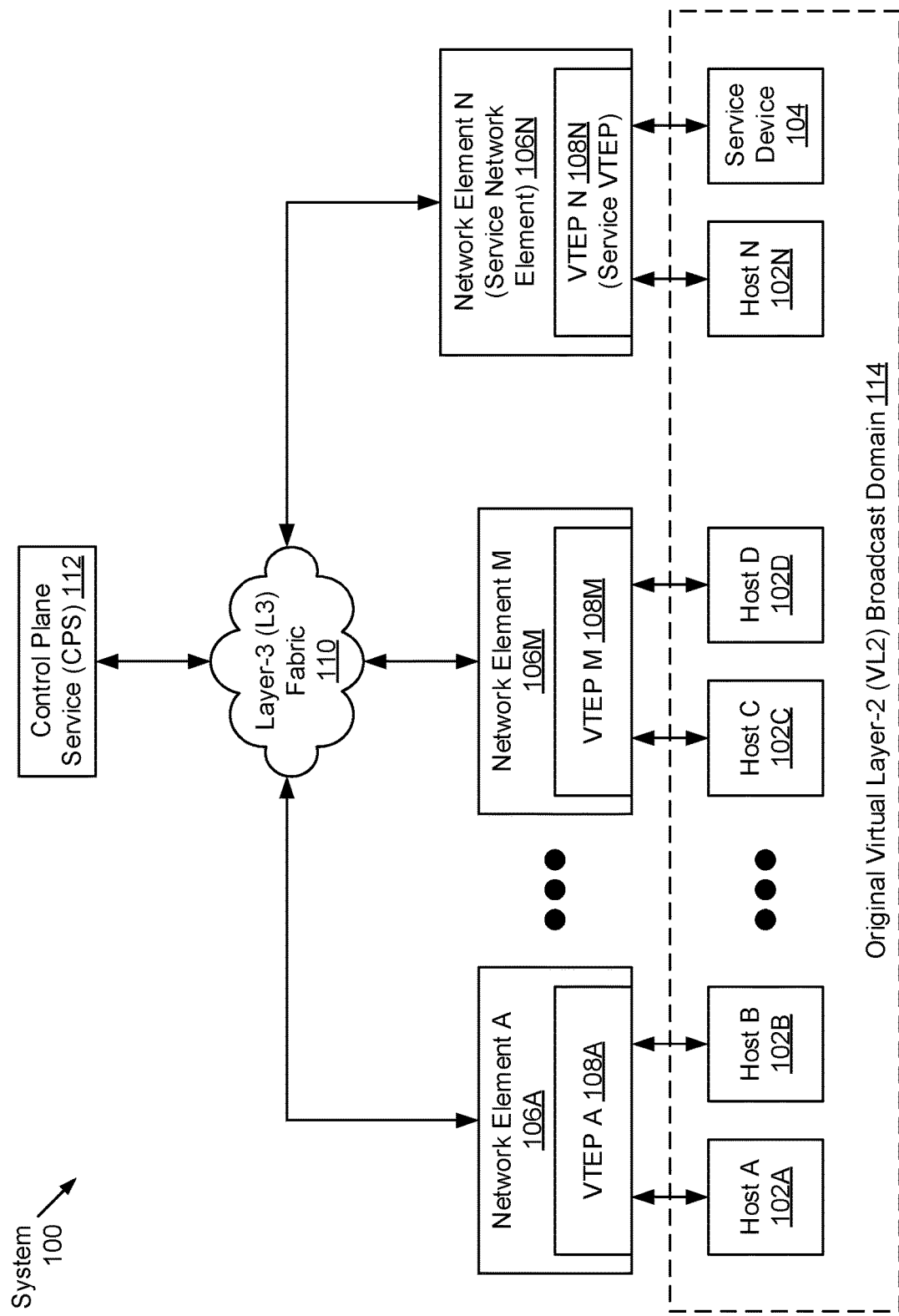
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-24C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for inspecting unicast network traffic between end points residing within a same zone. Specifically, one or more embodiments of the invention entails the provisioning of unique forward-service and reverse-service virtual network identifiers (VNIs), and corresponding virtual layer-2 (VL2) forward-service and reverse-service broadcast domains, respectively, to communications originating from and destined to intercept hosts.

One or more embodiments of the invention hereinafter may be described in conjunction with virtual local area network (VLAN) layer-2 (L2) broadcast domains. However, one of ordinary skill will appreciate that the invention may be practiced using alternative virtual L2 (VL2) broadcast domains. Further, one or more embodiments of the invention hereinafter may also be described in conjunction with the virtual extensible local area network (VXLAN) layer-3 (L3) encapsulation and tunneling protocol. However, one of ordinary skill will appreciate that the invention may be practiced using alternative virtual L3 (VL3) tunneling mechanisms. These other VL3 tunneling mechanisms may pertain to, for example, multi-protocol label switching (MPLS), generic routing encapsulation (GRE), and other existing or future developed tunneling mechanisms.

FIG. 1 shows a system in accordance with one or more embodiments of the invention. The system (100) may include multiple network elements (106A-106N) operatively connected to one another and at least one control-plane service (CPS) (112) through a layer-3 (L3) fabric (110). The system (100) may further include multiple hosts (102A-102N), which may be directly-connected to one or more of the network elements (106A-106N). Furthermore, on each network element (106A-106N), a respective virtual tunnel end point (VTEP) (108A-108N) may be executing thereon. Moreover, the system (100) may include at least one service device (104), which may be directly-connected to at least one network element (e.g., 106N), respectively. Additionally, the system (100) may include an original virtual layer-2 (VL2) broadcast domain (114) employed by at least the one or more hosts (102A-102N) and the at least one service device (104). Each of these components is described below.

In one embodiment of the invention, a network element (106A-106N) may be a physical device that includes persistent storage, memory (e.g., random access memory (RAM), shared memory, etc.), one or more computer processors (e.g., integrated circuits) (including a switch chip or network processor), and two or more physical network interfaces or ports. The computer processor(s) may be programmed to determine out of which network interface on the network element (106A-106N) to forward network traffic (e.g., media access control (MAC) frames). To that end, the computer processor(s) may include logical egress and ingress network interfaces that may connect to physical network interfaces on the network element (106A-106N). Further, each physical network interface may or may not be connected to another component (e.g., a host (102A-102N), another network element (106A-106N), a service device (104), or the L3 fabric (110)) in the system (100).

In one embodiment of the invention, a network element (106A-106N) may include functionality to receive network traffic via the network interfaces, and determine whether to: (i) drop the network traffic; (ii) process the network traffic in accordance with one or more embodiments of the invention; and/or (iii) send the network traffic, based on the processing, out another network interface on the network element (106A-106N) towards a destination.

How the network element (106A-106N) makes the determination of whether to drop network traffic (e.g., network packets), and/or send network traffic to another component in the system (100), depends, in part, on whether the network element (106A-106N) is a L2 switch or a L3 switch (also referred to as a multilayer switch), which may perform at least some functions of a router. If the network element (106A-106N) is operating as a L2 switch, the network element (106A-106N) uses the destination MAC address along with a forwarding table or policy to determine out of which network interface to send the network traffic. If the network element (106A-106N) is operating as a L3 switch, the network element (106A-106N) uses the destination Internet Protocol (IP) address along with a routing table or policy to determine out of which network interface to send the network traffic, and includes the ability to write the MAC address of the next stop (or component) to receive the network traffic in place of its own MAC address (which the last hop or component to send the network traffic wrote) in the L2 information encapsulating the network traffic. If the network element (106A-106N) is a multilayer switch, the network element (106A-106N) includes functionality to process network traffic using both MAC addresses and IP addresses.

In one embodiment of the invention, the persistent storage on a network element (106A-106N) may include any type of non-transitory computer readable medium that includes instructions, which when executed by the computer processor(s), enable the network element (106A-106N) to perform any of the functionalities described herein. Moreover, examples of a network element (106A-106N) include, but are not limited to, a switch, a router, and a multilayer switch. Further, a network element (106A-106N) is not limited to the aforementioned specific examples.

In one embodiment of the invention, a network element (106A-106N) may include a virtual tunnel end point (VTEP) (108A-108N). A VTEP (108A-108N) may refer to a logical intelligence (i.e., software) tasked with originating and/or terminating virtual layer-3 (VL3) tunnels. Further, a VTEP (108A-108N) may include functionality to: (i) encapsulate MAC frames into VL3 frames, where the MAC frames may be generated by or obtained from a directly-connected host (102A-102N), a virtual machine (VM) (not shown) executing on a directly-connected host (102A-102N), and a directly-connected service device (104); (ii) transmit VL3 frames towards remote VTEPs (108A-108N) executing on remote network elements (106A-106N) through the L3 fabric (110); (iii) receive other VL3 frames from these remote VTEPs (108A-108N) via the L3 fabric (110); and (iv) decapsulate (i.e., remove the VL3 frame header information from) these other VL3 frames to obtain other MAC frames therefrom, where these other MAC frames may have been generated by remote hosts (102A-102N), remote VMs executing on remote hosts (102A-102N), and remote service devices (104). By way of an example, a VL3 frame may be a virtual extensible local area network (VXLAN) frame, whereas the virtual tunnel through which VXLAN frames traverse may be a VXLAN tunnel. Embodiments of the invention are not limited to any specific implementation or protocol for generating VL3 frames and/or virtual tunnels.

In one embodiment of the invention, a service VTEP may be described herein. A service VTEP (e.g., VTEP N (108N)) may refer to a VTEP that executes on a network element (e.g., network element N (106N)) that is directly-connected to a service device (104). Further, in one embodiment of the invention, a service network element may also be described herein. A service network element (e.g., network element N (106N)) may refer to a network element that is directly-connected to a service device (104).

In one embodiment of the invention, the original VL2 broadcast domain (114) may be defined as the set of computing devices (e.g., hosts (102A-102N), virtual machines (not shown), and service devices (104)) that communicate with one another using the same virtual network identifier (VNI) (e.g., an original VNI), where the VNI is defined by, for example, the VXLAN protocol. Further, a VNI identifies the scope of the MAC frame originated by a computing device such that the MAC frame may only be sent to another computing device associated with the same VNI. In one embodiment of the invention, a MAC frame may be sent to a computing device associated with a different VNI when the MAC frame is routed into a new VL2 broadcast domain (not shown). By way of examples, the original VL2 broadcast domain (114) may be implemented as a virtual local area network (VLAN) domain and/or a VXLAN domain. Embodiments of the invention are not limited to these specific examples.

In one embodiment of the invention, a host (102A-102N) may be any computing system (e.g., implemented through software and computer hardware) that may be configured to generate, send, receive, and/or process requests and replies, either locally or over a network. A host (102A-102N) may include one or more computer processors, memory, and one or more physical network interfaces. Further, a host (102A-102N) may include functionality to generate, receive, and/or transmit network traffic (e.g., MAC frames). Examples of a host (102A-102N) include, but are not limited to, a server (e.g., a database server, a dynamic host configuration protocol (DHCP) server, an application server, a file server, a print server, a mail server, or any other server), a desktop computer, a mobile device (e.g., a laptop computer, a smartphone, a personal digital assistant (PDA), a tablet computer, or any other mobile device), or any other type of computing device including the aforementioned minimum requirements.

In one embodiment of the invention, there may be various types of hosts (102A-102N) described herein. For example, an intercept host may be mentioned. In one embodiment of the invention, an intercept host may refer to a host whose outbound (i.e., generated) and/or inbound (i.e., received) network traffic may be, or may have been, intercepted and inspected by a service device (104). The aforementioned network traffic, originating from and/or addressed to the intercept host, may be intercepted based on one or more service policies, rules, and/or redirect criteria (described below) programmed into various network elements (106A-106N). By way of another example, a non-intercept host may also be mentioned herein. In one embodiment of the invention, a non-intercept host may refer to a host whose outbound (i.e., generated) and/or inbound (i.e., received) network traffic may not be sought for interception and/or inspection by a service device (104). Though not required to be redirected to a service device (104), network traffic originating and/or addressed to a non-intercept host may still traverse a service device (104) while being routed towards a destination, whereas the network traffic itself may pass through without subjection to a service function (applied by a service device (104)).

In one embodiment of the invention, a control-plane service (CPS) (112) may be a platform for the centralized management of and/or consolidation of state information for all or a portion of the network elements (106A-106N) in the system (100). A CPS (112) may be implemented as one or more physical or virtual devices, which includes at least one or more processors, memory, one or more physical network interfaces, and a data repository. In one embodiment of the invention, a CPS (112) may include executable instructions (stored in a non-transitory computer readable medium), which when executed, enable the CPS (112) to disseminate, to various VTEPs (108A-108N), information pertinent to embodiments of the invention disclosed herein (described below) (see e.g., FIGS. 3A-3D).

In one embodiment of the invention, a CPS (112) may include a data repository (not shown). The data repository may be a storage system or media for consolidating various forms of data. The data repository may be implemented across one or more physical and/or virtual storage units or devices, which may or may not be of the same type or co-located in a same computing device. Furthermore, the information consolidated in the data repository may be arranged using any storage mechanism (e.g., a filesystem, a database, a collection of tables, etc.). In one embodiment of the invention, the data repository may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, a service device (104) may be a physical or virtual computing device that includes functionality to provide a service to one or more network elements (106A-106N) and/or one or more hosts (102A-102N). A service device (104) may include at least one or more processors, memory, and two or more physical network interfaces. In one embodiment of the invention, a service device (104) may include functionality to process network traffic, redirected thereto from various VTEPs (108A-108N), in accordance with the configuration of, and the specific service thus provided by, the service device (104). Subsequently, a service device (104) may include functionality to filter, mirror, store, forward, drop, transform, and/or perform any other action, or any combination thereof, to redirected network traffic, which is afforded by the configuration and provided service of the service device (104). Examples of service devices (104) include, but are not limited to, network security devices (e.g., firewall devices and denial of service (DOS) attack scrubbers), network filtering devices (e.g., web content filters), network data caches (e.g., web-cache devices), and network load balancing devices.

In one embodiment of the invention, the L3 fabric (110) may be a set of interconnected network elements or systems, which operatively connect one or more CPSs (112) to each of the network elements (106A-106N) of the system (100). The L3 fabric (110) may include functionality to facilitate communications between these aforementioned components. Accordingly, the L3 fabric (110) may include any combination of local area network (LAN) and/or wide area network (WAN) (e.g., Internet) segments, which may employ any combination of wired and/or wireless connections and communication protocols.

While FIG. 1 shows a configuration of components, other system configurations may be used without departing from the scope of the invention. For example, the system (100) may further include one or more virtual machines (not shown), which may execute on any underlying hardware component portrayed in the system (100).

In one embodiment of the invention, a virtual machine (VM) may be a software based emulation of a computing device. Subsequently, a VM may be assigned (or allocated) all or a portion of various computing resources (e.g., processors, memory, storage, network bandwidth, etc.) provided by an underlying physical system (e.g., a host (102A-102N), a network element (106A-106N), a service device (104), etc.) serving as the VM host. Other than allocating computing resources, hosting a VM may further entail translating instructions from the VM into instructions that may be understood by the underlying physical hardware, operating system, and/or hypervisor executing on the underlying physical system. In one embodiment of the invention, a hypervisor (i.e., a VM monitor) may be computer software that includes functionality to create, run, and/or, at least in part, manage VMs executing on an underlying physical system. Moreover, a VM may include functionality to generate, receive, transmit, and/or process network traffic (e.g., MAC frames).

Figure 2:
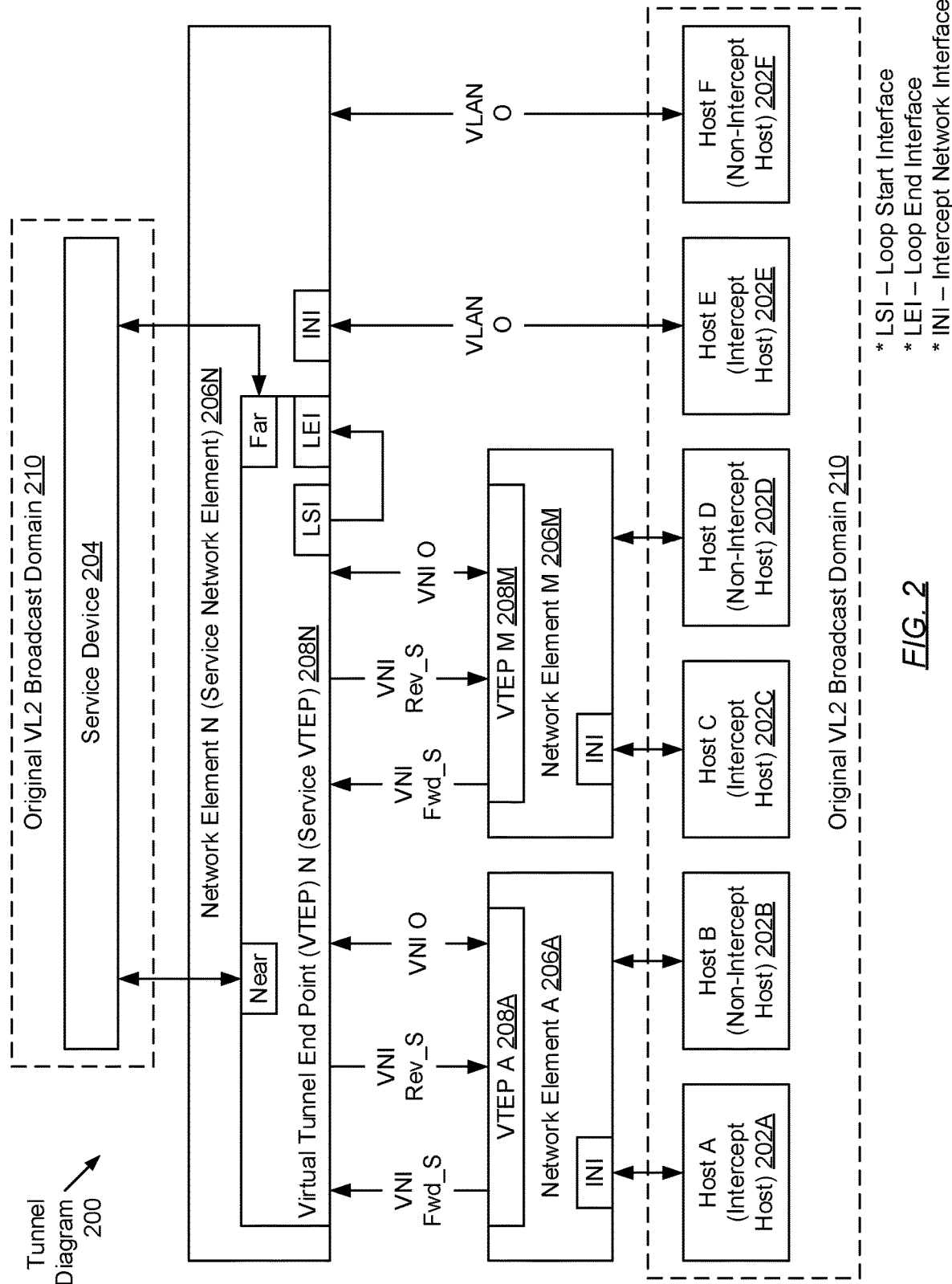
FIG. 2 shows a tunneling diagram in accordance with one or more embodiments of the invention.

FIG. 2 shows a tunneling diagram in accordance with one or more embodiments of the invention. Specifically, FIG. 2 shows a non-limiting configuration that includes a service device (204) directly-connected to a network element N (206N), which is designated as a service network element (described above). The configuration further includes a virtual tunnel end point (VTEP) N (208N), which is designated as a service VTEP (described above). VTEP N (208N) is shown to be executing on network element N (206N). In addition, VTEP N (208N) (and network element N (206N)) may be operatively connected to multiple other VTEPs (208A-208M) (i.e., remote VTEPs), as well as their respective network elements (206A-206M). Each of the aforementioned other network elements (206A-206M) may be directly-connected to one or more hosts (202A-202D). Network element N (206N) may also be directly-connected to one or more hosts (202E, 202F). The configuration additionally illustrates that the hosts (202A-202F) and the service device (204) are capable of communicating with one another over an original virtual layer-2 (VL2) broadcast domain (210).

Moreover, in the configuration portrayed in FIG. 2, hosts A, C, and E (202A, 202C, 202E) are designated as intercept hosts. As described above, in one embodiment of the invention, an intercept host may refer to a host where network traffic therefrom and/or thereto may be intercepted and inspected by a service device (204) based on redirect criteria (described below). Specifically, inbound and/or outbound network traffic for a host may be intercepted based on the network traffic including information that matches redirect criteria tied to one or more service policies or rules circulated about the network/system. Other information (outside the data included in MAC and/or VL3 frames) may be used to determine whether network traffic should be intercepted without departing from the scope of the invention.

In one embodiment of the invention, any inbound network traffic (i.e., from the perspective of the service VTEP (208N)) originating from any intercept host (202A, 202C) that resides behind a remote VTEP (208A, 208M) may be assigned (or associated with) a forward-service virtual network identifier (VNI) (e.g., VNI Fwd_S). Further, the forward-service VNI may be a unique VNI associated with (or corresponding to) a forward-service VL2 broadcast domain (not shown), which may enable communications between any remote VTEP (208A, 208M), behind which an intercept host (202A, 202C) lies, and the service VTEP (208N).

That is, in one embodiment of the invention, the forward-service VNI may be associated with a forward-service VL2 broadcast domain, where the forward-service VL2 broadcast domain may be implemented as a tunneling mechanism. Further, the tunneling mechanism may originate at a remote VTEP (208A, 208M) behind which an intercept host (202A, 202C) resides (that is found to be associated with the forward-service VNI) and, subsequently, may terminate at the service VTEP (208N), which may be executing on the service network element (206N) directly-connected to the service device (204). Accordingly, the forward-service VL2 broadcast domain may limit communications to one direction, which may entail inbound network traffic (i.e., from the perspective of the service VTEP (208N)).

In one embodiment of the invention, any outbound network traffic (i.e., from the perspective of the service VTEP (208N)) destined to any intercept host (202A, 202C) that resides behind a remote VTEP (208A, 208M) may be assigned (or associated with) a reverse-service VNI (e.g., VNI Rev S). Further, the reverse-service VNI may be a unique VNI associated with (or corresponding to) a reverse-service VL2 broadcast domain (not shown), which may enable communications between the service VTEP (208N) and any remote VTEP (208A, 208M) behind which an intercept host (202A, 202C) lies.

That is, in one embodiment of the invention, the reverse-service VNI may be associated with a reverse-service VL2 broadcast domain, where the reverse-service VL2 broadcast domain may be implemented as a tunneling mechanism. Further, the tunneling mechanism may originate at the service VTEP (208N), which may be executing on the service network element (206N) directly-connected to the service device (204), and subsequently, may terminate at a remote VTEP (208A, 208M) behind which an intercept host (202A, 202C) lies. Accordingly, the reverse-service VL2 broadcast domain may limit communications to one direction, which may entail outbound network traffic (i.e., from the perspective of the service VTEP (208N)).

In one embodiment of the invention, the implementation of the forward-service and reverse-service VL2 broadcast domains may be transparent to the set of computing devices (e.g., hosts (202A-202F) and service devices (204)) defined by the original VL2 broadcast domain (210). Subsequently, any network traffic exchanged between a host (202A-202F) of the original VL2 broadcast domain (210) and a respective, directly-connected network element (206A-206N) may include an original VL2 broadcast domain tag (e.g., a VLAN tag) associated with the original VL2 broadcast domain (210). Inclusion of the original VL2 broadcast domain tag in, for example, a MAC frame associates that MAC frame with the original VL2 broadcast domain (210), and further, permits the MAC frame to be transmitted/bridged to and from any host (202A-202F) of the original VL2 broadcast domain (210). Similarly, in one embodiment of the invention, any network traffic exchanged between a service device (204) and its directly-connected network element (206N) may include the original VL2 broadcast domain tag associated with the original VL2 broadcast domain (210). Inclusion of original VL2 broadcast domain tag in, for example, a MAC frame not only associates the MAC frame with the original VL2 broadcast domain (210), but also permits the MAC frame to be transmitted/bridged to and from a service device (204) of the original VL2 broadcast domain (210).

In one embodiment of the invention, any inbound network traffic (i.e., from the perspective of the service network element (206N)) originating from a directly-connected intercept host (202E) may be assigned to (or associated with) the original VL2 broadcast domain (210) (e.g., VLAN 0). In such an embodiment, a directly-connected intercept host (202E) may refer to an intercept host that is directly-connected to a service network element (206N). Similarly, in one embodiment of the invention, any outbound network traffic (i.e., from the perspective of the service network element (206N)) destined to a directly-connected intercept host (202E) may also be assigned to (or associated with) the original VL2 broadcast domain (210), thereby enabling bidirectional communication between the service network element (206N) and a directly-connected intercept host (202E).

In the configuration portrayed in FIG. 2, hosts B, D, and F (202B, 202D, 202F) are designated as non-intercept hosts. As described above, in one embodiment of the invention, a non-intercept host may refer to a host where network traffic therefrom and/or thereto may not be intercepted and inspected by a service device (204) based on redirect criteria (described below). Specifically, should inbound and/or outbound network traffic for a host include header information that mismatches redirect criteria tied to one or more service policies or rules circulated about the network/system, the aforementioned network traffic may not be intercepted. Other information (outside the data included in MAC and/or VL3 frames) may be used to determine whether network traffic should or should not be intercepted without departing from the scope of the invention.

In one embodiment of the invention, any inbound network traffic (i.e., from the perspective of the service VTEP (208N)) originating from any non-intercept host (202B, 202D) that resides behind a remote VTEP (208A, 208M) may be assigned (or associated with) the original VNI (e.g., VNI 0). Similarly, any outbound network traffic (i.e., from the perspective of the service VTEP (208N)) destined to a non-intercept host (202B, 202D), residing behind a remote VTEP (208A, 208M), may also be assigned to (or associated with) the original VNI. Further, the original VNI may be a unique VNI associated with (or corresponding to) the original VL2 broadcast domain (210), which may enable bidirectional communications between any remote VTEP (208A, 208M), behind which at least one non-intercept host (202B, 202D) lies, and the service VTEP (208N).

In one embodiment of the invention, any inbound network traffic (i.e., from the perspective of the service network element (206N)) originating from a directly-connected non-intercept host (202F) may be assigned to (or associated with) the original VL2 broadcast domain (210) (e.g., VLAN 0). In such an embodiment, a directly-connected non-intercept host (202F) may be a non-intercept host that is directly-connected to a service network element (206N). Similarly, in one embodiment of the invention, any outbound network traffic (i.e., from the perspective of the service network element (206N)) destined to a directly-connected non-intercept host (202F) may also be assigned to (or associated with) the original VL2 broadcast domain (210), thereby enabling bidirectional communication between the service network element (206N) and a directly-connected non-intercept host (202F).

While FIG. 2 shows a configuration of components, other tunneling configurations may be used without departing from the scope of the invention. For example, the configuration may further specify more than one forward-service VL2 broadcast domain, more than one reverse-service VL2 broadcast domain, and/or more than one original VL2 broadcast domain.

Figure 3A:
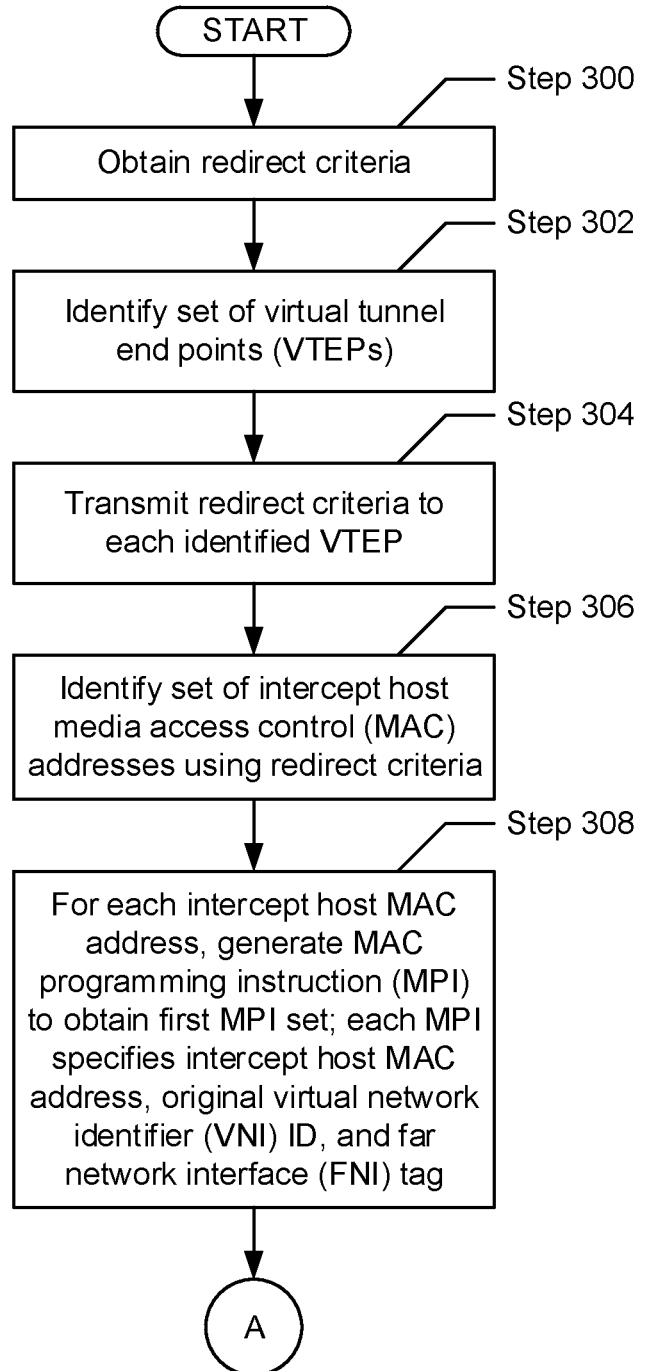
FIGS. 3A-3C show flowcharts describing a method for sharing control-plane information in accordance with one or more embodiments of the invention.
Figure 3B:
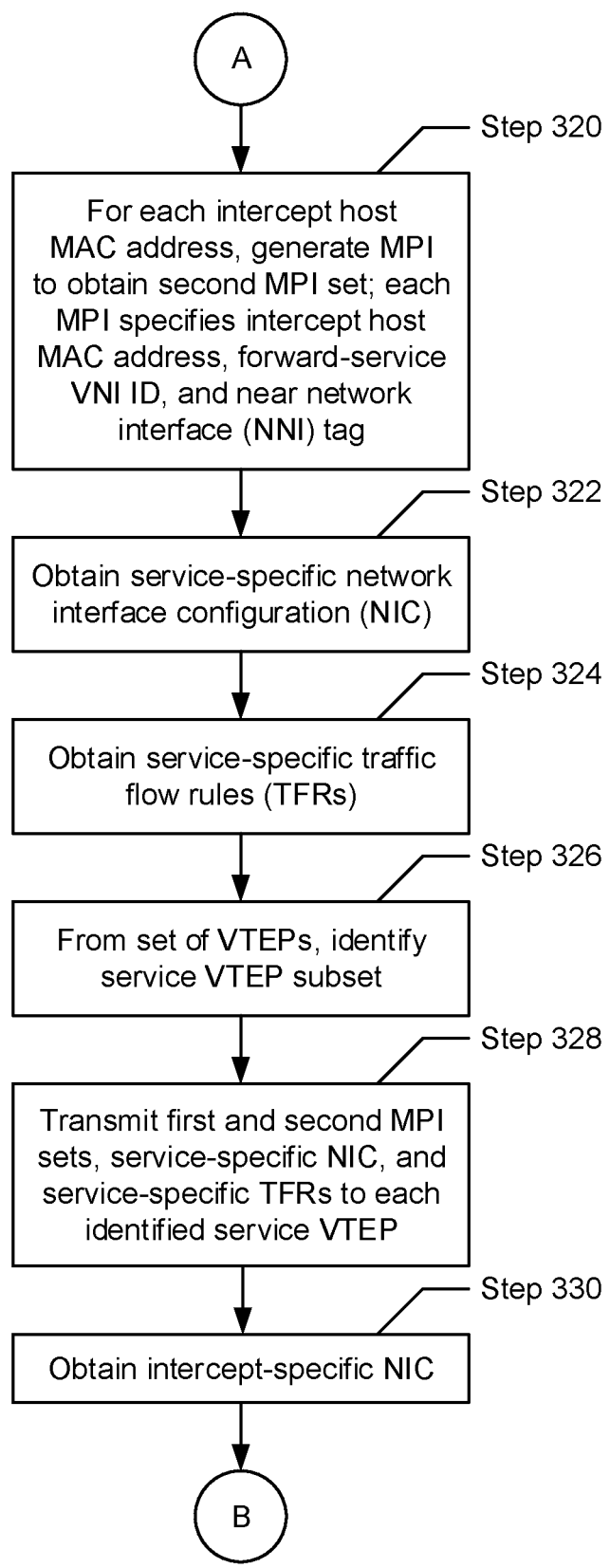
Figure 3C:
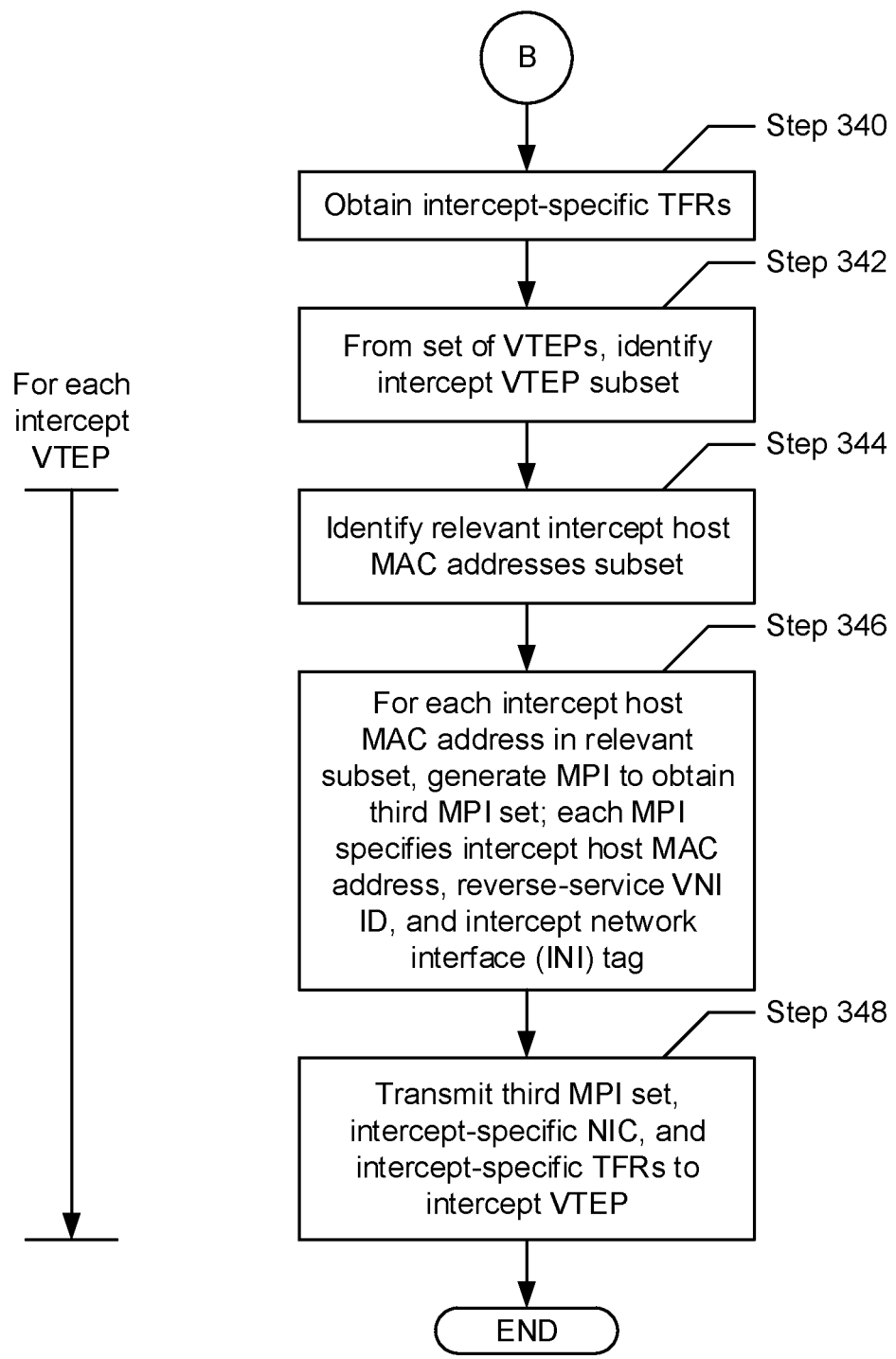

FIGS. 3A-3C show flowcharts describing a method for sharing control-plane information in accordance with one or more embodiments of the invention. The various steps outlined below may be performed by a control-plane service (CPS) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 3A, in Step 300, redirect criteria is obtained. In one embodiment of the invention, the redirect criteria may refer to one or more service policies or rules, which specify requirements (to be matched) in order to steer or redirect network traffic towards a service device. Redirect criteria may be configured by administrators of a system (see e.g., FIG. 1), network, and/or datacenter. Further, redirect criteria may include, but is not limited to, matching requirements tied to: (i) a specific network element (e.g., a service policy may require that any network traffic originating from or destined to a specific network element must be redirected to a service device for inspection); (ii) a specific network interface on a network element (e.g., a service policy may require that any inbound and/or outbound network traffic traversing a specific network interface on a network element must be redirected to a service device for inspection); (iii) a specific host or virtual machine (e.g., a service policy may require that any network traffic originating from or destined to a specific host or virtual machine must be redirected to a service device for inspection); (iv) a specific source Internet Protocol (IP) or media access control (MAC) address and destination IP or MAC address pair (e.g., a service policy may require that any network traffic including a specific source IP/MAC address and a specific destination IP/MAC address must be redirected to a service device for inspection); and (v) a specific VL2 broadcast domain (e.g., a specific virtual local area network (VLAN)) and IP/MAC address pair (e.g., a service policy may require that any network traffic including a specific VL2 broadcast domain broadcast domain (e.g., a specific VLAN tag) (or VNI) and a specific IP/MAC address (associated with either a source or a destination) must be redirected to a service device for inspection). Embodiments of the invention are not limited to the above-mentioned examples.

In Step 302, a set of virtual tunnel end points (VTEPs) is identified. In one embodiment of the invention, the set of VTEPs may be identified from or using one or more data structures, consolidated on the CPS, which may track various information pertinent to one or more systems, networks, datacenters, zones, and/or subnets. By way of an example, the set of VTEPs may be identified from or using a VTEP table, which may exhibit various entries, where each entry may pertain to a unique VTEP. Further, each entry may, for example, specify: a VTEP IP address associated with the VTEP; a VTEP hostname referring to a name of the overlay network with which the VTEP may be associated; a VTEP host type referring to a type of the overlay tunnel (e.g., VXLAN tunnel) with which the VTEP may originate or terminate; and one or more virtual network identifiers (VNIs) with which the overlay network may be associated.

In Step 304, the redirect criteria (obtained in Step 300) is transmitted to each VTEP (identified in Step 302). Thereafter, in Step 306, a set of intercept host (or intercept virtual machine) MAC addresses is identified using the redirect criteria. As described above, in one embodiment of the invention, an intercept host (or intercept virtual machine) may refer to a host (or virtual machine) where network traffic therefrom and/or thereto may be intercepted and inspected by a service device. Further, a determination of which network traffic requires interception and inspection may be based on redirect criteria. Accordingly, should a host (or virtual machine) be specified in the redirect criteria (i.e., via their respective MAC address, IP address, or some other unique identifier), that host/virtual machine may be considered an intercept host (or an intercept virtual machine).

In Step 308, for each intercept host (or virtual machine) MAC address (identified in Step 306), a first MAC programming instruction (MPI) is generated. In one embodiment of the invention, each first MPI may represent a computer readable instruction, which may include particular information, thus directing a recipient (e.g., any or all VTEPs (identified in Step 302)) to update their MAC address table accordingly using the particular information. The aforementioned particular information specified in each first MPI may include, but is not limited to: an intercept host (or intercept virtual machine) MAC address (identified in Step 306); an original VNI identifier (ID) corresponding to an original VL2 broadcast domain; and a far network interface (FNI) (see e.g., FIG. 2) tag or reference. Moreover, through each first MPI, recipients may program any and all intercept host (or intercept virtual machine) MAC address, specified in the redirect criteria, on the original VNI behind their respective FNI.

Turning to FIG. 3B, in Step 320, for each intercept host (or virtual machine) MAC address (identified in Step 306), a second MPI is generated. In one embodiment of the invention, each second MPI may represent another computer readable instruction, which may include other particular information, thus directing a recipient (e.g., any or all VTEPs (identified in Step 302)) to update their MAC address table accordingly using the other particular information. The aforementioned other particular information specified in each second MPI may include, but is not limited to: an intercept host (or intercept virtual machine) MAC address (identified in Step 306); a forward-service VNI ID; and a near network interface (NNI) (see e.g., FIG. 2) tag or reference. Moreover, through each second MPI, recipients may program any and all intercept host (or intercept virtual machine) MAC address, specified in the redirect criteria, on the forward-service VNI behind their respective NNI.

In Step 322, a service-specific network interface configuration (NIC) is obtained. In one embodiment of the invention, the service-specific NIC may refer to a computer readable script that outlines a desired configuration targeting one or more properties (or attributes) of one or more network interfaces belonging to or residing on a service recipient (e.g., a service VTEP (see e.g., FIG. 2)). By way of examples, the service-specific NIC may configure: (i) a membership property (or attribute) belonging to the NNI of a service recipient such that the NNI is enrolled as a member of the reverse-service VNI and/or the forward-service VNI; (ii) a membership property (or attribute) belonging to the FNI of a service recipient such that the FNI is enrolled as a member of the original VNI; (iii) a learning property (or attribute) belonging to the FNI of a service recipient such that MAC learning at the FNI is disabled; (iv) a membership property (or attribute) belonging to the loop-end interface (LEI) (see e.g., FIG. 2) of a service recipient such that the LEI is enrolled as a member of the reverse-service VNI; (v) a learning property (or attribute) belonging to the LEI of a service recipient such that MAC learning at the LEI is disabled; (vi) a mirroring property (or attribute) belonging to the FNI of a service recipient such that the FNI mirrors (i.e., provides a copy of) any received or ingress network traffic at the FNI to the loop-start interface (LSI) (see e.g., FIG. 2) of the service recipient; and (vii) a flooding property (or attribute) belonging to the LEI of a service recipient such that unknown unicast flooding at the LEI is disabled. Embodiments of the invention are not limited to the above-mentioned examples.

In Step 324, a set of service-specific traffic flow rules (TFRs) is obtained. In one embodiment of the invention, a flow (or a network traffic flow) may refer to a network traffic sequence (i.e., a sequence of packets) that shares L2 and/or L3 header information—e.g., a same source IP and/or MAC address, a same destination IP and/or MAC address, a same VL2 broadcast domain tag, an ingress network interface ID for a physical or virtual network interface whereat the flow arrived, etc. A service-specific TFR, subsequently, may represent a flow-pertinent rule or policy that applies an action set (or statement) to a network traffic flow at/on a service recipient (e.g., a service VTEP) that includes L2 and/or L3 information specified in a corresponding match set (or statement). Accordingly, a match set for a service-specific TFR may specify one or more header field values shared by a network traffic flow, whereas a corresponding action set for the service-specific TFR may dictate one or more actions (or functions) to be performed to/on the network traffic flow as it traverses the service recipient—e.g., route or bridge the associated network traffic, drop the associated network traffic, modify one or more header and/or data fields specified in the associated network traffic, etc.

By way of examples, the set of service-specific TFRs may specify the following instructions: (i) translate any egress network traffic traversing the NNI of a service recipient from the forward-service VL2 broadcast domain to the original VL2 broadcast domain; (ii) translate any ingress network traffic traversing the NNI of a service recipient from the original VL2 broadcast domain to the reverse-service VL2 broadcast domain; (iii) translate any ingress network traffic traversing the LEI of a service recipient from the original VL2 broadcast domain to the reverse-service VL2 broadcast domain; (iv) drop any egress network traffic, associated with the reverse-service VL2 broadcast domain, that traverses the NNI of a service recipient; and (v) drop any egress network traffic, associated with the reverse-service VL2 broadcast domain, that traverses the LEI of a service recipient. Embodiments of the invention are not limited to the above-mentioned examples.

In Step 326, a service VTEP subset is identified (from the set of VTEPs identified in Step 302). As described above, in one embodiment of the invention, a service VTEP may refer to a VTEP that executes on a network that may be directly-connected to a service device. Further, the service VTEP subset may be identified from or using one or more data structures, consolidated on the CPS, which may track various information pertinent to one or more systems, networks, datacenters, zones, and/or subnets.

By way of an example, the service VTEP subset may be identified from or using a combination of a MAC-to-VTEP table and a service device table. That is, initially, a service device table may be identified, which may include various entries, where each entry pertains to a unique service device. Further, each entry in the service device table may consolidate various information regarding a respective service device, which may include, but is not limited to: a MAC address associated with the service device; an IP address associated with the service device; a device type associated with the service device—e.g., a network security device, a network filter device, etc.; and a status associated with the service device. Using the service device table, one or more service device MAC addresses (associated with one or more service devices, respectively) may be obtained. Thereafter, the obtained service device MAC address(es) may be used to perform lookups on the MAC-to-VTEP table. The MAC-to-VTEP table may refer to a data structure that includes various entries, where each entry specifies a host MAC address to VTEP IP address mapping. Further, each mapping may reveal a host, a virtual machine, or a service device (identified via a MAC address) that may lie behind a VTEP (identified via an IP address). Subsequently, the obtained service device MAC address(es) may be used in conjunction with the MAC-to-VTEP table to identify one or more corresponding VTEP IP addresses associated with one or more VTEPs, respectively, behind which may lie a service device. As described above, VTEPs behind which lie (or are directly-connected to) a service device may be referred to as service VTEPs.

In Step 328, a first MPI set, entailing a first MPI (generated in Step 308) for each intercept host MAC address (identified in Step 306), is transmitted to each service VTEP (identified in Step 326). Further, a second MPI set, entailing a second MPI (generated in Step 320) for each intercept host MAC address (identified in Step 306), is also transmitted to each service VTEP (identified in Step 326). Moreover, the service-specific NIC (obtained in Step 322) and the set of service-specific TFRs (obtained in Step 324) are also transmitted to each service VTEP (identified in Step 326).

In Step 330, an intercept-specific NIC is obtained. In one embodiment of the invention, the intercept-specific NIC may refer to a computer readable script that outlines a desired configuration targeting one or more properties (or attributes) of one or more network interfaces belonging to or residing on an intercept recipient (e.g., any VTEP behind which an intercept host lies). By way of an example, the intercept-specific NIC may configure a membership property (or attribute) belonging to an intercept network interface (INI) (i.e., a physical or virtual network interface that directly-connects to an intercept host) of an intercept recipient such that the INI is enrolled as a member of the original VNI, the reverse-service VNI and/or the forward-service VNI. Embodiments of the invention are not limited to the above-mentioned example.

Turning to FIG. 3C, in Step 340, a set of intercept-specific TFRs is obtained. As described above, a flow (or a network traffic flow) may refer to a network traffic sequence (i.e., a sequence of packets) that shares L2 and/or L3 header information—e.g., a same source IP and/or MAC address, a same destination IP and/or MAC address, a same VL2 broadcast domain tag, an ingress network interface ID for a physical or virtual network interface whereat the flow arrived, etc. Subsequently, in one embodiment of the invention, an intercept-specific TFR may represent a flow-pertinent rule or policy that applies an action set (or statement) to a network traffic flow at/on an intercept recipient (e.g., any VTEP behind which an intercept host lies) that includes L2 and/or L3 information specified in a corresponding match set (or statement). Accordingly, a match set for an intercept-specific TFR may specify one or more header field values shared by a network traffic flow, whereas a corresponding action set for the intercept-specific TFR may dictate one or more actions (or functions) to be performed to/on the network traffic flow as it traverses the intercept recipient—e.g., route or bridge the associated network traffic, drop the associated network traffic, modify one or more header and/or data fields specified in the associated network traffic, etc.

By way of examples, the set of intercept-specific TFRs may specify the following instructions: (i) translate any ingress network traffic traversing an INI of an intercept recipient from the original VL2 broadcast domain to the forward-service VL2 broadcast domain, where the source MAC address specified in the ingress network traffic is associated with an intercept host; (ii) translate any egress network traffic traversing an INI of an intercept recipient from the reverse-service VL2 broadcast domain to the original VL2 broadcast domain; (iii) drop any broadcast egress network traffic, associated with the original VL2 broadcast domain, that traverses an INI of an intercept recipient; (iv) drop any egress network traffic, associated with the reverse-service VL2 broadcast domain, that traverses an INI of an intercept recipient, where the source MAC address specified in the egress network traffic is associated with an intercept host; and (v) drop any egress network traffic, associated with the forward-service VL2 broadcast domain, that traverses an INI of an intercept recipient. Embodiments of the invention are not limited to the above-mentioned examples.

In Step 342, an intercept VTEP subset is identified (from the set of VTEPs identified in Step 302). In one embodiment of the invention, an intercept VTEP may refer to a VTEP behind which at least one intercept host (described above) lies. Further, the intercept VTEP subset may be identified from or using one or more data structures, consolidated on the CPS, which may track various information pertinent to one or more systems, networks, datacenters, zones, and/or subnets.

By way of an example, the intercept VTEP subset may be identified from or using a combination of a MAC-to-VTEP table (described above) and the one or more intercept host MAC addresses (identified in Step 306). That is, the identified intercept host MAC address(es) may be used to perform lookups on the MAC-to-VTEP table to identify one or more corresponding VTEP IP addresses associated with one or more VTEPs, respectively, behind which may lie at least one intercept host. In one embodiment of the invention, VTEPs behind which lie (or are directly-connected to) at least one intercept host may be referred to as intercept VTEPs.

In Step 344, for each intercept VTEP (identified in Step 342), an intercept host MAC address subset (relevant to an intercept VTEP) is identified. In one embodiment of the invention, the intercept host MAC address subset may include one or more intercept host MAC addresses associated with one or more intercept hosts, respectively, which lie behind (or may be directly-connected to) the intercept VTEP. Further, the intercept host MAC address subset may be identified from or using one or more data structures, consolidated on the CPS, which may track various information pertinent to one or more systems, networks, datacenters, zones, and/or subnets.

By way of an example, the intercept host MAC address subset (for a given intercept VTEP) may be identified from or using a combination of a VTEP-to-Host table, the set of intercept host MAC addresses (identified in Step 306), and the intercept VTEP IP address associated with the given intercept VTEP (identified in Step 342). In one embodiment of the invention, the VTEP-to-Host table may refer to a data structure that includes one or more entries, where each entry pertains to a unique VTEP. Specifically, each entry in the VTEP-to-Host table may map VTEP information for one VTEP—e.g., a VTEP ID, a VTEP IP address, one or more VL2 broadcast domain IDs, one or more VNI IDs, etc.—to host information for one or more hosts (or virtual machines)—e.g., a host MAC address, a host IP address, etc.—that have been recorded to lie behind the one VTEP. Accordingly, for a given intercept VTEP, a lookup may be performed on the VTEP-to-Host table using the intercept VTEP IP address associated with the given intercept VTEP. Based on the lookup, one or more host MAC addresses may be identified, which may represent the host(s) that reside behind the given intercept VTEP. Thereafter, the host MAC address(es) (identified during the aforementioned lookup) may be compared against the set of intercept host MAC addresses (identified in Step 306), thereby leading to the identification of an intersection subset of host MAC addresses. The intersection subset of host MAC addresses (i.e., the intercept host MAC address subset for a given intercept VTEP) may thus include MAC addresses associated with hosts (or virtual machines) that are both intercept hosts and reside behind the given intercept VTEP.

In Step 346, for each intercept VTEP (identified in Step 342), a set of one or more third MPIs is generated. Specifically, in one embodiment of the invention, a third MPI may be generated for each intercept host MAC address (identified into the intercept host MAC address subset in Step 344) for each given intercept VTEP. Further, for a given intercept VTEP, each third MPI may represent a computer readable instruction, which may include particular information, thus directing a recipient (i.e., the given intercept VTEP) to update their MAC address table accordingly using the particular information. The aforementioned particular information specified in each second MPI (for a given intercept VTEP) may include, but is not limited to: an intercept host (or intercept virtual machine) MAC address (identified into the intercept host MAC address subset in Step 344); a reverse-service VNI ID; and an intercept network interface (INI) (described above) tag or reference. Moreover, through each third MPI, the given intercept VTEP may program any and all intercept host (or intercept virtual machine) MAC address, relevant (or directly-connected) to the given intercept VTEP, on the reverse-service VNI behind a respective INI.

In Step 348, a third MPI set, entailing a third MPI (generated in Step 346) for each relevant intercept host MAC address (identified into the intercept host MAC address subset in Step 344 for a given intercept VTEP), is transmitted to the given intercept VTEP. Further, a copy of the intercept-specific NIC (obtained in Step 330) and a copy of the set of intercept-specific TFRs (obtained in Step 340) are also transmitted to the given intercept VTEP. Hereinafter, if additional intercept VTEPs (identified in Step 342) remain, Steps 344 to 348 may be repeated for each remaining intercept VTEP. On the other hand, if no additional intercept VTEPs remain, the process ends.

Figure 4A:
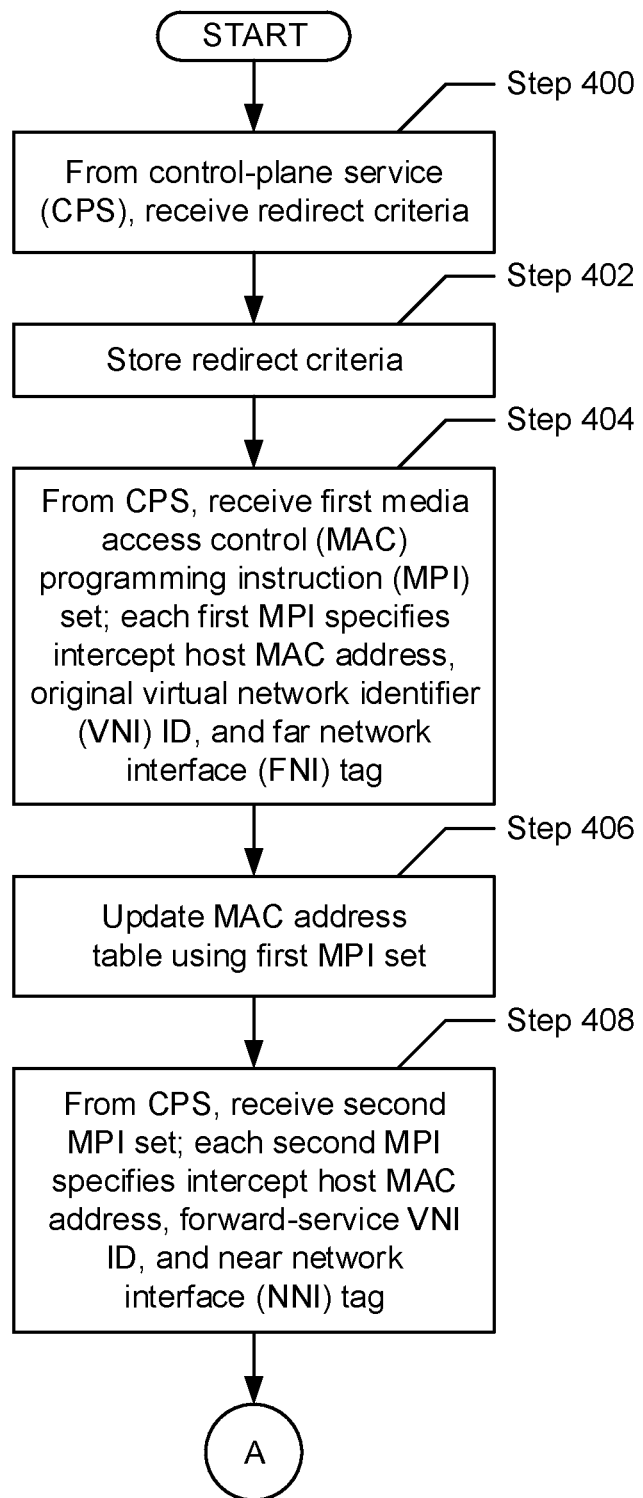
FIGS. 4A and 4B show flowcharts describing a method for receiving and processing control-plane information in accordance with one or more embodiments of the invention.
Figure 4B:
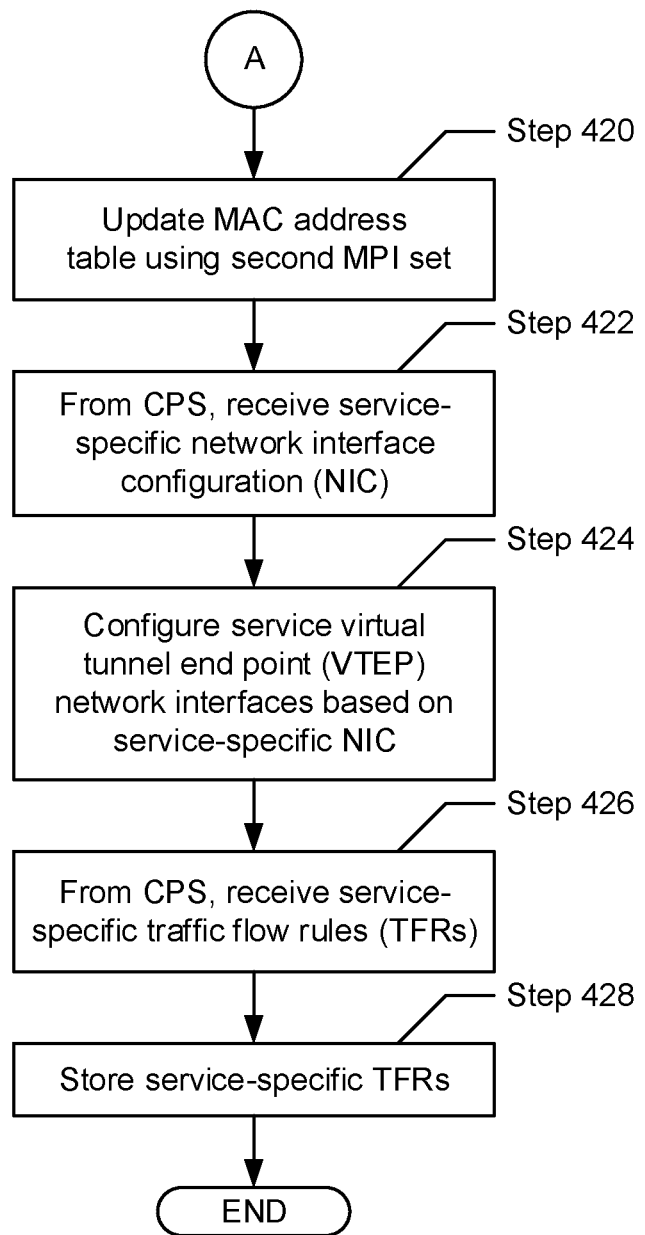

FIGS. 4A and 4B show flowcharts describing a method for receiving and processing control-plane information in accordance with one or more embodiments of the invention. The various steps outlined below may be performed by a service virtual tunnel end point (VTEP) (see e.g., FIG. 2). Further, while the various steps in the flowcharts are presented and described sequentially, one of ordinary skill will appreciate that some or all steps may be executed in different orders, may be combined or omitted, and some or all steps may be executed in parallel.

Turning to FIG. 4A, in Step 400, redirect criteria is received from a control-plane service (CPS) (see e.g., FIG. 1). In one embodiment of the invention, redirect criteria may refer to one or more service policies or rules, which specify requirements (to be matched) in order to steer or redirect network traffic towards a service device. Example service policies and/or rules, representative of redirect criteria, are further described above with respect to FIG. 3A. In Step 402, the redirect criteria (received in Step 400) is subsequently stored. Specifically, in one embodiment of the invention, the received redirect criteria may be stored in non-volatile (or persistent) memory on-board the network element on which the service VTEP may be executing.

In Step 404, also from the CPS, a first media access control (MAC) programming instruction (MPI) set is received. In one embodiment of the invention, the first MPI set may include one or more first MPIs, where each first MPI represents a computer readable instruction that specifies particular information and directs the updating of a MAC address table using the particular information. Further, the aforementioned particular information specified in each first MPI may include, but is not limited to: an intercept host (or intercept virtual machine) MAC address; an original virtual network identifier (VNI) ID corresponding to an original virtual layer-2 (VL2) broadcast domain; and a far network interface (FNI) (see e.g., FIG. 2) tag or reference.

In Step 406, a MAC address table (of the service VTEP) is updated using the first MPI set (received in Step 404). Specifically, in one embodiment of the invention, a new table entry may be appended to the MAC address table or an existing table entry of the MAC address table may be modified based on the above-mentioned particular information specified in each first MPI of the first MPI set. More specifically, through the processing of each first MPI, the MAC address table may be updated to include entries that map any and all intercept host (or intercept virtual machine) MAC address(es), specified in the redirect criteria, on the original VNI behind the FNI of the service VTEP.

In Step 408, also from the CPS, a second MPI set is received. In one embodiment of the invention, the second MPI set may include one or more second MPIs, where each second MPI represents a computer readable instruction that specifies particular information and directs the updating of the MAC address table (of the service VTEP) using the particular information. Further, the aforementioned particular information specified in each second MPI may include, but is not limited to: an intercept host (or intercept virtual machine) MAC address; a forward-service VNI ID corresponding to a forward-service VL2 broadcast domain; and a near network interface (NNI) (see e.g., FIG. 2) tag or reference.

Turning to FIG. 4B, in Step 420, the MAC address table (of the service VTEP) is further updated using the second MPI set (received in Step 408). Specifically, in one embodiment of the invention, a new table entry may be appended to the MAC address table or an existing table entry of the MAC address table may be modified based on the above-mentioned particular information specified in each second MPI of the second MPI set. More specifically, through the processing of each second MPI, the MAC address table may be updated to include entries that map any and all intercept host (or intercept virtual machine) MAC address(es), specified in the redirect criteria, on the forward-service VNI behind the NNI of the service VTEP.

In Step 422, also from the CPS, a service-specific network interface configuration (NIC) is received. In one embodiment of the invention, the service-specific NIC may refer to a computer readable script that outlines a desired configuration targeting one or more properties (or attributes) of one or more physical (or virtual) network interfaces of the service VTEP.

In Step 424, one or more physical (or virtual) network interfaces (of the service VTEP) are configured based on the service-specific NIC (received in Step 422). By way of examples: (i) a membership property (or attribute) belonging to the NNI of the service VTEP may be configured such that the NNI is enrolled as a member of the reverse-service VNI and/or the forward-service VNI; (ii) a membership property (or attribute) belonging to the FNI of the service VTEP may be configured such that the FNI is enrolled as a member of the original VNI; (iii) a learning property (or attribute) belonging to the FNI of the service VTEP may be configured such that MAC learning at the FNI is disabled; (iv) a membership property (or attribute) belonging to the loop-end interface (LEI) (see e.g., FIG. 2) of the service VTEP may be configured such that the LEI is enrolled as a member of the reverse-service VNI; (v) a learning property (or attribute) belonging to the LEI of the service VTEP may be configured such that MAC learning at the LEI is disabled; (vi) a mirroring property (or attribute) belonging to the FNI of the service VTEP may be configured such that the FNI mirrors (i.e., provides a copy of) any received or ingress network traffic at the FNI to the loop-start interface (LSI) (see e.g., FIG. 2) of the service VTEP; and (vii) a flooding property (or attribute) belonging to the LEI of the service VTEP may be configured such that unknown unicast flooding at the LEI is disabled. Embodiments of the invention are not limited to the above-mentioned examples.

In Step 426, also from the CPS, a set of service-specific traffic flow rules (TFRs) is received. In one embodiment of the invention, a flow (or a network traffic flow) may refer to a network traffic sequence (i.e., a sequence of packets) that shares L2 and/or L3 header information—e.g., a same source Internet Protocol (IP) and/or MAC address, a same destination IP and/or MAC address, a same VL2 broadcast domain tag, an ingress network interface ID for a physical or virtual network interface whereat the flow arrived, etc. A service-specific TFR, subsequently, may represent a flow-pertinent rule or policy that applies an action set (or statement) to a network traffic flow while the flow traverses the service VTEP, where the network traffic flow includes L2 and/or L3 information specified in a corresponding match set (or statement). Accordingly, a match set for a service-specific TFR may specify one or more header field values shared by a network traffic flow, whereas a corresponding action set for the service-specific TFR may dictate one or more actions (or functions) to be performed to/on the network traffic flow as the flow traverses the service VTEP. These actions and/or functions may include, but are not limited to, routing or bridging the network traffic flow, dropping the network traffic flow, modifying one or more header and/or data fields specified across the network traffic flow, etc.

By way of examples, the set of service-specific TFRs may specify the following instructions: (i) translate any egress network traffic traversing the NNI of the service VTEP from the forward-service VL2 broadcast domain to the original VL2 broadcast domain; (ii) translate any ingress network traffic traversing the NNI of the service VTEP from the original VL2 broadcast domain to the reverse-service VL2 broadcast domain; (iii) translate any ingress network traffic traversing the LEI of the service VTEP from the original VL2 broadcast domain to the reverse-service VL2 broadcast domain; (iv) drop any egress network traffic, associated with the reverse-service VL2 broadcast domain, that traverses the NNI of the service VTEP; and (v) drop any egress network traffic, associated with the reverse-service VL2 broadcast domain, that traverses the LEI of the service VTEP. Embodiments of the invention are not limited to the above-mentioned examples.

In Step 428, the set of service-specific TFRs (received in Step 426) is stored. Specifically, in one embodiment of the invention, the received set of service-specific TFRs may be stored in non-volatile (or persistent) memory on-board the network element on which the service VTEP may be executing.

Figure 5A:
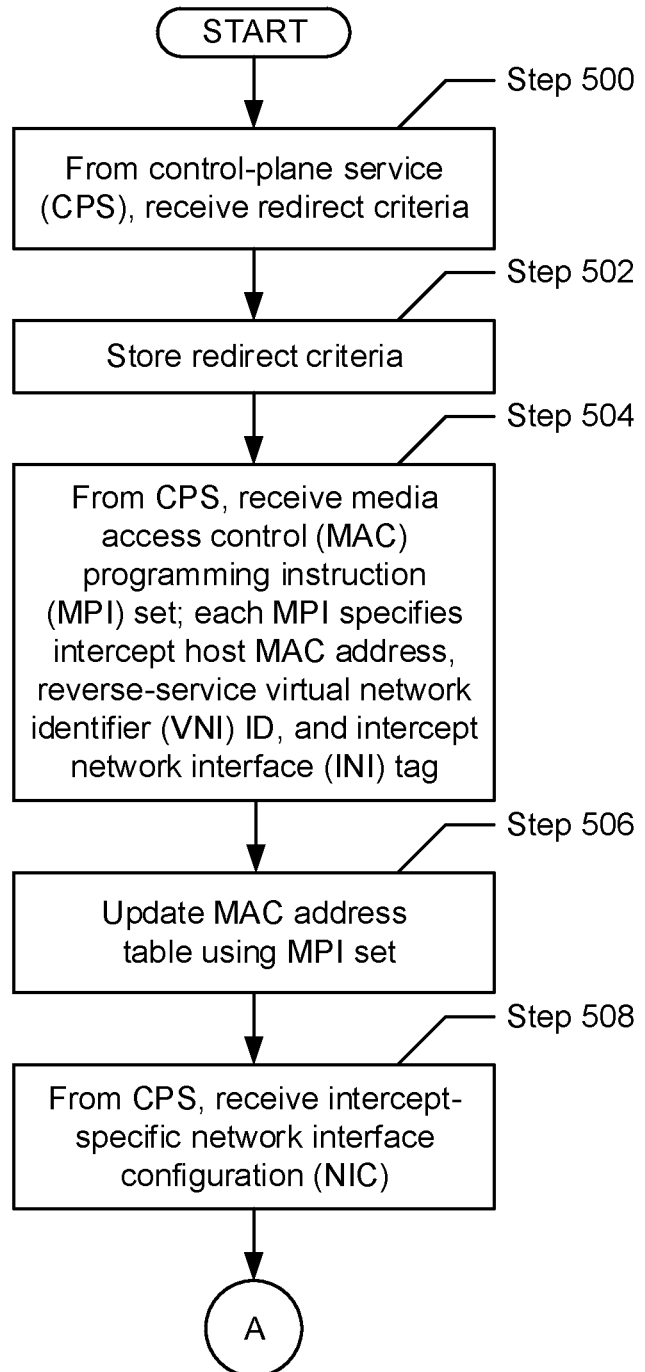
FIGS. 5A and 5B show flowcharts describing a method for receiving and processing control-plane information in accordance with one or more embodiments of the invention.
Figure 5B:
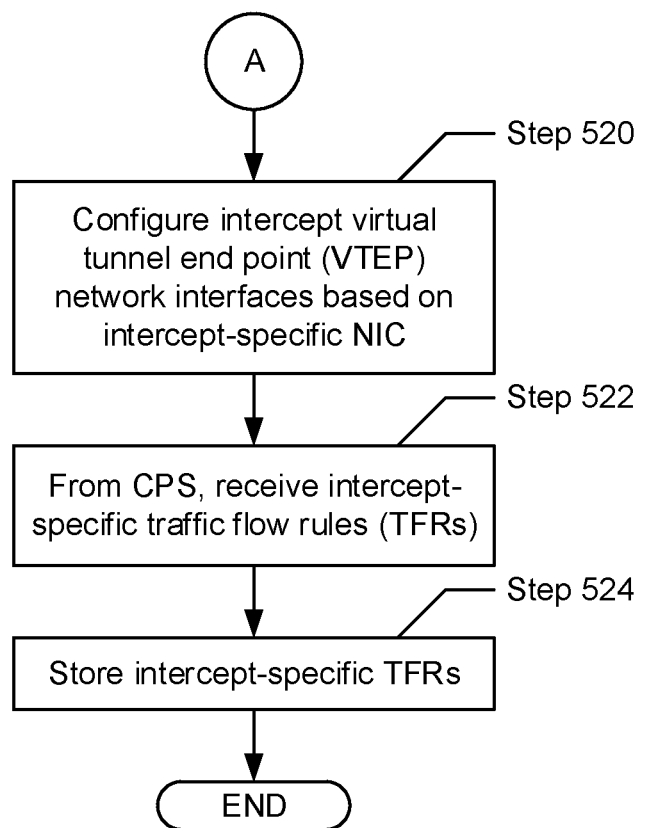

FIGS. 5A and 5B show flowcharts describing a method for receiving and processing control-plane information in accordance with one or more embodiments of the invention. The various steps outlined below may be performed by an intercept virtual tunnel end point (VTEP) (i.e., a VTEP behind which at least one intercept host lies). Further, while the various steps in the flowcharts are presented and described sequentially, one of ordinary skill will appreciate that some or all steps may be executed in different orders, may be combined or omitted, and some or all steps may be executed in parallel.

Turning to FIG. 5A, in Step 500, redirect criteria is received from a control-plane service (CPS) (see e.g., FIG. 1). In one embodiment of the invention, redirect criteria may refer to one or more service policies or rules, which specify requirements (to be matched) in order to steer or redirect network traffic towards a service device. Example service policies and/or rules, representative of redirect criteria, are further described above with respect to FIG. 3A. In Step 502, the redirect criteria (received in Step 500) is subsequently stored. Specifically, in one embodiment of the invention, the received redirect criteria may be stored in non-volatile (or persistent) memory on-board the network element on which the intercept VTEP may be executing.

In Step 504, also from the CPS, a media access control (MAC) programming instruction (MPI) set is received. In one embodiment of the invention, the MPI set may include one or more MPIs, where each MPI represents a computer readable instruction that specifies particular information and directs the updating of a MAC address table using the particular information. Further, the aforementioned particular information specified in each MPI may include, but is not limited to: an intercept host (or intercept virtual machine) MAC address; a reverse-service virtual network identifier (VNI) ID corresponding to a reverse-service virtual layer-2 (VL2) broadcast domain; and an intercept network interface (INI) (see e.g., FIG. 2) tag or reference.

In Step 506, a MAC address table (of the intercept VTEP) is updated using the MPI set (received in Step 504). Specifically, in one embodiment of the invention, a new table entry may be appended to the MAC address table or an existing table entry of the MAC address table may be modified based on the above-mentioned particular information specified in each MPI of the MPI set. More specifically, through the processing of each MPI, the MAC address table may be updated to include entries that map any and all intercept host (or intercept virtual machine) MAC address(es), specified in the redirect criteria, on the reverse-service VNI behind one or more INIs of the intercept VTEP.

In Step 508, also from the CPS, an intercept-specific network interface configuration (NIC) is received. In one embodiment of the invention, the intercept-specific NIC may refer to a computer readable script that outlines a desired configuration targeting one or more properties (or attributes) of one or more physical (or virtual) network interfaces of the intercept VTEP.

Turning to FIG. 5B, in Step 520, one or more physical (or virtual) network interfaces (of the intercept VTEP) are configured based on the intercept-specific NIC (received in Step 508). By way of example, a membership property (or attribute) belonging to an INI of the intercept VTEP may be configured such that the INI is enrolled as a member of the original VNI, the reverse-service VNI, and/or the forward-service VNI. Embodiments of the invention are not limited to the above-mentioned example.

In Step 522, also from the CPS, a set of intercept-specific traffic flow rules (TFRs) is received. In one embodiment of the invention, a flow (or a network traffic flow) may refer to a network traffic sequence (i.e., a sequence of packets) that shares L2 and/or L3 header information—e.g., a same source Internet Protocol (IP) and/or MAC address, a same destination IP and/or MAC address, a same VL2 broadcast domain tag, an ingress network interface ID for a physical or virtual network interface whereat the flow arrived, etc. An intercept-specific TFR, subsequently, may represent a flow-pertinent rule or policy that applies an action set (or statement) to a network traffic flow while the flow traverses the intercept VTEP, where the network traffic flow includes L2 and/or L3 information specified in a corresponding match set (or statement). Accordingly, a match set for an intercept-specific TFR may specify one or more header field values shared by a network traffic flow, whereas a corresponding action set for the intercept-specific TFR may dictate one or more actions (or functions) to be performed to/on the network traffic flow as the flow traverses the intercept VTEP. These actions and/or functions may include, but are not limited to, routing or bridging the network traffic flow, dropping the network traffic flow, modifying one or more header and/or data fields specified across the network traffic flow, etc.

By way of examples, the set of intercept-specific TFRs may specify the following instructions: (i) translate any ingress network traffic traversing an INI of the intercept VTEP from the original VL2 broadcast domain to the forward-service VL2 broadcast domain, where the source MAC address specified in the ingress network traffic is associated with an intercept host; (ii) translate any egress network traffic traversing an INI of the intercept VTEP from the reverse-service VL2 broadcast domain to the original VL2 broadcast domain; (iii) drop any broadcast egress network traffic, associated with the original VL2 broadcast domain, that traverses an INI of the intercept VTEP; (iv) drop any egress network traffic, associated with the reverse-service VL2 broadcast domain, that traverses an INI of the intercept VTEP, where the source MAC address specified in the egress network traffic is associated with an intercept host; and (v) drop any egress network traffic, associated with the forward-service VL2 broadcast domain, that traverses an INI of the intercept VTEP. Embodiments of the invention are not limited to the above-mentioned examples.

In Step 524, the set of intercept-specific TFRs (received in Step 508) is stored. Specifically, in one embodiment of the invention, the received set of intercept-specific TFRs may be stored in non-volatile (or persistent) memory on-board the network element on which the intercept VTEP may be executing.

Figure 6A:
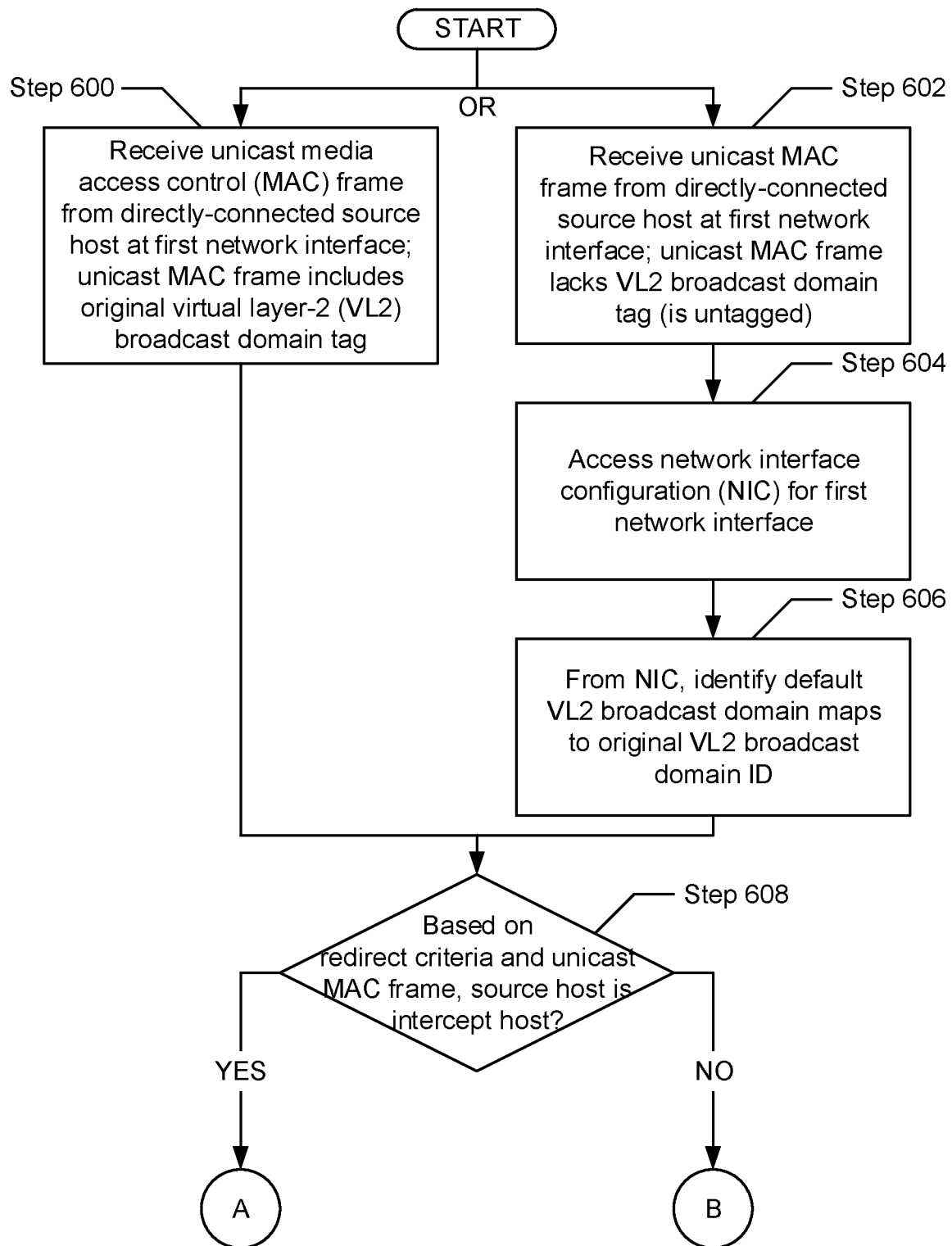
FIGS. 6A-6C show flowcharts describing a method for transmitting redirected unicast network traffic within a zone in accordance with one or more embodiments of the invention.
Figure 6B:
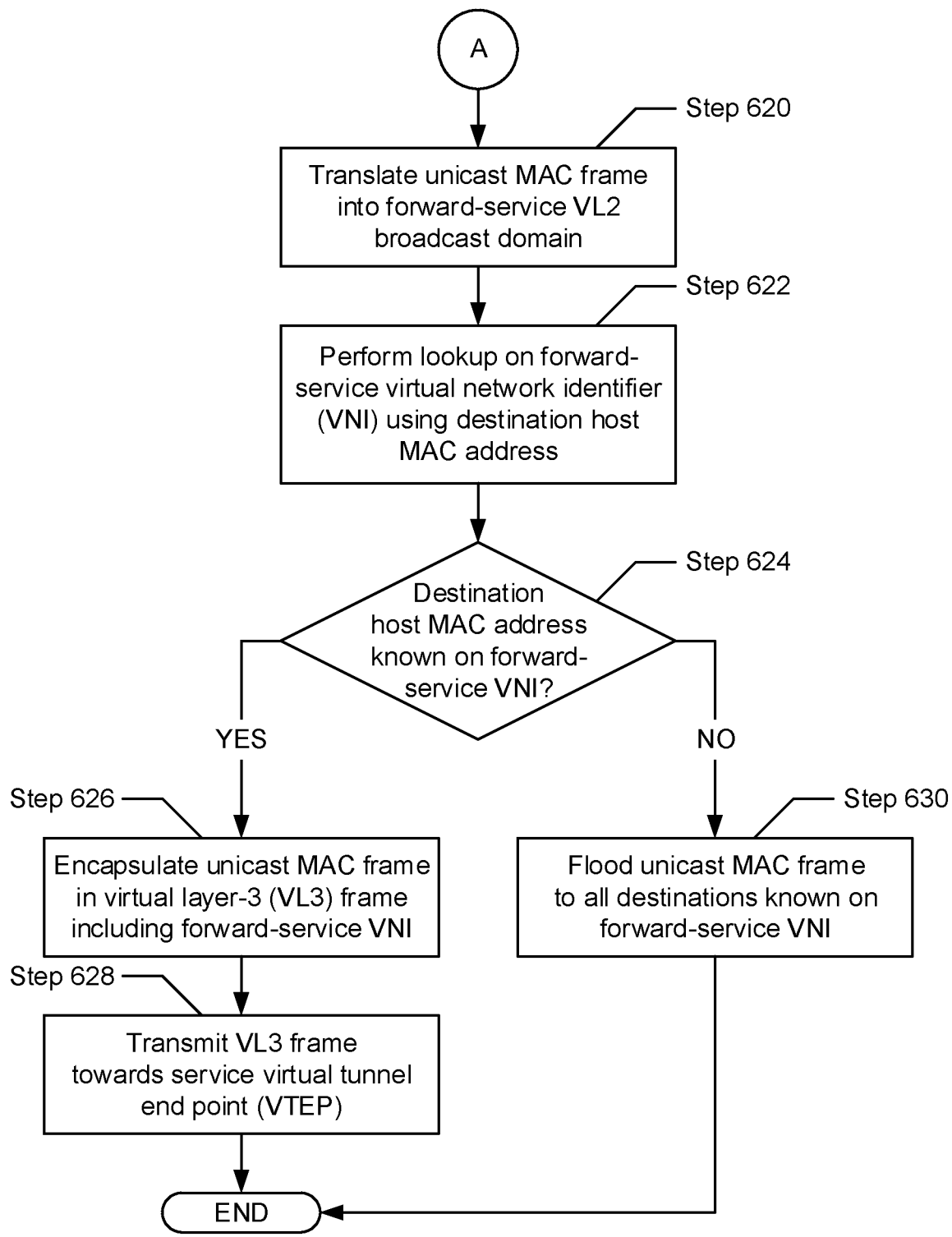
Figure 6C:
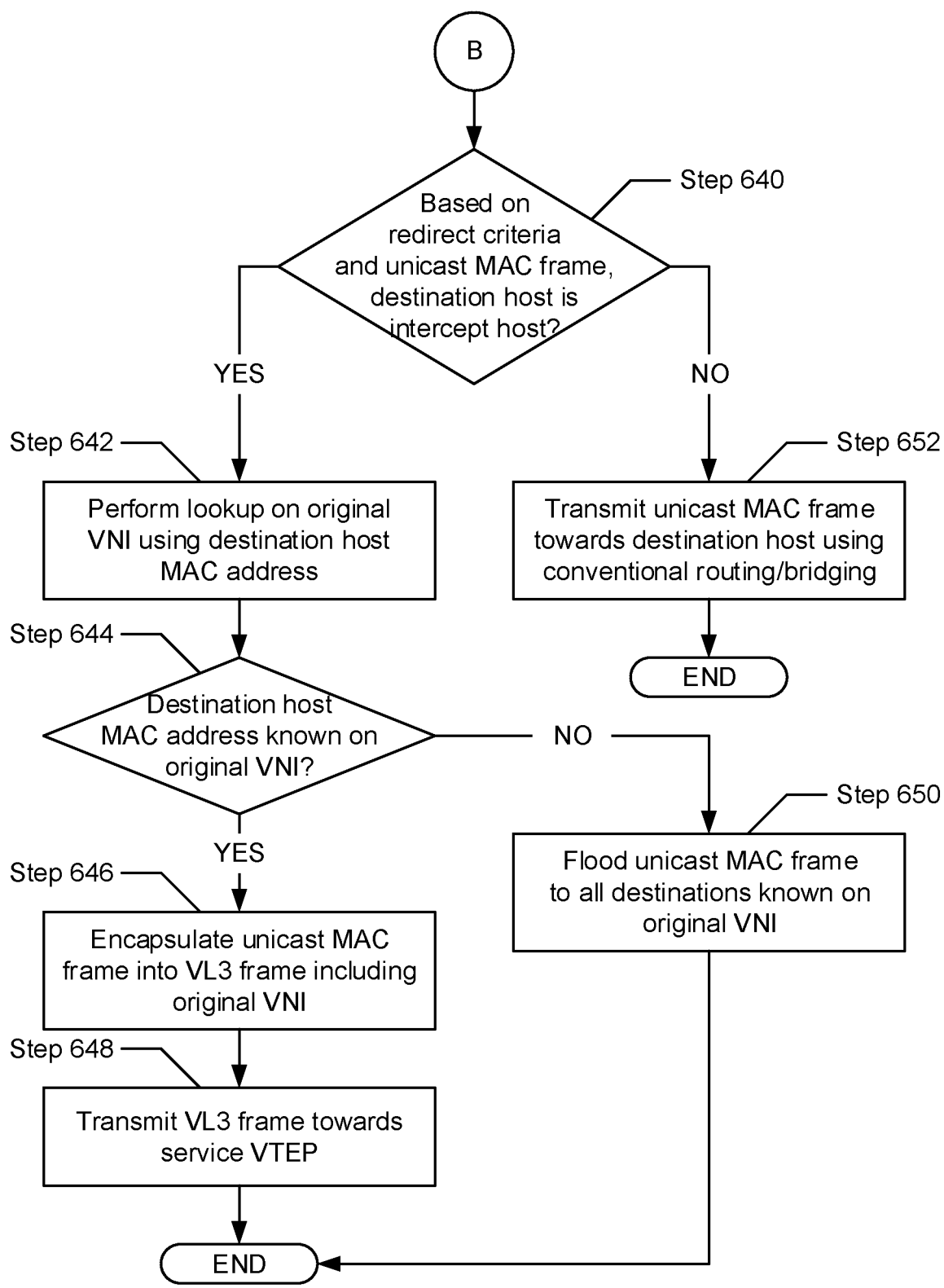

FIGS. 6A-6C show flowcharts describing a method for transmitting redirected unicast network traffic within a zone in accordance with one or more embodiments of the invention. The various steps outlined below may be performed by a non-service virtual tunnel end point (VTEP) (i.e., a VTEP not directly-connected to a service device). Further, while the various steps in the flowcharts are presented and described sequentially, one of ordinary skill will appreciate that some or all steps may be executed in different orders, may be combined or omitted, and some or all steps may be executed in parallel.

Turning to FIG. 6A, in Step 600, a unicast media access control (MAC) frame is received. In one embodiment of the invention, a unicast MAC frame may refer to a MAC frame addressed to a single destination host (or destination virtual machine). Further, the unicast MAC frame may have been generated and transmitted by, and thus, may have originated from a directly-connected source host (or source virtual machine). Moreover, in one embodiment of the invention, the unicast MAC frame may include or specify an original virtual layer-2 (VL2) broadcast domain tag (e.g., an original virtual local area network (VLAN) tag). The original VL2 broadcast domain tag may include information that identifies the unicast MAC frame as being associated with an original VL2 broadcast domain (e.g., an original VLAN). The original VL2 broadcast domain tag may include additional information without departing from the scope of the invention.

In another embodiment of the invention, in Step 602, a unicast MAC frame lacking a VL2 broadcast domain tag may be received. Accordingly, the unicast MAC frame may be received untagged. In such an embodiment, based on identifying that the unicast MAC frame is untagged, in Step 604, a network interface configuration (NIC) for the network interface, through which the untagged unicast MAC frame had been received, is accessed. In one embodiment of the invention, the NIC for the network interface may track various properties (or attributes) associated with the network interface. By way an example, the NIC for the network interface may track a membership property (or attribute) belonging to the network interface, which may identify one or more virtual network identifiers (VNIs), including a default VNI, of which the network interface may be enrolled as a member.

In Step 606, from the NIC (accessed in Step 604), the default VNI of which the network interface (i.e., through which the untagged unicast MAC frame had been received) is a member is identified. Specifically, as mentioned above, the default VNI may be identified by examining a membership property (or attribute) disclosed in the NIC of the network interface. Further, the default VNI may subsequently identify the corresponding default VL2 broadcast domain with which the default VNI is associated. Accordingly, in one embodiment of the invention, the identified default VNI for the network interface may identify the original VL2 broadcast domain as the default VL2 broadcast domain associated with the default VNI. In one or more other embodiments of the invention, the identified default VNI for the network interface may alternatively identify any other VL2 broadcast domain as the default VL2 broadcast domain associated with the default VNI. Hereinafter, the header field of the unicast MAC frame associated with the VL2 broadcast domain tag may subsequently be modified to include the default VL2 broadcast domain tag (e.g., the original VL2 broadcast domain tag).

In Step 608, after receipt of the unicast MAC frame (either in Step 600 or through Steps 602 to 606), a determination is made as to whether the source host is an intercept host. In one embodiment of the invention, an intercept host may refer to a host where network traffic therefrom and/or thereto may be intercepted and inspected by a service device. Identification of the source host as an intercept host may be determined based on one or more service policies (specified in redirect criteria (described above)) and header information specified in the unicast MAC frame. For example, the source host may be recognized as an intercept host because the source host MAC address (specified in the header information of the unicast MAC frame) is tied to a service policy or rule specified in the redirect criteria. By way of another example, the source host may be recognized as an intercept host because the source host IP address (specified in header information of the unicast MAC frame) is tied to a service policy or rule specified in the redirect criteria.

In one embodiment of the invention, if it is determined that the source host (or source virtual machine) is tied to any service policy or rule specified in the redirect criteria, then the source host (or source virtual machine) is recognized as an intercept host. Accordingly, based on this determination, the process may proceed to Step 620 (see e.g., FIG. 6B). On the other hand, in another embodiment of the invention, if it is alternatively determined that the source host (or source virtual machine) is not tied to any service policy or rule specified in the redirect criteria, then the source host (or source virtual machine) is recognized as a non-intercept host (or virtual machine). Accordingly, based on this determination, the process may alternatively proceed to Step 640 (see e.g., FIG. 6C).

Turning to FIG. 6B, in Step 620, after determining (in Step 608) that the source host (or source virtual machine) is an intercept host (or virtual machine), the unicast MAC frame (received in Step 600 or 602) is translated into the forward-service VL2 broadcast domain. In one embodiment of the invention, this translation may transpire because of an intercept-specific traffic flow rule (TFR) (described above)—e.g., dictating the translation of any ingress network traffic (i.e., the unicast MAC frame) traversing an intercept network interface (INI) (see e.g., FIG. 2) of an intercept VTEP from the original VL2 broadcast domain to the forward-service VL2 broadcast domain, where the source MAC address specified in the ingress network traffic is associated with an intercept host. Furthermore, the aforementioned translation may entail replacing the original VL2 broadcast domain tag, specified in header information of the unicast MAC frame, with a forward-service VL2 broadcast domain tag. The forward-service VL2 broadcast domain tag may include information that identifies the unicast MAC frame as being associated with a forward-service VL2 broadcast domain. The forward-service VL2 broadcast domain tag may include additional information without departing from the scope of the invention.

In Step 622, a lookup is performed on a forward-service virtual network identifier (VNI) using a destination host (or destination virtual machine) MAC address specified in header information of the unicast MAC frame. In one embodiment of the invention, the forward-service VNI may identify with a forward-service VL2 broadcast domain. Further, the forward-service VL2 broadcast domain may be implemented as a unique, unidirectional overlay tunnel (e.g., a virtual extensible local area network (VXLAN) tunnel) through which network traffic, intercepted based on redirect criteria, may be redirected to a service device for inspection. Should any host MAC address be known on the forward-service VNI, network traffic sourced from and/or addressed to that host MAC address may be redirected to a near network interface (NNI) of a service VTEP, behind which the service device may reside.

Moreover, in one embodiment of the invention, the above-mentioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 624, based on the lookup (performed in Step 622), a determination is made as to whether the destination host (or destination virtual machine) MAC address is known on the forward-service VNI. In one embodiment of the invention, if it is determined that an entry in the MAC-to-VNI table maps the destination host (or destination virtual machine) MAC address to at least the forward-service VNI, then the destination host/virtual machine MAC address is recognized as being known on the forward-service VNI. Accordingly, based on this determination, the process may proceed to Step 626. On the other hand, in another embodiment of the invention, if it is alternatively determined that an entry in the MAC-to-VNI table fails to map the destination host (or destination virtual machine) MAC address to at least the forward-service VNI, then the destination host/virtual machine MAC address is recognized as being unknown on the forward-service VNI. Accordingly, based on this determination, the process may alternatively proceed to Step 630.

In Step 626, after determining (in Step 624) that the destination host (or destination virtual machine) MAC address is known on the forward-service VNI, a network interface out of which the unicast MAC frame may be transmitted, towards the destination host/virtual machine, is identified. In one embodiment of the invention, the aforementioned network interface, entailing either a physical or virtual network interface, may be identified through the performance of a lookup on a MAC address table using the destination host (or destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through a certain network interface, leading to a service VTEP, and using an overlay tunnel that implements the forward-service VL2 broadcast domain. Subsequently, the unicast MAC frame may be encapsulated in a virtual layer-3 (VL3) frame such as, for example, a VXLAN frame, where the VL3 frame may include header information that specifies, at least in part, the forward-service VNI.

In Step 628, the VL3 frame (obtained in Step 626) is transmitted, through an L3 fabric (see e.g., FIG. 1), towards the service VTEP. Specifically, in one embodiment of the invention, the VL3 frame may traverse through an overlay tunnel—i.e., representative of the forward-service VL2 broadcast domain—that originates at the non-service VTEP (which had obtained the unicast MAC frame in Step 600 or 602) and, subsequently, terminates at the service VTEP, behind which a service device resides.

In Step 630, after determining (in Step 624) that the destination host (or destination virtual machine) MAC address is unknown on the forward-service VNI, the unicast MAC frame is flooded to all destinations known on the forward-service VNI. In one embodiment of the invention, through MAC learning and/or the receipt of MAC programming instructions (MPIs) (described above), destinations known on the forward-service VNI may include, but are not limited to: (i) the near network interface (NNI) of a service VTEP, behind which a service device may reside; and (ii) at least one intercept network interface (INI) (see e.g., FIG. 2) of one or more intercept VTEPs, behind which at least one intercept host (or intercept virtual machine) may reside. Furthermore, based on the imposition of intercept-specific traffic flow rules (TFRs), copies of the unicast MAC frame, intended to be flooded to the at least one INI of one or more intercept VTEPs, may be dropped in order to reduce duplicate network traffic delivery. Accordingly, only the copy of the unicast MAC frame, intended to be flooded to the NNI of the service VTEP, may be released. In one embodiment of the invention, flooding of the unicast MAC frame to the NNI of the service VTEP may entail encapsulating the unicast MAC frame in a VL3 frame that specifies, at least in part, the forward-service VNI in header information and, thereafter, transmitting the VL3 frame towards the service VTEP through the L3 fabric.

Turning to FIG. 6C, in Step 640, after determining (in Step 608) that the source host (or source virtual machine) is a non-intercept host (or virtual machine), another determination is made as to whether the destination host (or destination virtual machine) is an intercept host (or virtual machine). Identification of the destination host as an intercept host may be determined based on one or more service policies (specified in redirect criteria (described above)) and header information specified in the unicast MAC frame. For example, the destination host may be recognized as an intercept host because the destination host MAC address (specified in the header information of the unicast MAC frame) is tied to a service policy or rule specified in the redirect criteria. By way of another example, the destination host may be recognized as an intercept host because the destination host IP address (specified in header information of the unicast MAC frame) is tied to a service policy or rule specified in the redirect criteria.

In one embodiment of the invention, if it is determined that the destination host (or destination virtual machine) is tied to any service policy or rule specified in the redirect criteria, then the destination host (or destination virtual machine) is recognized as an intercept host. Accordingly, based on this determination, the process may proceed to Step 642. On the other hand, in another embodiment of the invention, if it is alternatively determined that the destination host (or destination virtual machine) is not tied to any service policy or rule specified in the redirect criteria, then the destination host (or destination virtual machine) is recognized as a non-intercept host (or virtual machine). Accordingly, based on this determination, the process may alternatively proceed to Step 652.

In Step 642, after determining (in Step 640) that the destination host (or destination virtual machine) is an intercept host/virtual machine, a lookup is performed on an original VNI using the destination host (or destination virtual machine) MAC address specified in header information of the unicast MAC frame. In one embodiment of the invention, the original VNI may identify with an original VL2 broadcast domain. Further, the original VL2 broadcast domain may be implemented as a unique, bidirectional overlay tunnel (e.g., a VXLAN tunnel) through which network traffic, not sought for interception based on redirect criteria, may traverse the L3 fabric towards a destination. Should any host MAC address be known on the original VNI, network traffic sourced from and/or addressed to that host MAC address may be directed to a far network interface (FNI) of a service VTEP, behind which the service device may reside.

Moreover, in one embodiment of the invention, the above-mentioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 644, based on the lookup (performed in Step 642), a determination is made as to whether the destination host (or destination virtual machine) MAC address is known on the original VNI. In one embodiment of the invention, if it is determined that an entry in the MAC-to-VNI table maps the destination host (or destination virtual machine) MAC address to at least the original VNI, then the destination host/virtual machine MAC address is recognized as being known on the original VNI. Accordingly, based on this determination, the process may proceed to Step 646. On the other hand, in another embodiment of the invention, if it is alternatively determined that an entry in the MAC-to-VNI table fails to map the destination host (or destination virtual machine) MAC address to at least the original VNI, then the destination host/virtual machine MAC address is recognized as being unknown on the original VNI. Accordingly, based on this determination, the process may alternatively proceed to Step 650.

In Step 646, after determining (in Step 644) that the destination host (or destination virtual machine) MAC address is known on the original VNI, a network interface out of which the unicast MAC frame may be transmitted, towards the destination host/virtual machine, is identified. In one embodiment of the invention, the aforementioned network interface, entailing either a physical or virtual network interface, may be identified through the performance of a lookup on a MAC address table using the destination host (or destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through a certain network interface, leading to a service VTEP, and using an overlay tunnel that implements the original VL2 broadcast domain. Subsequently, the unicast MAC frame may be encapsulated in a VL3 frame such as, for example, a VXLAN frame, where the VL3 frame may include header information that specifies, at least in part, the original VNI.

In Step 648, the VL3 frame (obtained in Step 646) is transmitted, through an L3 fabric (see e.g., FIG. 1), towards the service VTEP. Specifically, in one embodiment of the invention, the VL3 frame may traverse through an overlay tunnel—i.e., representative of the original VL2 broadcast domain—that originates at the non-service VTEP (which had obtained the unicast MAC frame in Step 600 or 602) and, subsequently, terminates at the service VTEP, behind which a service device resides.

In Step 650, after determining (in Step 644) that the destination host (or destination virtual machine) MAC address is unknown on the original VNI, the unicast MAC frame is flooded to all destinations known on the original VNI. In one embodiment of the invention, through MAC learning and/or the receipt of MAC programming instructions (MPIs) (described above), destinations known on the original VNI may include, but are not limited to: the far network interface (FNI) of a service VTEP, behind which a service device may reside. Accordingly, a copy of the unicast MAC frame, intended to be flooded to the FNI of the service VTEP, may be transmitted thereto. In one embodiment of the invention, flooding of the unicast MAC frame to the FNI of the service VTEP may entail encapsulating the unicast MAC frame in a VL3 frame that specifies, at least in part, the original VNI in header information and, thereafter, transmitting the VL3 frame towards the service VTEP through the L3 fabric.

In Step 652, after determining (in Step 640) that the destination host (or destination virtual machine) is a non-intercept host/virtual machine, the unicast MAC frame is transmitted towards the destination host/virtual machine using conventional routing and/or bridging.

Figure 7A:
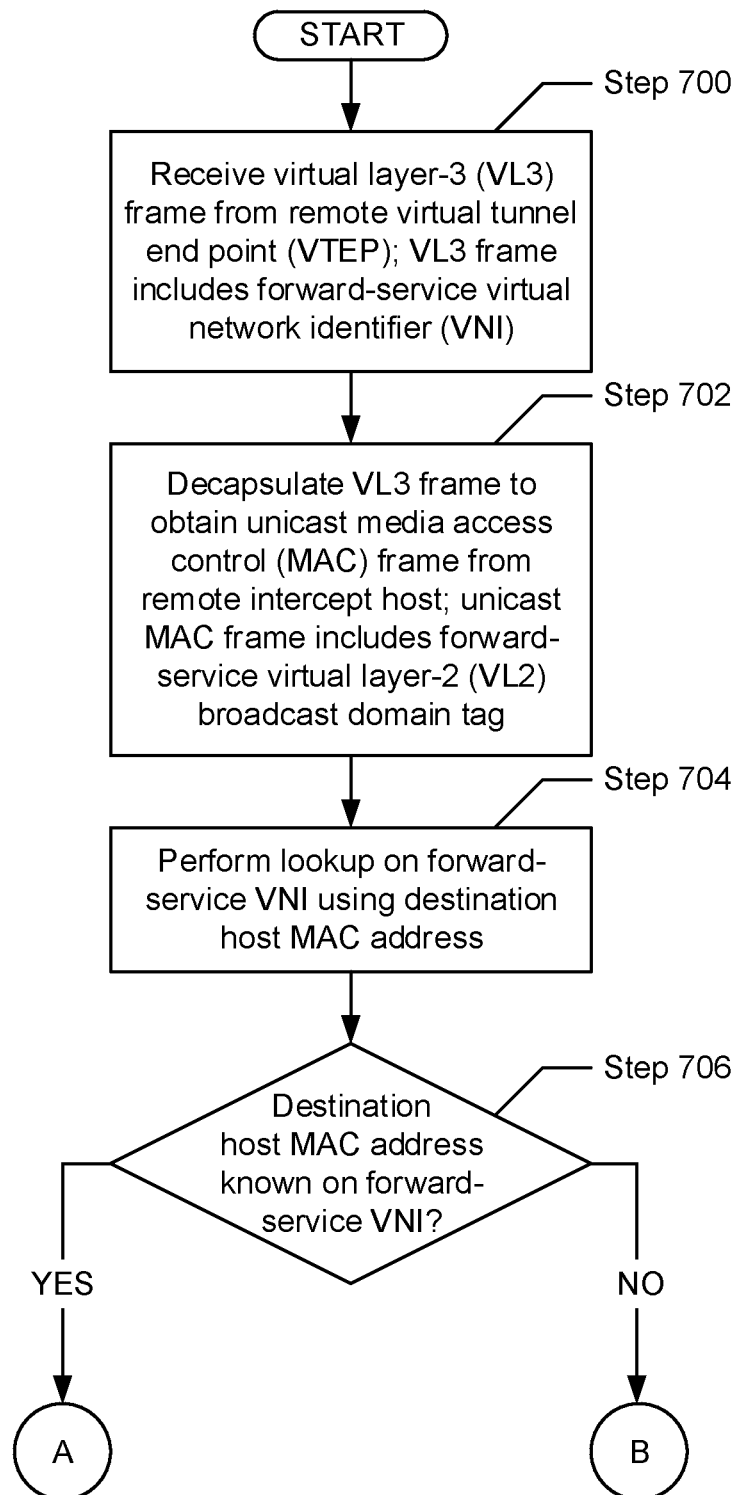
FIGS. 7A-7C show flowcharts describing a method for receiving redirected unicast network traffic within a zone in accordance with one or more embodiments of the invention.
Figure 7B:
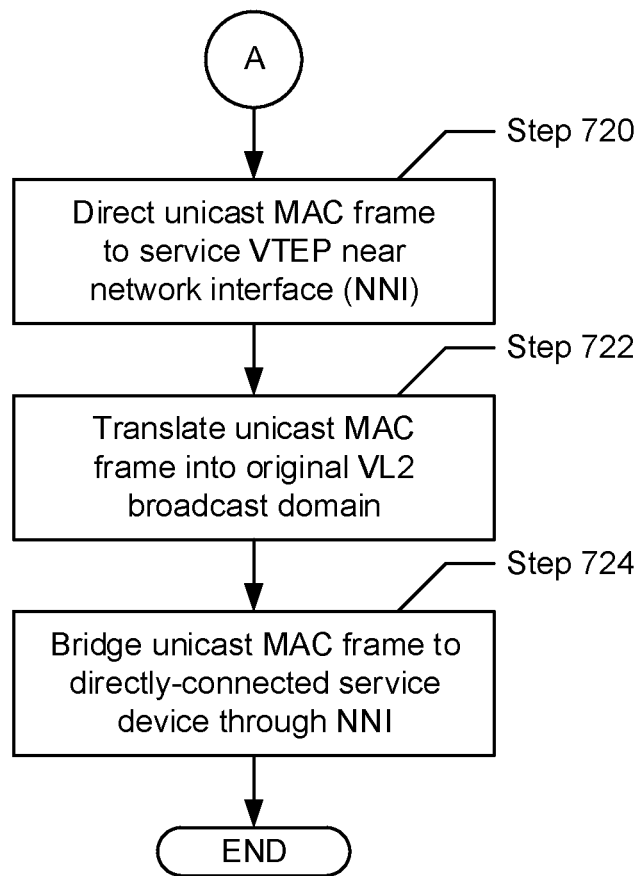
Figure 7C:
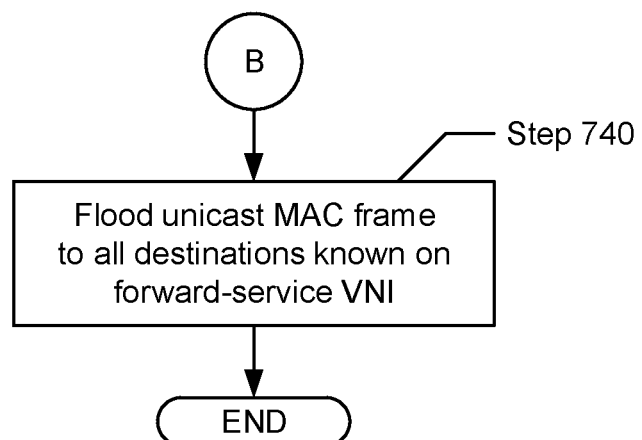

FIGS. 7A-7C show flowcharts describing a method for receiving redirected unicast network traffic within a zone in accordance with one or more embodiments of the invention. The various steps outlined below may be performed by a service virtual tunnel end point (VTEP) (i.e., a VTEP directly-connected to a service device). Further, while the various steps in the flowcharts are presented and described sequentially, one of ordinary skill will appreciate that some or all steps may be executed in different orders, may be combined or omitted, and some or all steps may be executed in parallel.

Turning to FIG. 7A, in Step 700, a virtual layer-3 (VL3) frame is received. In one embodiment of the invention, the VL3 frame may have originated from a remote, non-service VTEP. Further, the VL3 frame may include or specify a forward-service virtual network identifier (VNI) within header information. The forward-service VNI may identify with a forward-service virtual layer-2 (VL2) broadcast domain. Moreover, the forward-service VL2 broadcast domain may be implemented as a unique, unidirectional overlay tunnel (e.g., a virtual extensible local area network (VXLAN) tunnel) through which network traffic, intercepted based on redirect criteria, may have been redirected to a service device for inspection.

In Step 702, the VL3 frame (received in Step 700) is decapsulated. Specifically, in one embodiment of the invention, decapsulation may entail removing the L3 header information included or specified in the VL3 frame, thereby exposing a unicast media access control (MAC) frame enclosed therein. The unicast MAC frame may have originated from a remote, intercept host (or intercept virtual machine). Furthermore, the unicast MAC frame may include or specify a forward-service VL2 broadcast domain tag (e.g., a forward-service virtual local area network (VLAN) tag). The forward-service VL2 broadcast domain tag may include information that identifies the unicast MAC frame as being associated with a forward-service VL2 broadcast domain. The forward-service VL2 broadcast domain tag may include additional information without departing from the scope of the invention.

In Step 704, a lookup is performed on a forward-service virtual network identifier (VNI) using a destination host (or destination virtual machine) MAC address specified in header information of the unicast MAC frame. In one embodiment of the invention, the forward-service VNI may identify with the forward-service VL2 broadcast domain. Should any host MAC address be known on the forward-service VNI, network traffic sourced from and/or addressed to that host MAC address may be redirected to a near network interface (NNI) of the service VTEP, behind which the service device may reside.

Moreover, in one embodiment of the invention, the above-mentioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 706, based on the lookup (performed in Step 704), a determination is made as to whether the destination host (or destination virtual machine) MAC address is known on the forward-service VNI. In one embodiment of the invention, if it is determined that an entry in the MAC-to-VNI table maps the destination host (or destination virtual machine) MAC address to at least the forward-service VNI, then the destination host/virtual machine MAC address is recognized as being known on the forward-service VNI. Accordingly, based on this determination, the process may proceed to Step 720 (see e.g., FIG. 7B). On the other hand, in another embodiment of the invention, if it is alternatively determined that an entry in the MAC-to-VNI table fails to map the destination host (or destination virtual machine) MAC address to at least the forward-service VNI, then the destination host/virtual machine MAC address is recognized as being unknown on the forward-service VNI. Accordingly, based on this determination, the process may alternatively proceed to Step 740 (see e.g., FIG. 7C).

Turning to FIG. 7B, in Step 720, after determining (in Step 706) that the destination host (or destination virtual machine) MAC address is known on the forward-service VNI, a network interface out of which the unicast MAC frame may be transmitted, towards the service device, is identified. In one embodiment of the invention, the aforementioned network interface, entailing either a physical or virtual network interface, may be identified through the performance of a lookup on a MAC address table using the destination host (or destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through the near network interface (NNI) of the service VTEP. Accordingly, based on this determination, the unicast MAC frame may be directed to the NNI of the service VTEP.

In Step 722, the unicast MAC frame is subsequently translated into the original VL2 broadcast domain. In one embodiment of the invention, this translation may transpire because of a service-specific traffic flow rule (TFR) (described above)—e.g., dictating the translation of any egress network traffic (i.e., the unicast MAC frame) traversing the NNI of the service VTEP from the forward-service VL2 broadcast domain to the original VL2 broadcast domain. Furthermore, the aforementioned translation may entail replacing the forward-service VL2 broadcast domain tag, specified in header information of the unicast MAC frame, with an original VL2 broadcast domain tag. The original VL2 broadcast domain tag may include information that identifies the unicast MAC frame as being associated with the original VL2 broadcast domain. The original VL2 broadcast domain tag may include additional information without departing from the scope of the invention. In Step 724, after the translation (performed in Step 722), the unicast MAC frame is bridged across the NNI of the service VTEP to a directly-connected service device.

Turning to FIG. 7C, in Step 740, after determining (in Step 706) that the destination host (or destination virtual machine) MAC address is unknown on the forward-service VNI, the unicast MAC frame is flooded to all destinations known on the forward-service VNI. In one embodiment of the invention, through MAC learning and/or the receipt of MAC programming instructions (MPIs) (described above), destinations known on the forward-service VNI may include, but are not limited to: the NNI of the service VTEP, behind which a service device may reside. Accordingly, a copy of the unicast MAC frame may find its way to the directly-connected service device via traversal of the NNI of the service VTEP.

Figure 8A:
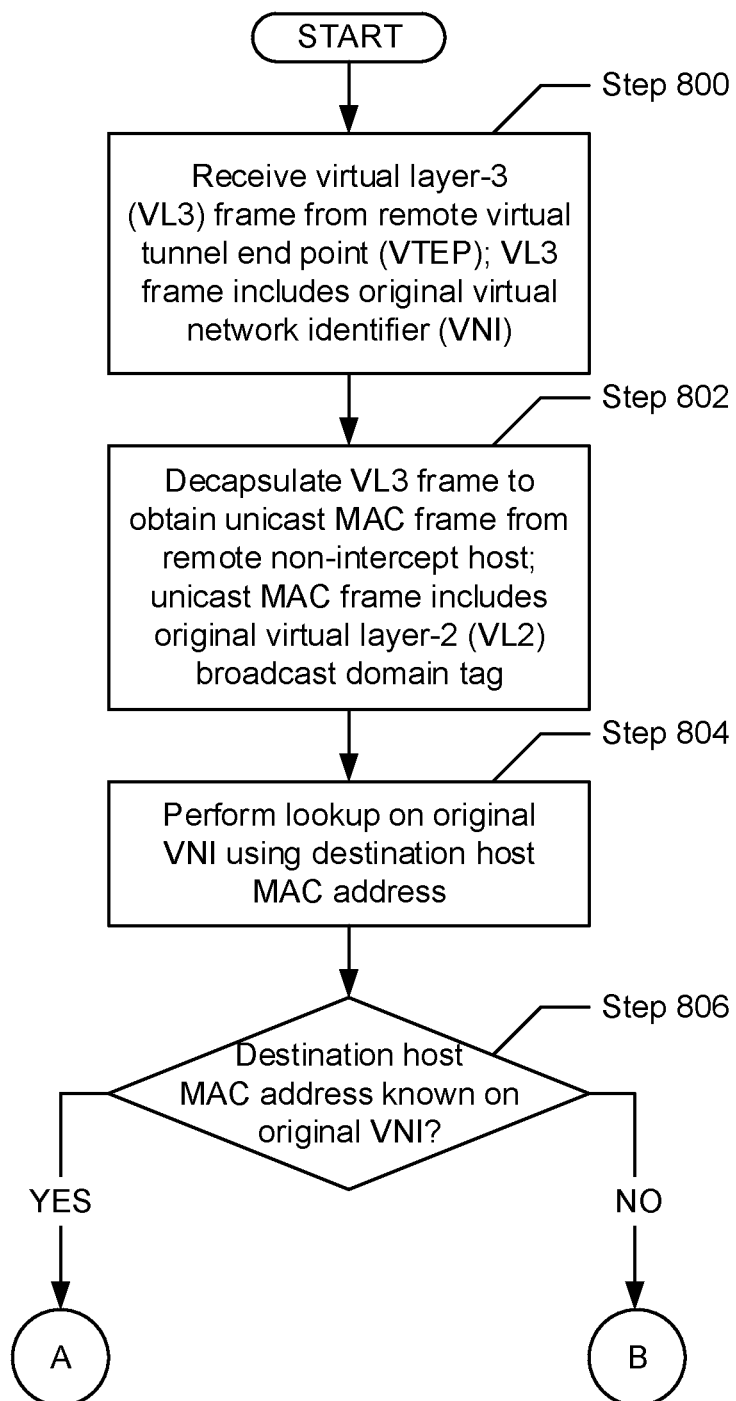
FIGS. 8A-8C show flowcharts describing a method for receiving redirected unicast network traffic within a zone in accordance with one or more embodiments of the invention.
Figure 8B:
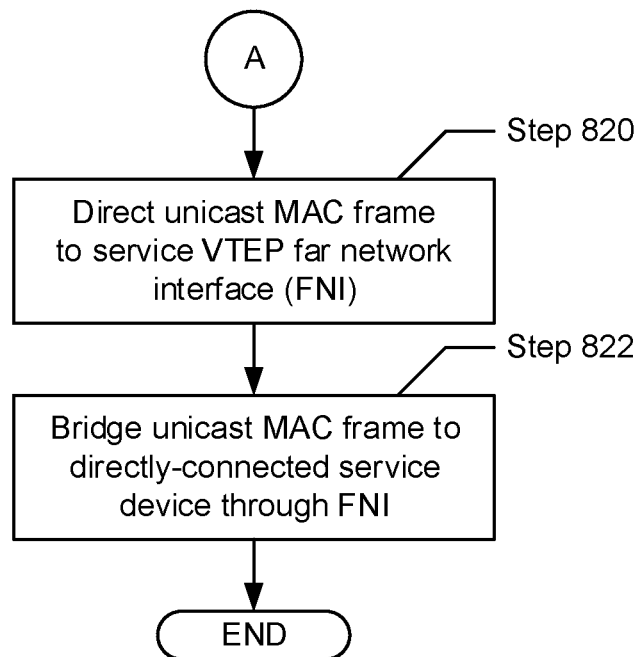
Figure 8C:
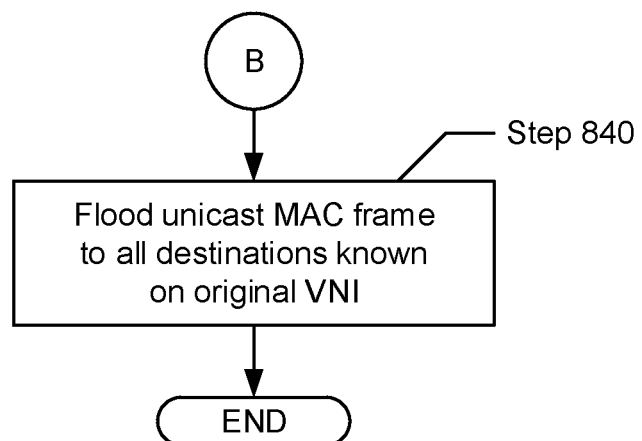

FIGS. 8A-8C show flowcharts describing a method for receiving redirected unicast network traffic within a zone in accordance with one or more embodiments of the invention. The various steps outlined below may be performed by a service virtual tunnel end point (VTEP) (i.e., a VTEP directly-connected to a service device). Further, while the various steps in the flowcharts are presented and described sequentially, one of ordinary skill will appreciate that some or all steps may be executed in different orders, may be combined or omitted, and some or all steps may be executed in parallel.

Turning to FIG. 8A, in Step 800, a virtual layer-3 (VL3) frame is received. In one embodiment of the invention, the VL3 frame may have originated from a remote, non-service VTEP. Further, the VL3 frame may include or specify an original virtual network identifier (VNI) within header information. The original VNI may identify with an original virtual layer-2 (VL2) broadcast domain. Moreover, the original VL2 broadcast domain may be implemented as a unique, bidirectional overlay tunnel (e.g., a VXLAN tunnel) through which network traffic, not sought for interception based on redirect criteria, may traverse the L3 fabric towards a destination.

In Step 802, the VL3 frame (received in Step 800) is decapsulated. Specifically, in one embodiment of the invention, decapsulation may entail removing the L3 header information included or specified in the VL3 frame, thereby exposing a unicast media access control (MAC) frame enclosed therein. The unicast MAC frame may have originated from a remote, non-intercept host (or non-intercept virtual machine). Furthermore, the unicast MAC frame may include or specify an original VL2 broadcast domain tag (e.g., an original virtual local area network (VLAN) tag). The original VL2 broadcast domain tag may include information that identifies the unicast MAC frame as being associated with the original VL2 broadcast domain. The original VL2 broadcast domain tag may include additional information without departing from the scope of the invention.

In Step 804, a lookup is performed on an original virtual network identifier (VNI) using a destination host (or destination virtual machine) MAC address specified in header information of the unicast MAC frame. In one embodiment of the invention, the original VNI may identify with the original VL2 broadcast domain. Should any host MAC address be known on the original VNI, network traffic sourced from and/or addressed to that host MAC address may be redirected to a far network interface (FNI) of the service VTEP, behind which the service device may reside.

Moreover, in one embodiment of the invention, the above-mentioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 806, based on the lookup (performed in Step 804), a determination is made as to whether the destination host (or destination virtual machine) MAC address is known on the original VNI. In one embodiment of the invention, if it is determined that an entry in the MAC-to-VNI table maps the destination host (or destination virtual machine) MAC address to at least the original VNI, then the destination host/virtual machine MAC address is recognized as being known on the original VNI. Accordingly, based on this determination, the process may proceed to Step 820 (see e.g., FIG. 8B). On the other hand, in another embodiment of the invention, if it is alternatively determined that an entry in the MAC-to-VNI table fails to map the destination host (or destination virtual machine) MAC address to at least the original VNI, then the destination host/virtual machine MAC address is recognized as being unknown on the original VNI. Accordingly, based on this determination, the process may alternatively proceed to Step 840 (see e.g., FIG. 8C).

Turning to FIG. 8B, in Step 820, after determining (in Step 806) that the destination host (or destination virtual machine) MAC address is known on the original VNI, a network interface out of which the unicast MAC frame may be transmitted, towards the service device, is identified. In one embodiment of the invention, the aforementioned network interface, entailing either a physical or virtual network interface, may be identified through the performance of a lookup on a MAC address table using the destination host (or destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through the FNI of the service VTEP. Accordingly, based on this determination, the unicast MAC frame may be directed to the FNI of the service VTEP. Thereafter, in Step 822, the unicast MAC frame is subsequently bridged across the FNI of the service VTEP to a directly-connected service device.

Turning to FIG. 8C, in Step 840, after determining (in Step 806) that the destination host (or destination virtual machine) MAC address is unknown on the original VNI, the unicast MAC frame is flooded to all destinations known on the original VNI. In one embodiment of the invention, through MAC learning and/or the receipt of MAC programming instructions (MPIs) (described above), destinations known on the original VNI may include, but are not limited to: the FNI of the service VTEP, behind which a service device may reside. Accordingly, a copy of the unicast MAC frame may find its way to the directly-connected service device via traversal of the FNI of the service VTEP.

Figure 9A:
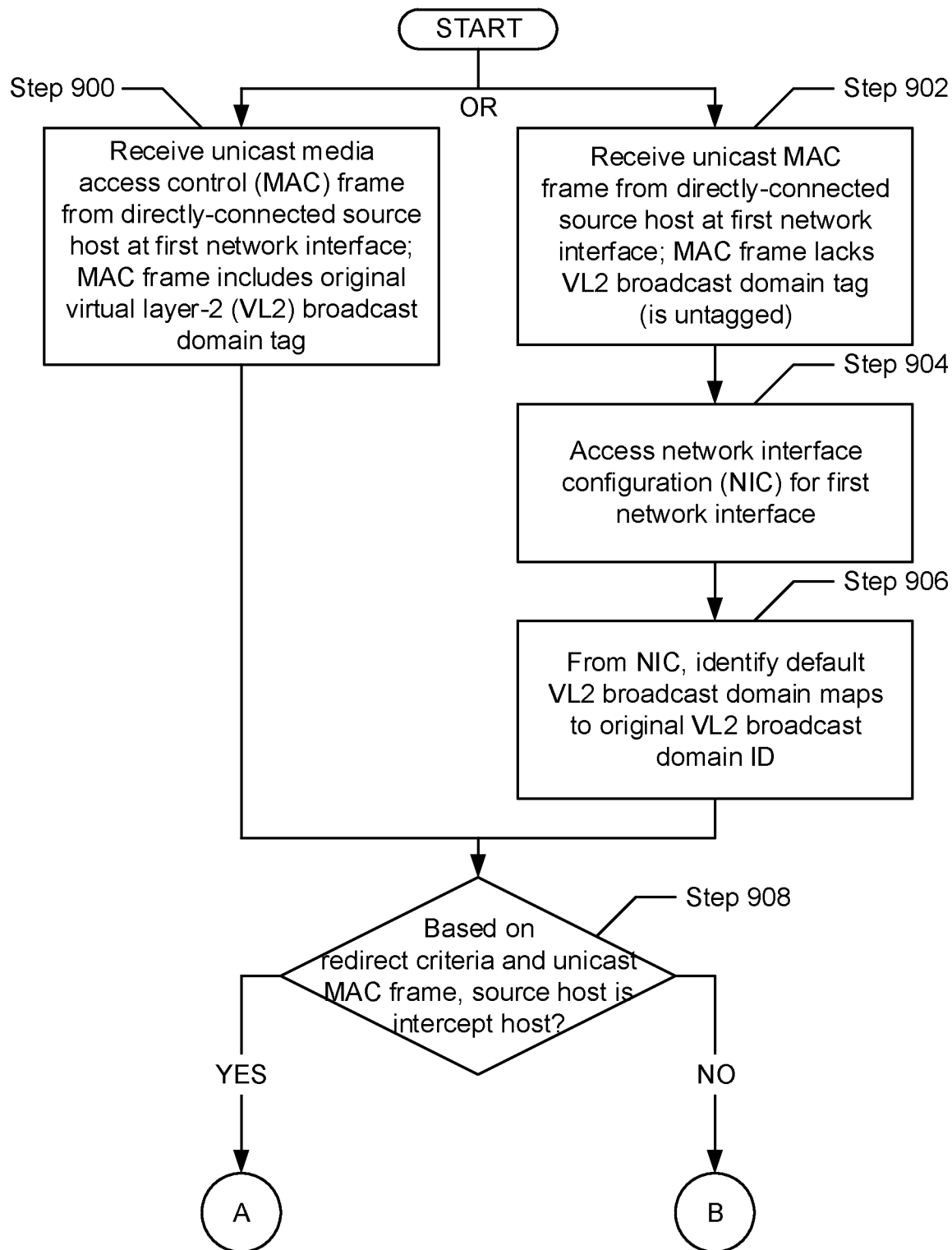
FIGS. 9A-9C show flowcharts describing a method for transmitting inspected unicast network traffic within a zone in accordance with one or more embodiments of the invention.
Figure 9B:
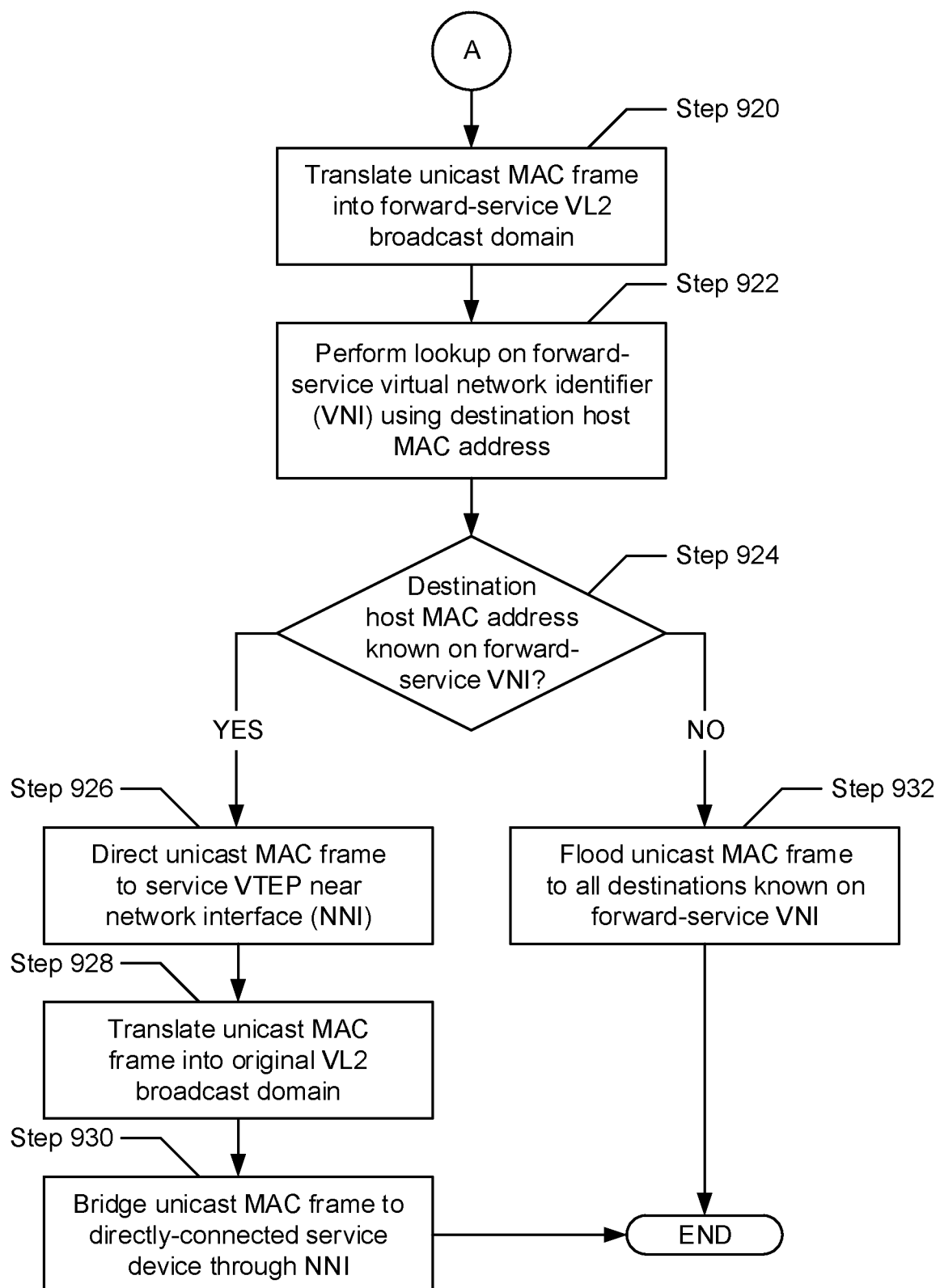
Figure 9C:
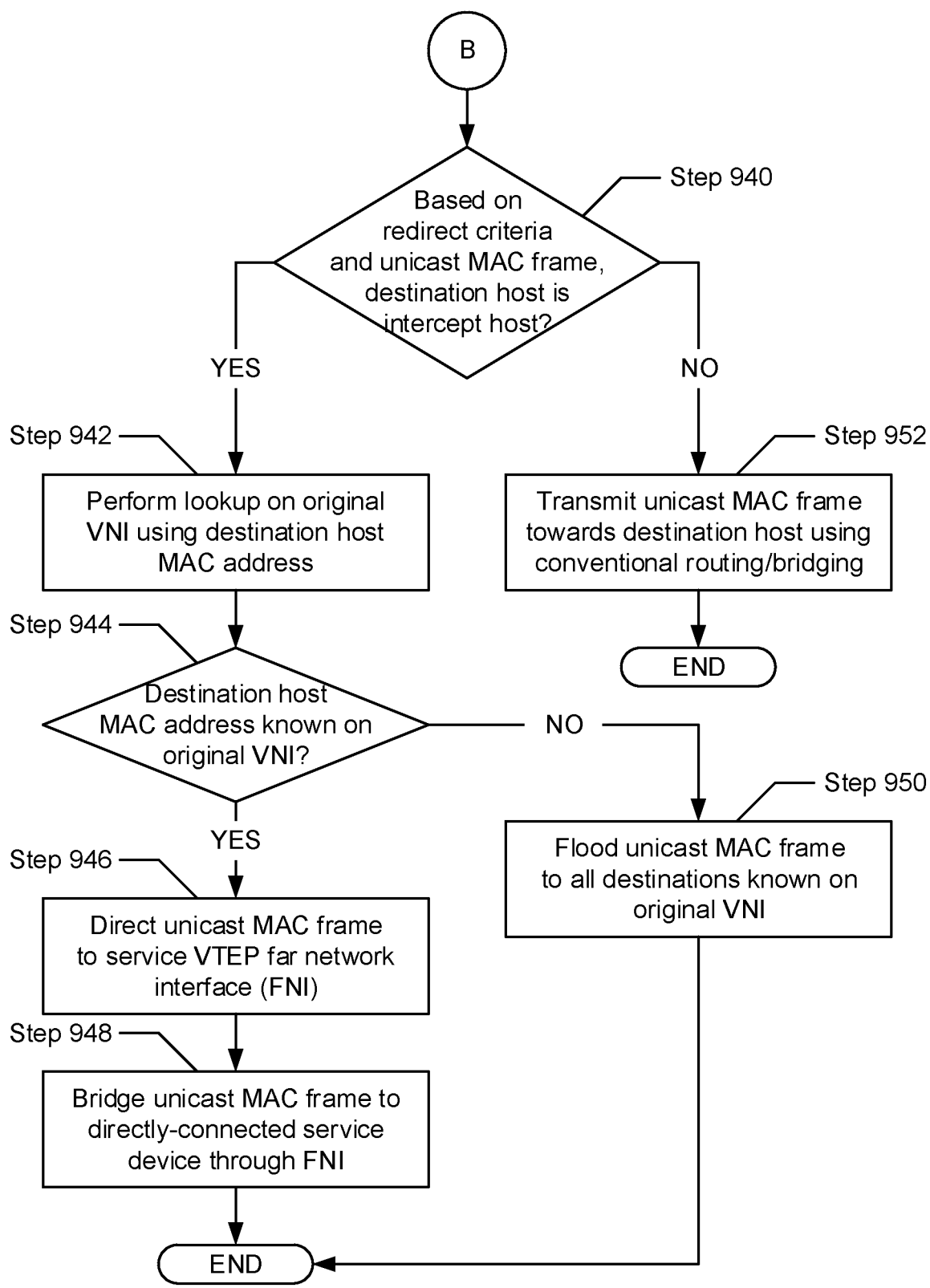

FIGS. 9A-9C show flowcharts describing a method for transmitting inspected unicast network traffic within a zone in accordance with one or more embodiments of the invention. The various steps outlined below may be performed by a service virtual tunnel end point (VTEP) (i.e., a VTEP directly-connected to a service device). Further, while the various steps in the flowcharts are presented and described sequentially, one of ordinary skill will appreciate that some or all steps may be executed in different orders, may be combined or omitted, and some or all steps may be executed in parallel.

Turning to FIG. 9A, in Step 900, a unicast media access control (MAC) frame is received. In one embodiment of the invention, a unicast MAC frame may refer to a MAC frame addressed to a single destination host (or destination virtual machine). Further, the unicast MAC frame may have been generated and transmitted by, and thus, may have originated from a directly-connected source host (or source virtual machine). Moreover, in one embodiment of the invention, the unicast MAC frame may include or specify an original virtual layer-2 (VL2) broadcast domain tag (e.g., an original virtual local area network (VLAN) tag). The original VL2 broadcast domain tag may include information that identifies the unicast MAC frame as being associated with an original VL2 broadcast domain (e.g., an original VLAN). The original VL2 broadcast domain tag may include additional information without departing from the scope of the invention.

In another embodiment of the invention, in Step 902, a unicast MAC frame lacking a VL2 broadcast domain tag may be received. Accordingly, the unicast MAC frame may be received untagged. In such an embodiment, based on identifying that the unicast MAC frame is untagged, in Step 904, a network interface configuration (NIC) for the network interface, through which the untagged unicast MAC frame had been received, is accessed. In one embodiment of the invention, the NIC for the network interface may track various properties (or attributes) associated with the network interface. By way an example, the NIC for the network interface may track a membership property (or attribute) belonging to the network interface, which may identify one or more virtual network identifiers (VNIs), including a default VNI, of which the network interface may be enrolled as a member.

In Step 906, from the NIC (accessed in Step 904), the default VNI of which the network interface (i.e., through which the untagged unicast MAC frame had been received) is a member is identified. Specifically, as mentioned above, the default VNI may be identified by examining a membership property (or attribute) disclosed in the NIC of the network interface. Further, the default VNI may subsequently identify the corresponding default VL2 broadcast domain with which the default VNI is associated. Accordingly, in one embodiment of the invention, the identified default VNI for the network interface may identify the original VL2 broadcast domain as the default VL2 broadcast domain associated with the default VNI. In one or more other embodiments of the invention, the identified default VNI for the network interface may alternatively identify any other VL2 broadcast domain as the default VL2 broadcast domain associated with the default VNI. Hereinafter, the header field of the unicast MAC frame associated with the VL2 broadcast domain tag may subsequently be modified to include the default VL2 broadcast domain tag (e.g., the original VL2 broadcast domain tag).

In Step 908, after receipt of the unicast MAC frame (either in Step 900 or through Steps 902 to 906), a determination is made as to whether the source host is an intercept host. In one embodiment of the invention, an intercept host may refer to a host where network traffic therefrom and/or thereto may be intercepted and inspected by a service device. Identification of the source host as an intercept host may be determined based on one or more service policies (specified in redirect criteria (described above)) and header information specified in the unicast MAC frame. For example, the source host may be recognized as an intercept host because the source host MAC address (specified in the header information of the unicast MAC frame) is tied to a service policy or rule specified in the redirect criteria. By way of another example, the source host may be recognized as an intercept host because the source host IP address (specified in header information of the unicast MAC frame) is tied to a service policy or rule specified in the redirect criteria.

In one embodiment of the invention, if it is determined that the source host (or source virtual machine) is tied to any service policy or rule specified in the redirect criteria, then the source host (or source virtual machine) is recognized as an intercept host. Accordingly, based on this determination, the process may proceed to Step 920 (see e.g., FIG. 9B). On the other hand, in another embodiment of the invention, if it is alternatively determined that the source host (or source virtual machine) is not tied to any service policy or rule specified in the redirect criteria, then the source host (or source virtual machine) is recognized as a non-intercept host (or virtual machine). Accordingly, based on this determination, the process may alternatively proceed to Step 940 (see e.g., FIG. 9C).

Turning to FIG. 9B, in Step 920, after determining (in Step 908) that the source host (or source virtual machine) is an intercept host (or virtual machine), the unicast MAC frame (received in Step 900 or 902) is translated into the forward-service VL2 broadcast domain. In one embodiment of the invention, this translation may transpire because of an intercept-specific traffic flow rule (TFR) (described above)—e.g., dictating the translation of any ingress network traffic (i.e., the unicast MAC frame) traversing an intercept network interface (INI) (see e.g., FIG. 2) of an intercept VTEP from the original VL2 broadcast domain to the forward-service VL2 broadcast domain, where the source MAC address specified in the ingress network traffic is associated with an intercept host. Furthermore, the aforementioned translation may entail replacing the original VL2 broadcast domain tag, specified in header information of the unicast MAC frame, with a forward-service VL2 broadcast domain tag. The forward-service VL2 broadcast domain tag may include information that identifies the unicast MAC frame as being associated with a forward-service VL2 broadcast domain. The forward-service VL2 broadcast domain tag may include additional information without departing from the scope of the invention.

In Step 922, a lookup is performed on a forward-service virtual network identifier (VNI) using a destination host (or destination virtual machine) MAC address specified in header information of the unicast MAC frame. In one embodiment of the invention, the forward-service VNI may identify with a forward-service VL2 broadcast domain. Further, the forward-service VL2 broadcast domain may be implemented as a unique, unidirectional overlay tunnel (e.g., a virtual extensible local area network (VXLAN) tunnel) through which network traffic, intercepted based on redirect criteria, may be redirected to a service device for inspection. Should any host MAC address be known on the forward-service VNI, network traffic sourced from and/or addressed to that host MAC address may be redirected to a near network interface (NNI) of the service VTEP, behind which the service device may reside.

Moreover, in one embodiment of the invention, the above-mentioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 924, based on the lookup (performed in Step 922), a determination is made as to whether the destination host (or destination virtual machine) MAC address is known on the forward-service VNI. In one embodiment of the invention, if it is determined that an entry in the MAC-to-VNI table maps the destination host (or destination virtual machine) MAC address to at least the forward-service VNI, then the destination host/virtual machine MAC address is recognized as being known on the forward-service VNI. Accordingly, based on this determination, the process may proceed to Step 926. On the other hand, in another embodiment of the invention, if it is alternatively determined that an entry in the MAC-to-VNI table fails to map the destination host (or destination virtual machine) MAC address to at least the forward-service VNI, then the destination host/virtual machine MAC address is recognized as being unknown on the forward-service VNI. Accordingly, based on this determination, the process may alternatively proceed to Step 932.

In Step 926, after determining (in Step 924) that the destination host (or destination virtual machine) MAC address is known on the forward-service VNI, a network interface out of which the unicast MAC frame may be transmitted, towards the service device, is identified. In one embodiment of the invention, the aforementioned network interface, entailing either a physical or virtual network interface, may be identified through the performance of a lookup on a MAC address table using the destination host (or destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through the near network interface (NNI) of the service VTEP. Accordingly, based on this determination, the unicast MAC frame may be directed to the NNI of the service VTEP.

In Step 928, the unicast MAC frame is subsequently translated into the original VL2 broadcast domain. In one embodiment of the invention, this translation may transpire because of a service-specific traffic flow rule (TFR) (described above)—e.g., dictating the translation of any egress network traffic (i.e., the unicast MAC frame) traversing the NNI of the service VTEP from the forward-service VL2 broadcast domain to the original VL2 broadcast domain. Furthermore, the aforementioned translation may entail replacing the forward-service VL2 broadcast domain tag, specified in header information of the unicast MAC frame, with an original VL2 broadcast domain tag. The original VL2 broadcast domain tag may include information that identifies the unicast MAC frame as being associated with the original VL2 broadcast domain. The original VL2 broadcast domain tag may include additional information without departing from the scope of the invention. In Step 930, after the translation (performed in Step 928), the unicast MAC frame is bridged across the NNI of the service VTEP to a directly-connected service device.

In Step 932, after determining (in Step 924) that the destination host (or destination virtual machine) MAC address is unknown on the forward-service VNI, the unicast MAC frame is flooded to all destinations known on the forward-service VNI. In one embodiment of the invention, through MAC learning and/or the receipt of MAC programming instructions (MPIs) (described above), destinations known on the forward-service VNI may include, but are not limited to: (i) the near network interface (NNI) of a service VTEP, behind which a service device may reside; and (ii) at least one intercept network interface (INI) (see e.g., FIG. 2) of one or more intercept VTEPs, behind which at least one intercept host (or intercept virtual machine) may reside. Furthermore, based on the imposition of intercept-specific traffic flow rules (TFRs), copies of the unicast MAC frame, intended to be flooded to the at least one INI of one or more intercept VTEPs, may be dropped in order to reduce duplicate network traffic delivery. Accordingly, just a copy of the unicast MAC frame may find its way to the directly-connected service device via traversal of the NNI of the service VTEP.

Turning to FIG. 9C, in Step 940, after determining (in Step 908) that the source host (or source virtual machine) is a non-intercept host (or virtual machine), another determination is made as to whether the destination host (or destination virtual machine) is an intercept host (or virtual machine). Identification of the destination host as an intercept host may be determined based on one or more service policies (specified in redirect criteria (described above)) and header information specified in the unicast MAC frame. For example, the destination host may be recognized as an intercept host because the destination host MAC address (specified in the header information of the unicast MAC frame) is tied to a service policy or rule specified in the redirect criteria. By way of another example, the destination host may be recognized as an intercept host because the destination host IP address (specified in header information of the unicast MAC frame) is tied to a service policy or rule specified in the redirect criteria.

In one embodiment of the invention, if it is determined that the destination host (or destination virtual machine) is tied to any service policy or rule specified in the redirect criteria, then the destination host (or destination virtual machine) is recognized as an intercept host. Accordingly, based on this determination, the process may proceed to Step 942. On the other hand, in another embodiment of the invention, if it is alternatively determined that the destination host (or destination virtual machine) is not tied to any service policy or rule specified in the redirect criteria, then the destination host (or destination virtual machine) is recognized as a non-intercept host (or virtual machine). Accordingly, based on this determination, the process may alternatively proceed to Step 952.

In Step 942, after determining (in Step 940) that the destination host (or destination virtual machine) is an intercept host/virtual machine, a lookup is performed on an original VNI using the destination host (or destination virtual machine) MAC address specified in header information of the unicast MAC frame. In one embodiment of the invention, the original VNI may identify with an original VL2 broadcast domain. Further, the original VL2 broadcast domain may be implemented as a unique, bidirectional overlay tunnel (e.g., a VXLAN tunnel) through which network traffic, not sought for interception based on redirect criteria, may traverse the L3 fabric towards a destination. Should any host MAC address be known on the original VNI, network traffic sourced from and/or addressed to that host MAC address may be directed to a far network interface (FNI) of a service VTEP, behind which the service device may reside.

Moreover, in one embodiment of the invention, the above-mentioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 944, based on the lookup (performed in Step 942), a determination is made as to whether the destination host (or destination virtual machine) MAC address is known on the original VNI. In one embodiment of the invention, if it is determined that an entry in the MAC-to-VNI table maps the destination host (or destination virtual machine) MAC address to at least the original VNI, then the destination host/virtual machine MAC address is recognized as being known on the original VNI. Accordingly, based on this determination, the process may proceed to Step 946. On the other hand, in another embodiment of the invention, if it is alternatively determined that an entry in the MAC-to-VNI table fails to map the destination host (or destination virtual machine) MAC address to at least the original VNI, then the destination host/virtual machine MAC address is recognized as being unknown on the original VNI. Accordingly, based on this determination, the process may alternatively proceed to Step 950.

In Step 946, after determining (in Step 944) that the destination host (or destination virtual machine) MAC address is known on the original VNI, a network interface out of which the unicast MAC frame may be transmitted, towards the service device, is identified. In one embodiment of the invention, the aforementioned network interface, entailing either a physical or virtual network interface, may be identified through the performance of a lookup on a MAC address table using the destination host (or destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through the FNI of the service VTEP. Accordingly, based on this determination, the unicast MAC frame may be directed to the FNI of the service VTEP. Thereafter, in Step 948, the unicast MAC frame is subsequently bridged across the FNI of the service VTEP to a directly-connected service device.

In Step 950, after determining (in Step 944) that the destination host (or destination virtual machine) MAC address is unknown on the original VNI, the unicast MAC frame is flooded to all destinations known on the original VNI. In one embodiment of the invention, through MAC learning and/or the receipt of MAC programming instructions (MPIs) (described above), destinations known on the original VNI may include, but are not limited to: the FNI of the service VTEP, behind which a service device may reside. Accordingly, a copy of the unicast MAC frame may find its way to the directly-connected service device via traversal of the FNI of the service VTEP.

In Step 952, after determining (in Step 940) that the destination host (or destination virtual machine) is a non-intercept host/virtual machine, the unicast MAC frame is transmitted towards the destination host/virtual machine using conventional routing and/or bridging.

FIG. 10A-10D show flowcharts describing a method for transmitting inspected unicast network traffic within a zone in accordance with one or more embodiments of the invention. The various steps outlined below may be performed by a service virtual tunnel end point (VTEP) (i.e., a VTEP directly-connected to a service device). Further, while the various steps in the flowcharts are presented and described sequentially, one of ordinary skill will appreciate that some or all steps may be executed in different orders, may be combined or omitted, and some or all steps may be executed in parallel.

Figure 10A:
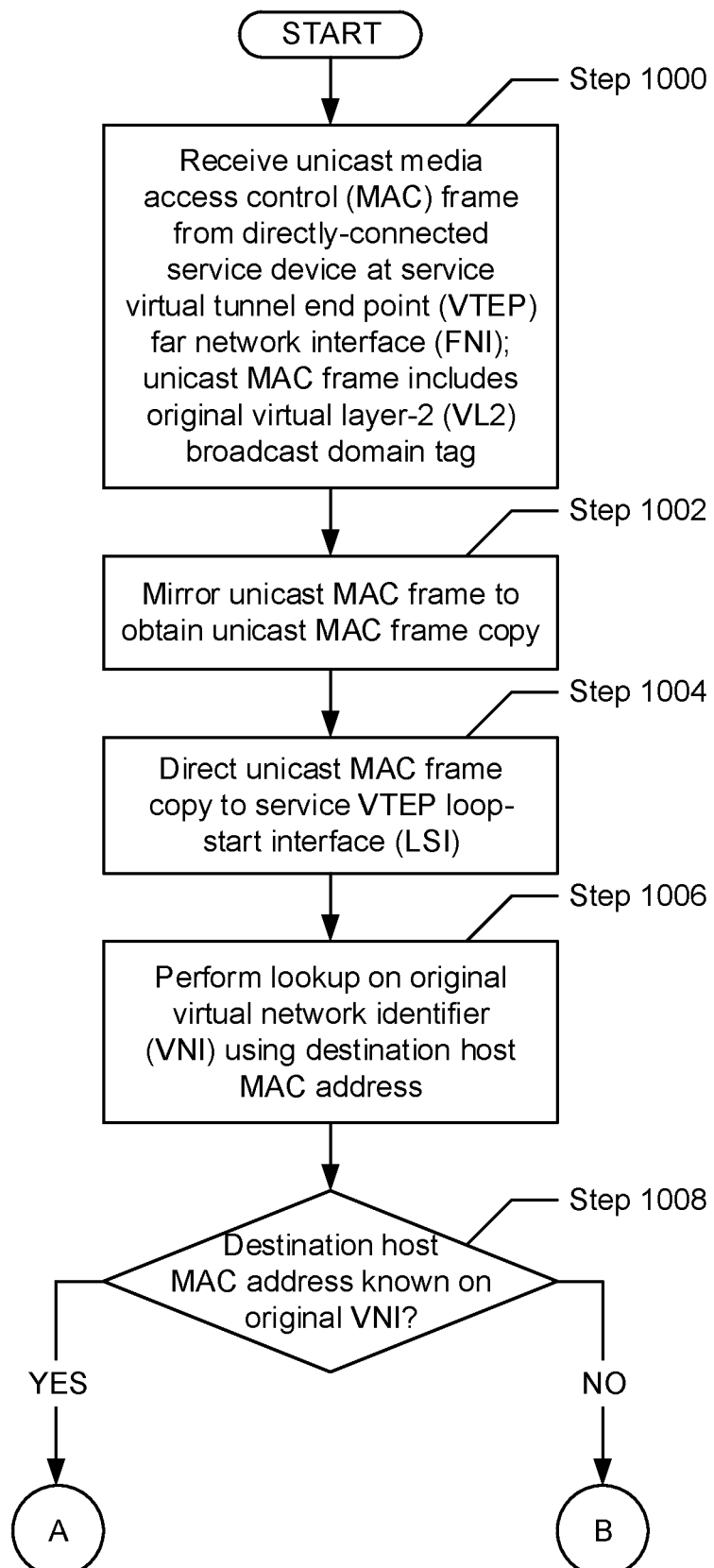
FIG. 10A-10D show flowcharts describing a method for transmitting inspected unicast network traffic within a zone in accordance with one or more embodiments of the invention.

Turning to FIG. 10A, in Step 1000, a unicast media access control (MAC) frame is received from a directly-connected service device. In one embodiment of the invention, the unicast MAC frame may arrive through a far network interface (FNI) (see e.g., FIG. 2) of the service VTEP. Further, the unicast MAC frame may include or specify an original virtual layer-2 (VL2) broadcast domain tag within its L2 header information. The original VL2 broadcast domain tag may include information that identifies the unicast MAC frame as being associated with an original VL2 broadcast domain. The original VL2 broadcast domain tag may include additional information without departing from the scope of the invention.

In Step 1002, a unicast MAC frame copy is obtained through port mirroring. In one embodiment of the invention, port mirroring may refer to the replication of network traffic seen on one network interface to yield a copy of that network traffic, which may then be directed to another network interface. Furthermore, the port mirroring may transpire because of a service-specific network interface configuration (NIC) (described above)—e.g., dictating the configuration of a mirroring property (or attribute) belonging to the FNI of the service VTEP such that the FNI mirrors any ingress network traffic at the FNI to the loop-start interface (LSI) (see e.g., FIG. 2) of the service VTEP. Accordingly, in Step 1004, based on the aforementioned service-specific NIC, the unicast MAC frame copy (obtained in Step 1002) is directed to the LSI of the service VTEP.

In Step 1006, a lookup is performed on an original VNI using the destination host (or destination virtual machine) MAC address specified in header information of the unicast MAC frame. In one embodiment of the invention, the original VNI may identify with the original VL2 broadcast domain. Moreover, in one embodiment of the invention, the aforementioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 1008, based on the lookup (performed in Step 1006), a determination is made as to whether the destination host (or destination virtual machine) MAC address is known on the original VNI. In one embodiment of the invention, if it is determined that an entry in the MAC-to-VNI table maps the destination host (or destination virtual machine) MAC address to at least the original VNI, then the destination host/virtual machine MAC address is recognized as being known on the original VNI. Accordingly, based on this determination, the process may proceed to Step 1020 (see e.g., FIG. 10B). On the other hand, in another embodiment of the invention, if it is alternatively determined that an entry in the MAC-to-VNI table fails to map the destination host (or destination virtual machine) MAC address to at least the original VNI, then the destination host/virtual machine MAC address is recognized as being unknown on the original VNI. Accordingly, based on this determination, the process may alternatively proceed to Step 1040 (see e.g., FIG. 10C).

Figure 10B:
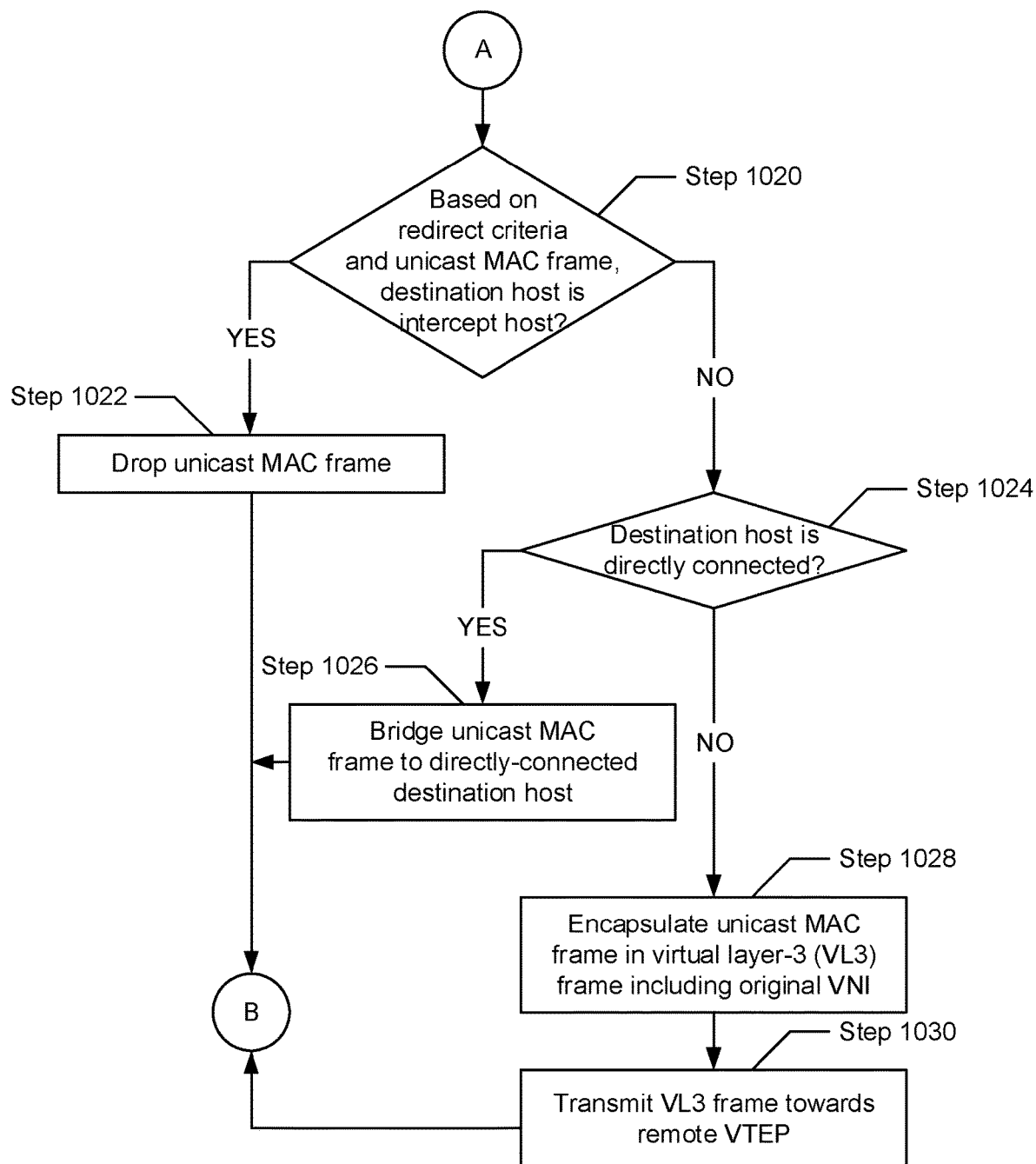

Turning to FIG. 10B, in Step 1020, after determining (in Step 1008) that destination host (or destination virtual machine) MAC address is known on the original VNI, another determination is made as to whether the destination host/virtual machine is an intercept host (or intercept virtual machine). Identification of the destination host as an intercept host may be determined based on one or more service policies (specified in redirect criteria (described above)) and header information specified in the unicast MAC frame. For example, the destination host may be recognized as an intercept host because the destination host MAC address (specified in the header information of the unicast MAC frame) is tied to a service policy or rule specified in the redirect criteria. By way of another example, the destination host may be recognized as an intercept host because the destination host IP address (specified in header information of the unicast MAC frame) is tied to a service policy or rule specified in the redirect criteria.

In one embodiment of the invention, if it is determined that the destination host (or destination virtual machine) is tied to any service policy or rule specified in the redirect criteria, then the destination host (or destination virtual machine) is recognized as an intercept host. Accordingly, based on this determination, the process may proceed to Step 1022. On the other hand, in another embodiment of the invention, if it is alternatively determined that the destination host (or destination virtual machine) is not tied to any service policy or rule specified in the redirect criteria, then the destination host (or destination virtual machine) is recognized as a non-intercept host (or virtual machine). Accordingly, based on this determination, the process may alternatively proceed to Step 1024.

In Step 1022, after determining (in Step 1020) that the destination host (or destination virtual machine) is an intercept host/virtual machine, a network interface out of which the unicast MAC frame may be transmitted, towards the destination host/virtual machine, is identified. In one embodiment of the invention, the aforementioned network interface, entailing either a physical or virtual network interface, may be identified through the performance of a lookup on a MAC address table using the destination host (or destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through the FNI of the service VTEP. This may be the case because, as an intercept host/virtual machine, the destination host/virtual machine may have been programmed behind the FNI of the service VTEP per an earlier processed MAC programming instruction (MPI)—e.g., any and all intercept host (or intercept virtual machine) MAC address(es), on the original VNI, are to be programmed behind the FNI of a service VTEP. However, because the unicast MAC frame is already at the FNI of the service VTEP, the unicast MAC frame is subsequently dropped. Hereinafter, the process may proceed to Step 1040 (see e.g., FIG. 10C).

In Step 1024, after determining (in Step 1020) that the destination host (or destination virtual machine) is a non-intercept host/virtual machine, another determination is made as to whether the destination host/virtual machine is directly-connected. In one embodiment of the invention, identifying whether the destination host/virtual machine is directly-connected may entail performing a lookup on a MAC address table using the destination host/virtual machine MAC address specified in header information of the unicast MAC frame. In one embodiment of the invention, if it is determined, based on the aforementioned lookup on the MAC address table, that the destination host/virtual machine is directly-connected, the process may proceed to Step 1026. On the other hand, in another embodiment of the invention, if it is alternatively determined, based on the lookup, that the destination host/virtual machine is not directly-connected (i.e., indicative of a remote destination), the process may alternatively proceed to Step 1028.

In Step 1026, after determining (in Step 1024) that the destination host (or destination virtual machine) is directly-connected, the unicast MAC frame is bridged. More specifically, in one embodiment of the invention, the unicast MAC frame may be bridged from the service VTEP, via a certain network interface specified in an entry in the MAC address table, to the directly-connected destination host/virtual machine. Hereinafter, the process may proceed to Step 1040 (see e.g., FIG. 10C).

In Step 1028, after determining (in Step 1024) that the destination host (or destination virtual machine) is not directly-connected, an entry in the MAC address table may specify that the unicast MAC frame should be transmitted through a certain network interface, leading to a remote VTEP, and using an overlay tunnel that implements the original VL2 broadcast domain. Subsequently, the unicast MAC frame may be encapsulated in a VL3 frame such as, for example, a VXLAN frame, where the VL3 frame may include header information that specifies, at least in part, the original VNI.

In Step 1030, the VL3 frame (obtained in Step 1028) is transmitted, through an L3 fabric (see e.g., FIG. 1), towards the remote VTEP. Specifically, in one embodiment of the invention, the VL3 frame may traverse through an overlay tunnel—i.e., representative of the original VL2 broadcast domain—that originates at the service VTEP (which had obtained the unicast MAC frame in Step 1000) and, subsequently, terminates at the remote VTEP, behind which the destination host/virtual machine resides. Hereinafter, the process may proceed to Step 1040 (see e.g., FIG. 10C).

Figure 10C:
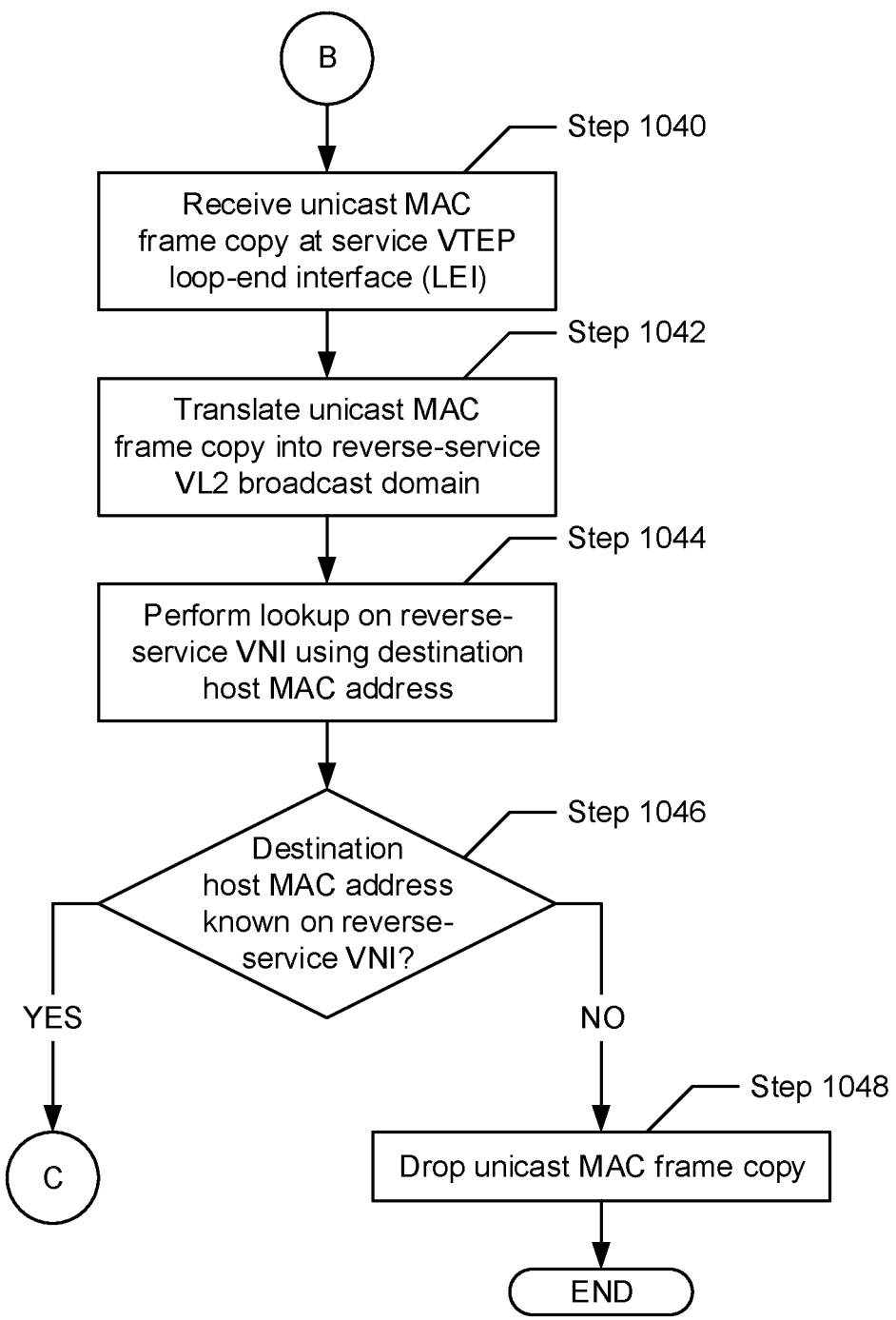

Turning to FIG. 10C, in Step 1040, after the unicast MAC frame copy is directed to the LSI of the service VTEP (in Step 1004), the unicast MAC frame copy is received at a loop-end interface (LEI) (see e.g., FIG. 2) of the service VTEP. In one embodiment of the invention, the LSI and the LEI may be connected together using a physical loopback cable. Accordingly, any egress network traffic traversing the LSI becomes ingress network traffic arriving at the LEI.

In Step 1042, the unicast MAC frame copy is translated into the reverse-service VL2 broadcast domain. In one embodiment of the invention, this translation may transpire because of a service-specific traffic flow rule (TFR) (de-scribed above)—e.g., dictating the translation of any ingress network traffic (i.e., the unicast MAC frame copy) traversing the LEI of the service VTEP from the original VL2 broadcast domain to the reverse-service VL2 broadcast domain. Furthermore, the aforementioned translation may entail replacing the original VL2 broadcast domain tag, specified in header information of the unicast MAC frame copy, with a reverse-service VL2 broadcast domain tag. The reverse-service VL2 broadcast domain tag may include information that identifies the unicast MAC frame copy as being associated with a reverse-service VL2 broadcast domain. The reverse-service VL2 broadcast domain tag may include additional information without departing from the scope of the invention.

In Step 1044, a lookup is performed on a reverse-service virtual network identifier (VNI) using a destination host (or destination virtual machine) MAC address specified in header information of the unicast MAC frame copy. In one embodiment of the invention, the reverse-service VNI may identify with a reverse-service VL2 broadcast domain. Further, the reverse-service VL2 broadcast domain may be implemented as a unique, unidirectional overlay tunnel (e.g., a virtual extensible local area network (VXLAN) tunnel) through which network traffic, addressed to an intercept host/virtual machine, may be directed thereto after inspection.

Moreover, in one embodiment of the invention, the above-mentioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 1046, based on the lookup (performed in Step 1044), a determination is made as to whether the destination host (or destination virtual machine) MAC address is known on the reverse-service VNI. In one embodiment of the invention, if it is determined that an entry in the MAC-to-VNI table maps the destination host (or destination virtual machine) MAC address to at least the reverse-service VNI, then the destination host/virtual machine MAC address is recognized as being known on the reverse-service VNI. Accordingly, based on this determination, the process may proceed to Step 1060 (see e.g., FIG. 10D). On the other hand, in another embodiment of the invention, if it is alternatively determined that an entry in the MAC-to-VNI table fails to map the destination host (or destination virtual machine) MAC address to at least the reverse-service VNI, then the destination host/virtual machine MAC address is recognized as being unknown on the reverse-service VNI. Accordingly, based on this determination, the process may alternatively proceed to Step 1048.

In Step 1048, after determining (in Step 1046) that the destination host (or destination virtual machine) MAC address is unknown on the reverse-service VNI, the unicast MAC frame copy is dropped. This may be the case because, in one embodiment of the invention, a service-specific network interface configuration (NIC) (described above) may have previously configured a flooding property (or attribute) belonging to the LEI of the service VTEP such that unknown unicast flooding at the LEI is disabled.

Figure 10D:
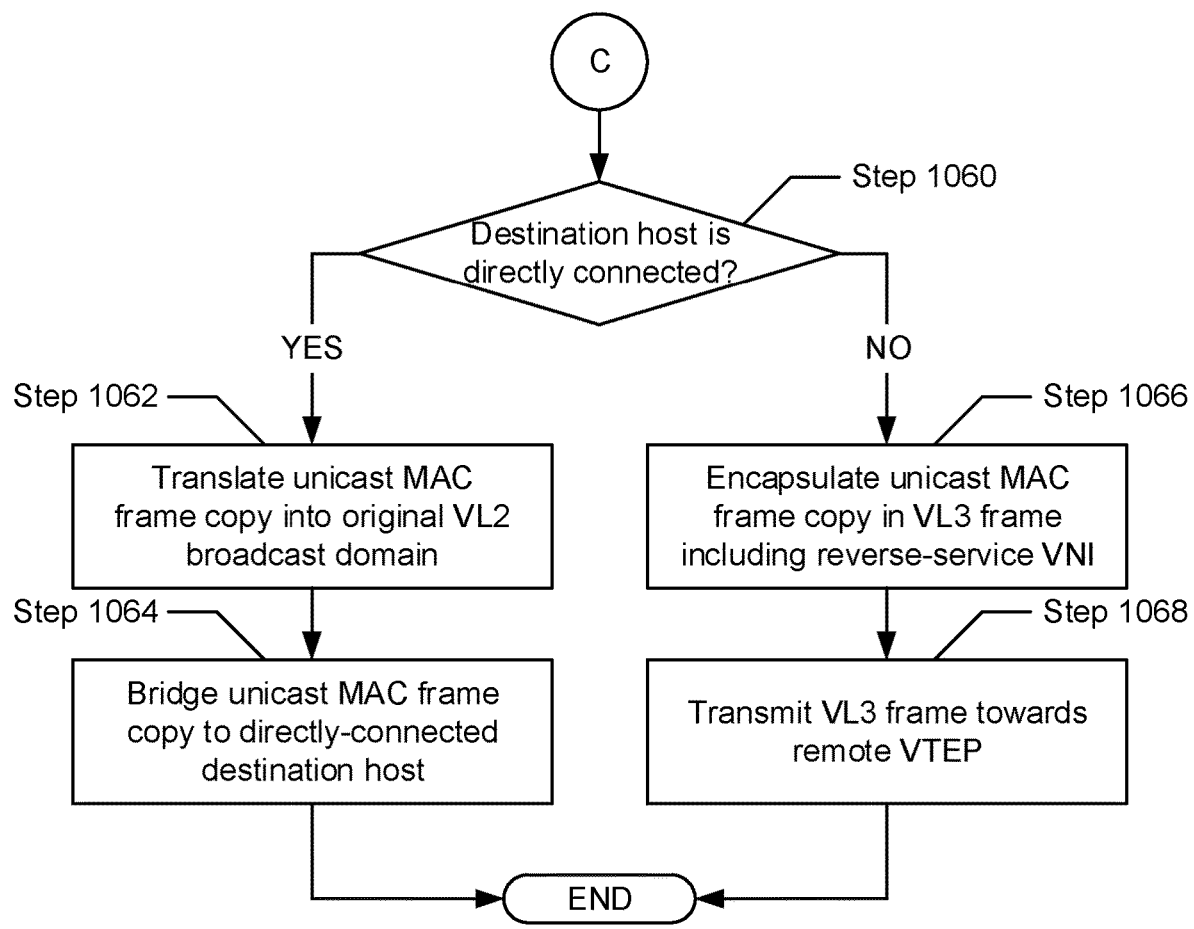

Turning to FIG. 10D, in Step 1060, after determining (in Step 1046) that the destination host (or destination virtual machine) MAC address is known on the reverse-service VNI, another determination is made as to whether the destination host/virtual machine is directly-connected. In one embodiment of the invention, identifying whether the destination host/virtual machine is directly-connected may entail performing a lookup on a MAC address table using the destination host/virtual machine MAC address specified in header information of the unicast MAC frame copy. In one embodiment of the invention, if it is determined, based on the aforementioned lookup on the MAC address table, that the destination host/virtual machine is directly-connected, the process may proceed to Step 1062. On the other hand, in another embodiment of the invention, if it is alternatively determined, based on the lookup, that the destination host/virtual machine is not directly-connected (i.e., indicative of a remote destination), the process may alternatively proceed to Step 1066.

In Step 1062, after determining (in Step 1060) that the destination host (or destination virtual machine) is directly-connected, the unicast MAC frame copy is translated into the original VL2 broadcast domain. In one embodiment of the invention, this translation may transpire because of an intercept-specific traffic flow rule (TFR) (described above)—e.g., dictating the translation of any egress network traffic (i.e., the unicast MAC frame copy) traversing an intercept network interface (INI) of an intercept VTEP (i.e., which the service VTEP also is in this case) from the reverse-service VL2 broadcast domain to the original VL2 broadcast domain. Furthermore, the aforementioned translation may entail replacing the reverse-service VL2 broadcast domain tag, specified in header information of the unicast MAC frame copy, with an original VL2 broadcast domain tag. The original VL2 broadcast domain tag may include information that identifies the unicast MAC frame copy as being associated with the original VL2 broadcast domain. The original VL2 broadcast domain tag may include additional information without departing from the scope of the invention. Thereafter, in Step 1064, the unicast MAC frame copy is bridged across an INI of the service (intercept) VTEP to the directly-connected destination host (or destination virtual machine).

In Step 1066, after determining (in Step 1060) that the destination host (or destination virtual machine) is not directly-connected, an entry in the MAC address table may specify that the unicast MAC frame copy should be transmitted through a certain network interface, leading to a remote VTEP, and using an overlay tunnel that implements the reverse-service VL2 broadcast domain. Subsequently, the unicast MAC frame may be encapsulated in a VL3 frame such as, for example, a VXLAN frame, where the VL3 frame may include header information that specifies, at least in part, the reverse-service VNI.

In Step 1068, the VL3 frame (obtained in Step 1066) is transmitted, through an L3 fabric (see e.g., FIG. 1), towards the remote VTEP. Specifically, in one embodiment of the invention, the VL3 frame may traverse through an overlay tunnel—i.e., representative of the reverse-service VL2 broadcast domain—that originates at the service VTEP and, subsequently, terminates at the remote VTEP, behind which the destination host/virtual machine resides.

Figure 11A:
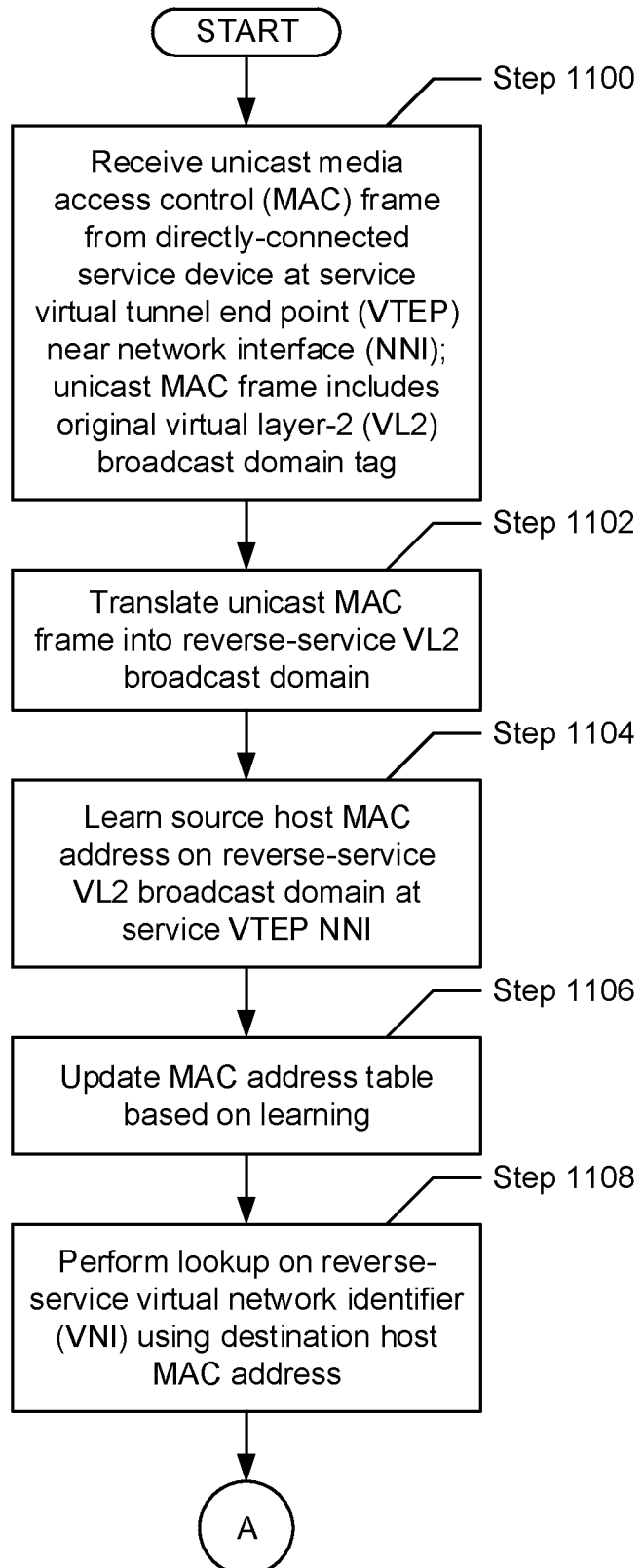
FIGS. 11A and 11B show flowcharts describing a method for transmitting inspected unicast network traffic within a zone in accordance with one or more embodiments of the invention.
Figure 11B:
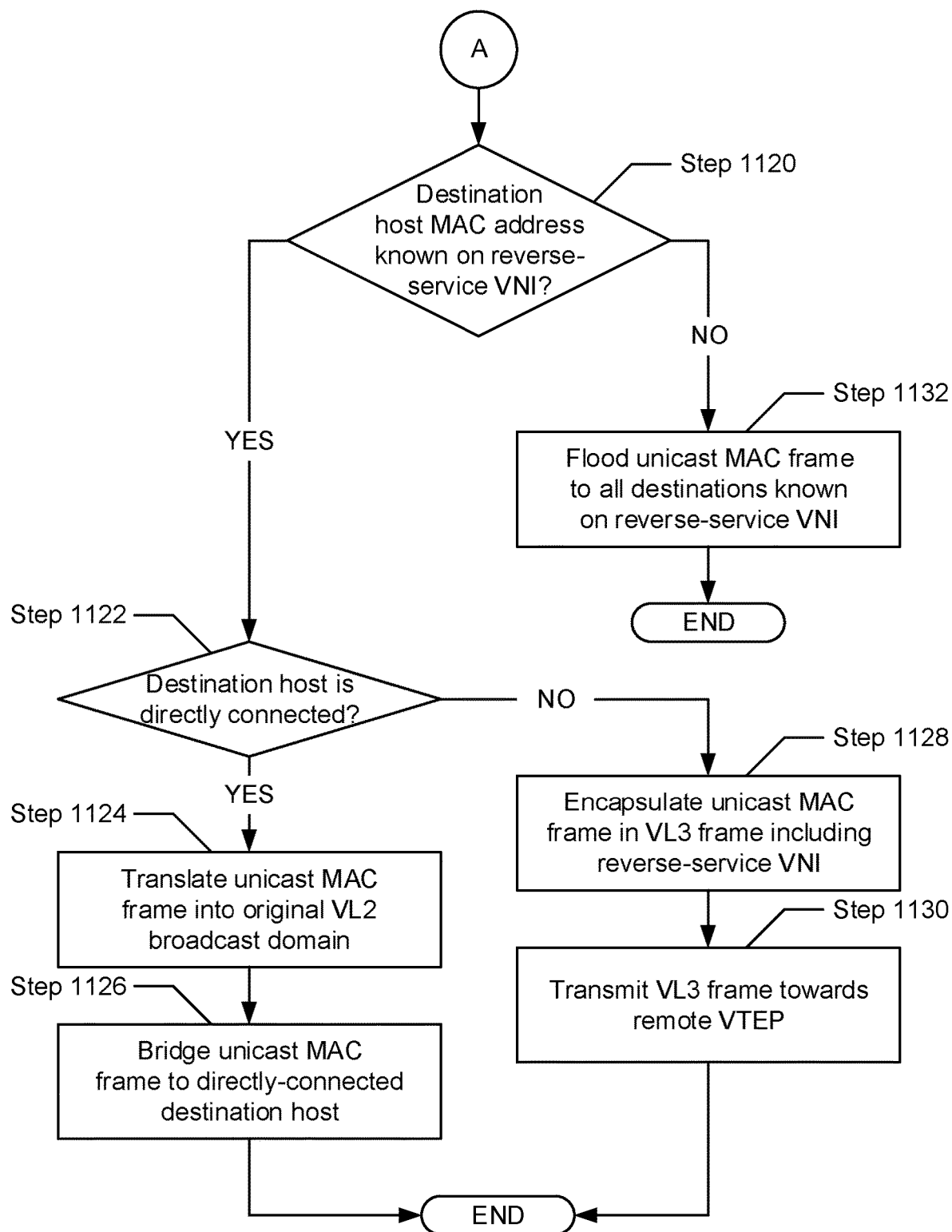

FIGS. 11A and 11B show flowcharts describing a method for transmitting inspected unicast network traffic within a zone in accordance with one or more embodiments of the invention. The various steps outlined below may be performed by a service virtual tunnel end point (VTEP) (i.e., a VTEP directly-connected to a service device). Further, while the various steps in the flowcharts are presented and described sequentially, one of ordinary skill will appreciate that some or all steps may be executed in different orders, may be combined or omitted, and some or all steps may be executed in parallel.

Turning to FIG. 11A, in Step 1100, a unicast media access control (MAC) frame is received from a directly-connected service device. In one embodiment of the invention, the unicast MAC frame may arrive through a near network interface (NNI) (see e.g., FIG. 2) of the service VTEP. Further, the unicast MAC frame may include or specify an original virtual layer-2 (VL2) broadcast domain tag within its L2 header information. The original VL2 broadcast domain tag may include information that identifies the unicast MAC frame as being associated with an original VL2 broadcast domain. The original VL2 broadcast domain tag may include additional information without departing from the scope of the invention.

In Step 1102, the unicast MAC frame is translated into the reverse-service VL2 broadcast domain. In one embodiment of the invention, this translation may transpire because of a service-specific traffic flow rule (TFR) (described above)—e.g., dictating the translation of any egress network traffic (i.e., the unicast MAC frame) traversing the NNI of the service VTEP from the original VL2 broadcast domain to the reverse-service VL2 broadcast domain. Furthermore, the aforementioned translation may entail replacing the original VL2 broadcast domain tag, specified in header information of the unicast MAC frame, with a reverse-service VL2 broadcast domain tag. The reverse-service VL2 broadcast domain tag may include information that identifies the unicast MAC frame as being associated with the reverse-service VL2 broadcast domain. The reverse-service VL2 broadcast domain tag may include additional information without departing from the scope of the invention.

In Step 1104, the source host (or source virtual machine) MAC address, specified in header information of the unicast MAC frame, is learned on the reverse-service VL2 broadcast domain at the NNI of the service VTEP. Based on this learning, in Step 1106, a MAC address table of the service VTEP is updated. Specifically, in one embodiment of the invention, the MAC address table may be updated to include an entry that specifies the source host/virtual machine MAC address, the reverse-service VL2 broadcast domain ID, and a NNI ID associated with the NNI of the service VTEP. Furthermore, based on a service-specific network interface configuration (NIC) (described above), any host/virtual machine MAC addresses learned on the reverse-service VL2 broadcast domain are to be copied to the forward-service VL2 broadcast domain. Accordingly, the MAC address table may be further updated to include an entry that specifies the source host/virtual machine MAC address, the forward-service VL2 broadcast domain ID, and the aforementioned NNI ID associated with the NNI of the service VTEP.

In Step 1108, after translating the unicast MAC frame into the reverse-service VL2 broadcast domain (in Step 1102), a lookup is performed on a reverse-service virtual network identifier (VNI) using a destination host (or destination virtual machine) MAC address specified in header information of the unicast MAC frame. In one embodiment of the invention, the reverse-service VNI may identify with the reverse-service VL2 broadcast domain. Further, the reverse-service VL2 broadcast domain may be implemented as a unique, unidirectional overlay tunnel (e.g., a virtual extensible local area network (VXLAN) tunnel) through which network traffic, addressed to an intercept host/virtual machine, may be directed thereto after inspection.

Turning to FIG. 11B, in Step 1120, based on the lookup (performed in Step 1108), a determination is made as to whether the destination host (or destination virtual machine) MAC address is known on the reverse-service VNI. In one embodiment of the invention, if it is determined that an entry in the MAC-to-VNI table maps the destination host (or destination virtual machine) MAC address to at least the reverse-service VNI, then the destination host/virtual machine MAC address is recognized as being known on the reverse-service VNI. Accordingly, based on this determination, the process may proceed to Step 1122. On the other hand, in another embodiment of the invention, if it is alternatively determined that an entry in the MAC-to-VNI table fails to map the destination host (or destination virtual machine) MAC address to at least the reverse-service VNI, then the destination host/virtual machine MAC address is recognized as being unknown on the reverse-service VNI. Accordingly, based on this determination, the process may alternatively proceed to Step 1132.

In Step 1122, after determining (in Step 1120) that the destination host (or destination virtual machine) MAC address is known on the reverse-service VNI, another determination is made as to whether the destination host/virtual machine is directly-connected. In one embodiment of the invention, identifying whether the destination host/virtual machine is directly-connected may entail performing a lookup on a MAC address table using the destination host/virtual machine MAC address specified in header information of the unicast MAC frame. In one embodiment of the invention, if it is determined, based on the aforementioned lookup on the MAC address table, that the destination host/virtual machine is directly-connected, the process may proceed to Step 1124. On the other hand, in another embodiment of the invention, if it is alternatively determined, based on the lookup, that the destination host/virtual machine is not directly-connected (i.e., indicative of a remote destination), the process may alternatively proceed to Step 1128.

In Step 1124, after determining (in Step 1122) that the destination host (or destination virtual machine) is directly-connected, the unicast MAC frame is translated into the original VL2 broadcast domain. In one embodiment of the invention, this translation may transpire because of an intercept-specific traffic flow rule (TFR) (described above)—e.g., dictating the translation of any egress network traffic (i.e., the unicast MAC frame copy) traversing an intercept network interface (INI) of an intercept VTEP (i.e., which the service VTEP also is in this case) from the reverse-service VL2 broadcast domain to the original VL2 broadcast domain. Furthermore, the aforementioned translation may entail replacing the reverse-service VL2 broadcast domain tag, specified in header information of the unicast MAC frame, with an original VL2 broadcast domain tag. The original VL2 broadcast domain tag may include information that identifies the unicast MAC frame as being associated with the original VL2 broadcast domain. The original VL2 broadcast domain tag may include additional information without departing from the scope of the invention. Thereafter, in Step 1126, the unicast MAC frame is bridged across an INI of the service (intercept) VTEP to the directly-connected destination host (or destination virtual machine).

In Step 1128, after determining (in Step 1122) that the destination host (or destination virtual machine) is not directly-connected, an entry in the MAC address table may specify that the unicast MAC frame should be transmitted through a certain network interface, leading to a remote VTEP, and using an overlay tunnel that implements the reverse-service VL2 broadcast domain. Subsequently, the unicast MAC frame may be encapsulated in a VL3 frame such as, for example, a VXLAN frame, where the VL3 frame may include header information that specifies, at least in part, the reverse-service VNI.

In Step 1130, the VL3 frame (obtained in Step 1128) is transmitted, through an L3 fabric (see e.g., FIG. 1), towards the remote VTEP. Specifically, in one embodiment of the invention, the VL3 frame may traverse through an overlay tunnel—i.e., representative of the reverse-service VL2 broadcast domain—that originates at the service VTEP and, subsequently, terminates at the remote VTEP, behind which the destination host/virtual machine resides.

In Step 1132, after determining (in Step 1120) that the destination host (or destination virtual machine) is unknown on the reverse-service VNI, the unicast MAC frame is flooded to all destinations known on the reverse-service VNI. In one embodiment of the invention, through MAC learning and/or the receipt of MAC programming instructions (MPIs) (described above), destinations known on the reverse-service VNI may include, but are not limited to: at least one intercept network interface (INI) (see e.g., FIG. 2) of one or more intercept VTEPs, behind which at least one intercept host (or intercept virtual machine) may reside. Accordingly, a copy of the unicast MAC frame may find its way to the destination host/virtual machine, which may or may be directly-connected.

Figure 12:
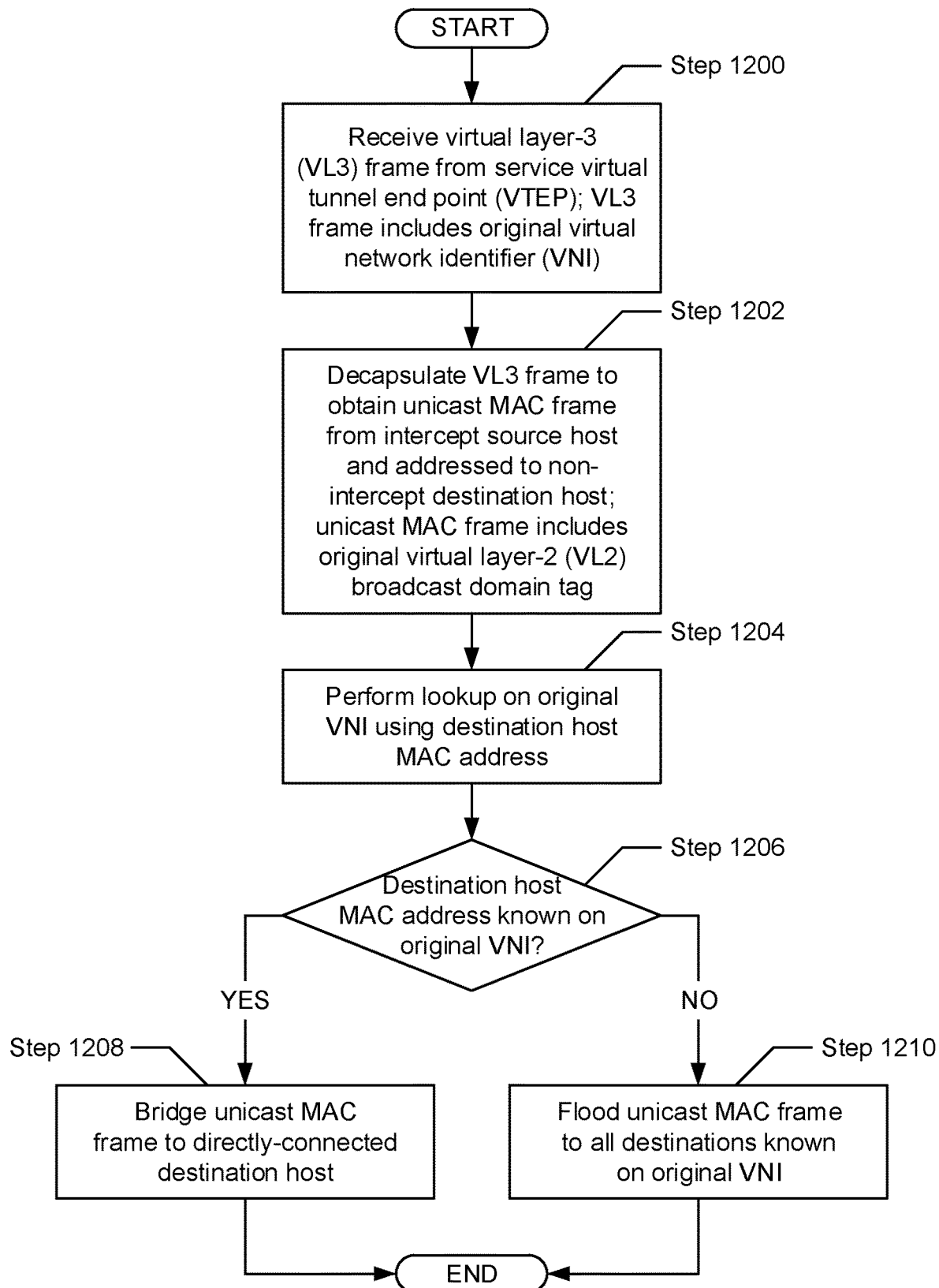
FIG. 12 shows a flowchart describing a method for receiving inspected unicast network traffic within a zone in accordance with one or more embodiments of the invention.

FIG. 12 shows a flowchart describing a method for receiving inspected unicast network traffic within a zone in accordance with one or more embodiments of the invention. The various steps outlined below may be performed by a non-service virtual tunnel end point (VTEP) (i.e., a VTEP not directly-connected to a service device (or a remote VTEP)). Further, while the various steps in the flowcharts are presented and described sequentially, one of ordinary skill will appreciate that some or all steps may be executed in different orders, may be combined or omitted, and some or all steps may be executed in parallel.

Turning to FIG. 12, in Step 1200, a virtual layer-3 (VL3) frame is received. In one embodiment of the invention, the VL3 frame may have originated from a service VTEP. Further, the VL3 frame may include or specify an original virtual network identifier (VNI) within header information. The original VNI may identify with an original virtual layer-2 (VL2) broadcast domain.

In Step 1202, the VL3 frame (received in Step 1200) is decapsulated. Specifically, in one embodiment of the invention, decapsulation may entail removing the L3 header information included or specified in the VL3 frame, thereby exposing a unicast media access control (MAC) frame enclosed therein. The unicast MAC frame may have originated from a intercept source host (or intercept source virtual machine). The unicast MAC frame may also be addressed to a non-intercept destination host (or non-intercept destination virtual machine). Furthermore, the unicast MAC frame may include or specify an original VL2 broadcast domain tag (e.g., an original virtual local area network (VLAN) tag). The original VL2 broadcast domain tag may include information that identifies the unicast MAC frame as being associated with the original VL2 broadcast domain. The original VL2 broadcast domain tag may include additional information without departing from the scope of the invention.

In Step 1204, a lookup is performed on the original VNI using the non-intercept destination host (or non-intercept destination virtual machine) MAC address specified in header information of the unicast MAC frame. In one embodiment of the invention, the aforementioned lookup may entail searching through one or more entries in a MAC-to-VNI table for an entry that specifies at least the non-intercept destination host (or non-intercept destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 1206, based on the lookup (performed in Step 1204), a determination is made as to whether the non-intercept destination host (or non-intercept destination virtual machine) MAC address is known on the original VNI. In one embodiment of the invention, if it is determined that an entry in the MAC-to-VNI table maps the non-intercept destination host (or non-intercept destination virtual machine) MAC address to at least the original VNI, then the non-intercept destination host/virtual machine MAC address is recognized as being known on the original VNI. Accordingly, based on this determination, the process may proceed to Step 1208. On the other hand, in another embodiment of the invention, if it is alternatively determined that an entry in the MAC-to-VNI table fails to map the non-intercept destination host (or non-intercept destination virtual machine) MAC address to at least the original VNI, then the non-intercept destination host/virtual machine MAC address is recognized as being unknown on the original VNI. Accordingly, based on this determination, the process may alternatively proceed to Step 1210.

In Step 1208, after determining (in Step 1206) that the non-intercept destination host (or non-intercept destination virtual machine) MAC address is known on the original VNI, a network interface out of which the unicast MAC frame may be transmitted, towards the non-intercept destination host/virtual machine, is identified. In one embodiment of the invention, the aforementioned network interface, entailing either a physical or virtual network interface, may be identified through the performance of a lookup on a MAC address table using the non-intercept destination host (or non-intercept destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through a certain (non-intercept) network interface of the non-service (remote) VTEP. Accordingly, based on this determination, the unicast MAC frame may be bridged across the identified network interface of the non-service (remote) VTEP to the directly-connected non-intercept destination host/virtual machine.

In Step 1210, after determining (in Step 1206) that the non-intercept destination host (or non-intercept destination virtual machine) MAC address is unknown on the original VNI, the unicast MAC frame is flooded to all destinations known on the original VNI. In one embodiment of the invention, a copy of the unicast MAC frame may find its way to the directly-connected non-intercept destination host/virtual machine via traversal of a certain (non-intercept) network interface of the non-service (remote) VTEP.

Figure 13A:
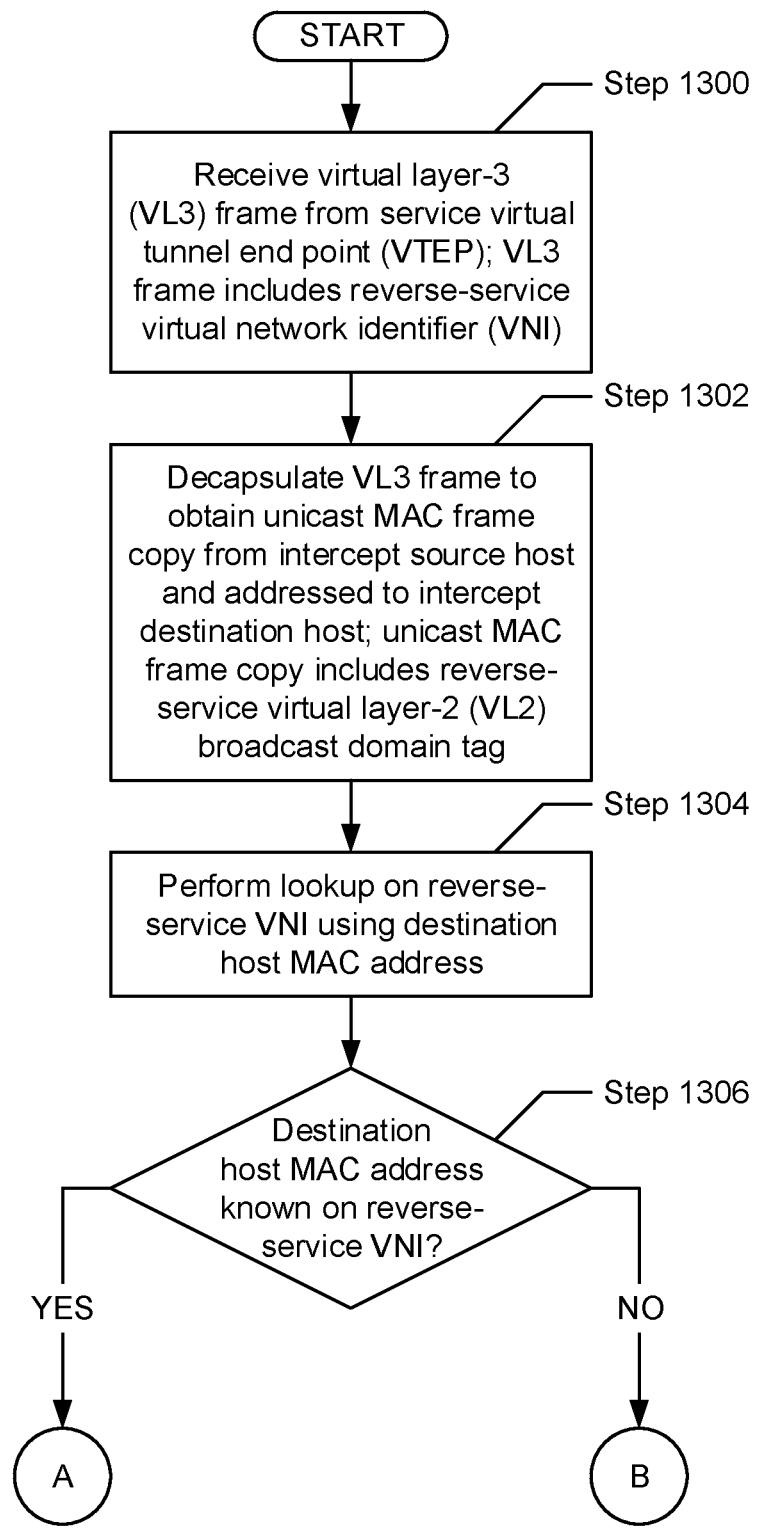
FIGS. 13A-13C show flowcharts describing a method for receiving inspected unicast network traffic within a zone in accordance with one or more embodiments of the invention.
Figure 13B:
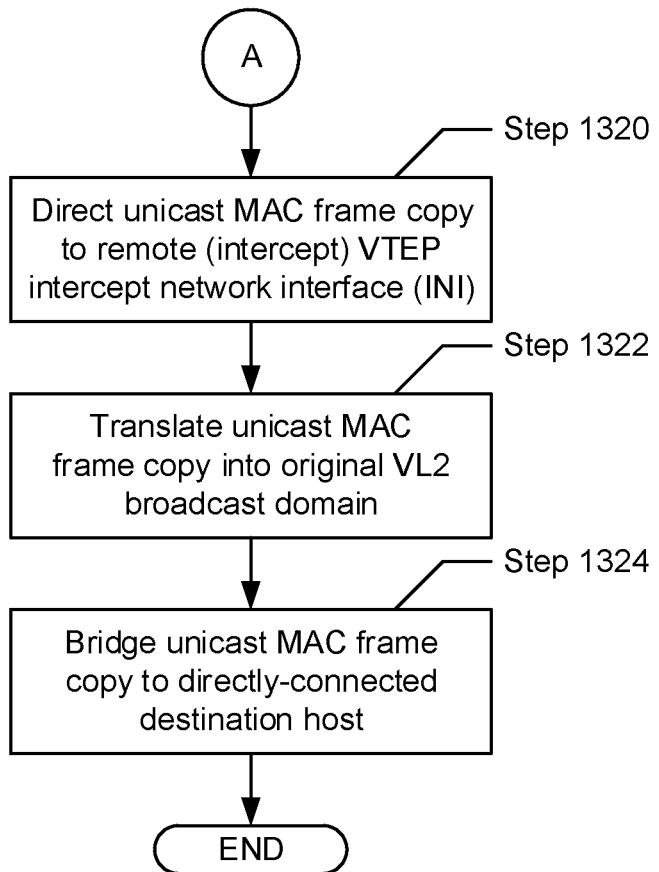
Figure 13C:
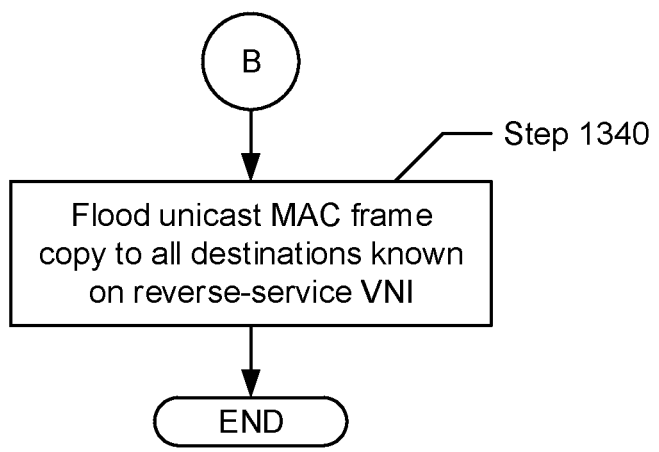

FIGS. 13A-13C show flowcharts describing a method for receiving inspected unicast network traffic within a zone in accordance with one or more embodiments of the invention. The various steps outlined below may be performed by a non-service virtual tunnel end point (VTEP) (i.e., a VTEP not directly-connected to a service device (or a remote VTEP)). Further, while the various steps in the flowcharts are presented and described sequentially, one of ordinary skill will appreciate that some or all steps may be executed in different orders, may be combined or omitted, and some or all steps may be executed in parallel.

Turning to FIG. 13A, in Step 1300, a virtual layer-3 (VL3) frame is received. In one embodiment of the invention, the VL3 frame may have originated from a service VTEP. Further, the VL3 frame may include or specify a reverse-service virtual network identifier (VNI) within header information. The reverse-service VNI may identify with a reverse-service virtual layer-2 (VL2) broadcast domain. Moreover, the reverse VL2 broadcast domain may be implemented as a unique, unidirectional overlay tunnel (e.g., a VXLAN tunnel) through which network traffic, addressed to an intercept host/virtual machine, may be directed thereto after inspection.

In Step 1302, the VL3 frame (received in Step 1300) is decapsulated. Specifically, in one embodiment of the invention, decapsulation may entail removing the L3 header information included or specified in the VL3 frame, thereby exposing a unicast media access control (MAC) frame copy (i.e., mirrored to a loop-start interface (LSI) of the service VTEP and subsequently forwarded toward the non-service (remote) VTEP after service device inspection) enclosed therein. The unicast MAC frame copy may have originated from a remote, intercept source host (or intercept source virtual machine). The unicast MAC frame copy may also be addressed to an intercept destination host (or intercept virtual machine). Furthermore, the unicast MAC frame copy may include or specify a reverse-service VL2 broadcast domain tag (e.g., a reverse-service virtual local area network (VLAN) tag). The reverse-service VL2 broadcast domain tag may include information that identifies the unicast MAC frame copy as being associated with the reverse-service VL2 broadcast domain. The reverse-service VL2 broadcast domain tag may include additional information without departing from the scope of the invention.

In Step 1304, a lookup is performed on the reverse-service VNI using the intercept destination host (or intercept destination virtual machine) MAC address specified in header information of the unicast MAC frame copy. In one embodiment of the invention, the aforementioned lookup may entail searching through one or more entries in a MAC-to-VNI table for an entry that specifies at least the intercept destination host (or intercept destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 1306, based on the lookup (performed in Step 1304), a determination is made as to whether the intercept destination host (or intercept destination virtual machine)

MAC address is known on the reverse-service VNI. In one embodiment of the invention, if it is determined that an entry in the MAC-to-VNI table maps the intercept destination host (or intercept destination virtual machine) MAC address to at least the reverse-service VNI, then the intercept destination host/virtual machine MAC address is recognized as being known on the reverse-service VNI. Accordingly, based on this determination, the process may proceed to Step 1320 (see e.g., FIG. 13B). On the other hand, in another embodiment of the invention, if it is alternatively determined that an entry in the MAC-to-VNI table fails to map the intercept destination host (or intercept destination virtual machine) MAC address to at least the reverse-service VNI, then the intercept destination host/virtual machine MAC address is recognized as being unknown on the reverse-service VNI. Accordingly, based on this determination, the process may alternatively proceed to Step 1340 (see e.g., FIG. 13C).

Turning to FIG. 13B, in Step 1320, after determining (in Step 1306) that the destination host (or destination virtual machine) MAC address is known on the reverse-service VNI, a network interface out of which the unicast MAC frame copy may be transmitted, towards the intercept destination host/virtual machine, is identified. In one embodiment of the invention, the aforementioned network interface, entailing either a physical or virtual network interface, may be identified through the performance of a lookup on a MAC address table using the intercept destination host (or intercept destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the abovementioned lookup on the MAC address table, it may be determined that the unicast MAC frame copy should be transmitted through an intercept network interface (INI) (see e.g., FIG. 2) of the non-service (remote) VTEP. Accordingly, based on this determination, the unicast MAC frame copy may be directed to the identified INI of the non-service (remote) VTEP.

In Step 1322, the unicast MAC frame copy is translated into the original VL2 broadcast domain. In one embodiment of the invention, this translation may transpire because of an intercept-specific traffic flow rule (TFR) (described above)—e.g., dictating the translation of any egress network traffic (i.e., the unicast MAC frame copy) traversing an intercept network interface (INI) of an intercept VTEP (i.e., the non-service (remote) VTEP) from the reverse-service VL2 broadcast domain to the original VL2 broadcast domain. Furthermore, the aforementioned translation may entail replacing the reverse-service VL2 broadcast domain tag, specified in header information of the unicast MAC frame copy, with an original VL2 broadcast domain tag. The original VL2 broadcast domain tag may include information that identifies the unicast MAC frame copy as being associated with the original VL2 broadcast domain. The original VL2 broadcast domain tag may include additional information without departing from the scope of the invention. Thereafter, in Step 1324, the unicast MAC frame copy is bridged across the identified INI of the non-service (remote) VTEP to the directly-connected intercept destination host (or intercept destination virtual machine).

Turning to FIG. 13C, in Step 1340, after determining (in Step 1306) that the intercept destination host (or intercept destination virtual machine) MAC address is unknown on the reverse-service VNI, the unicast MAC frame copy is flooded to all destinations known on the reverse-service VNI. In one embodiment of the invention, through MAC learning and/or the receipt of MAC programming instructions (MPIs) (described above), destinations known on the reverse-service VNI may include, but are not limited to: any and all INIs of the non-service (remote) VTEP, behind which at least one intercept host (or intercept virtual machine) may reside. Accordingly, a copy of the unicast MAC frame copy may find its way to the directly-connected intercept destination host/virtual machine via traversal of the identified INI of the non-service (remote) VTEP.

Figure 14A:
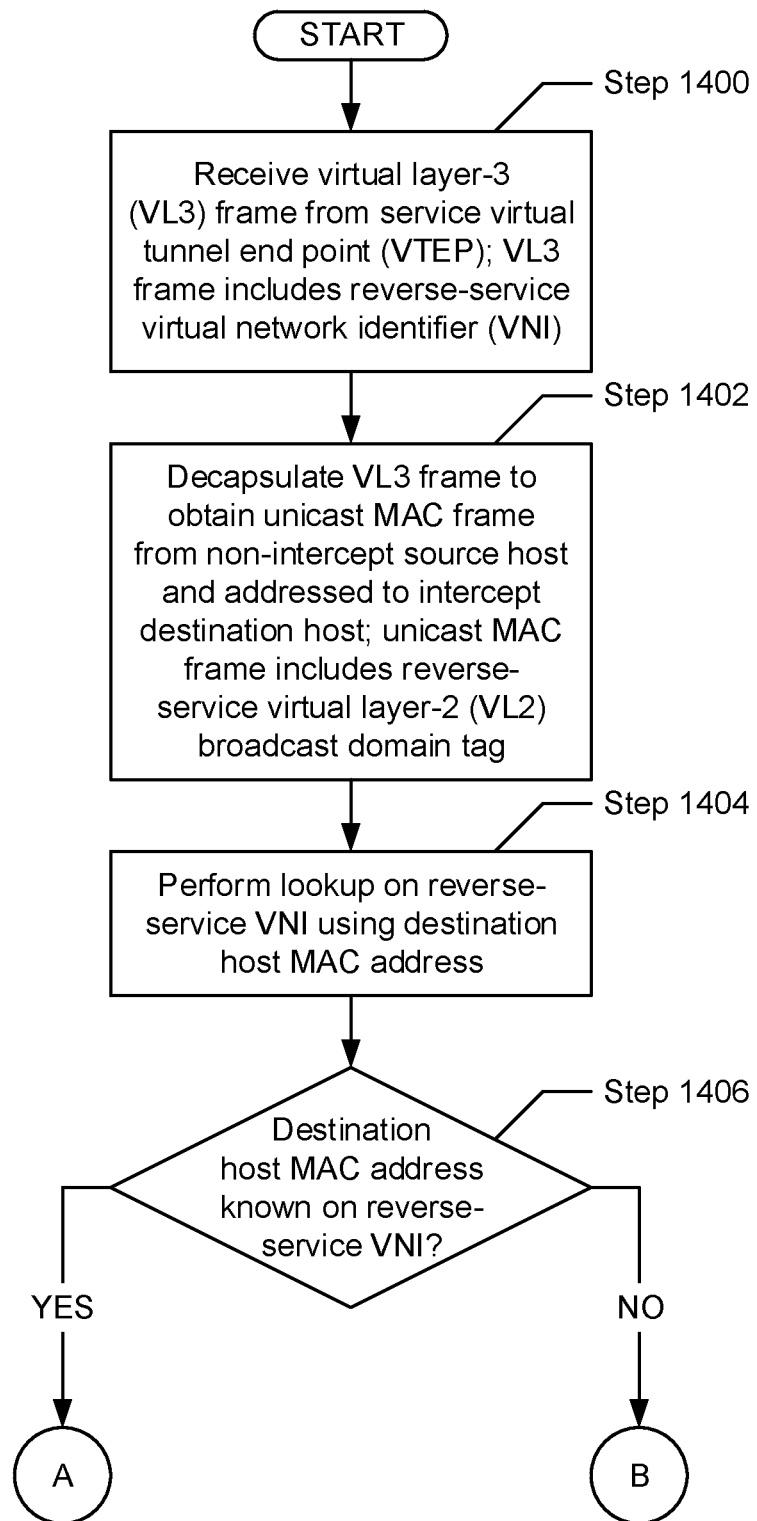
FIGS. 14A-14C show flowcharts describing a method for receiving inspected unicast network traffic within a zone in accordance with one or more embodiments of the invention.
Figure 14B:
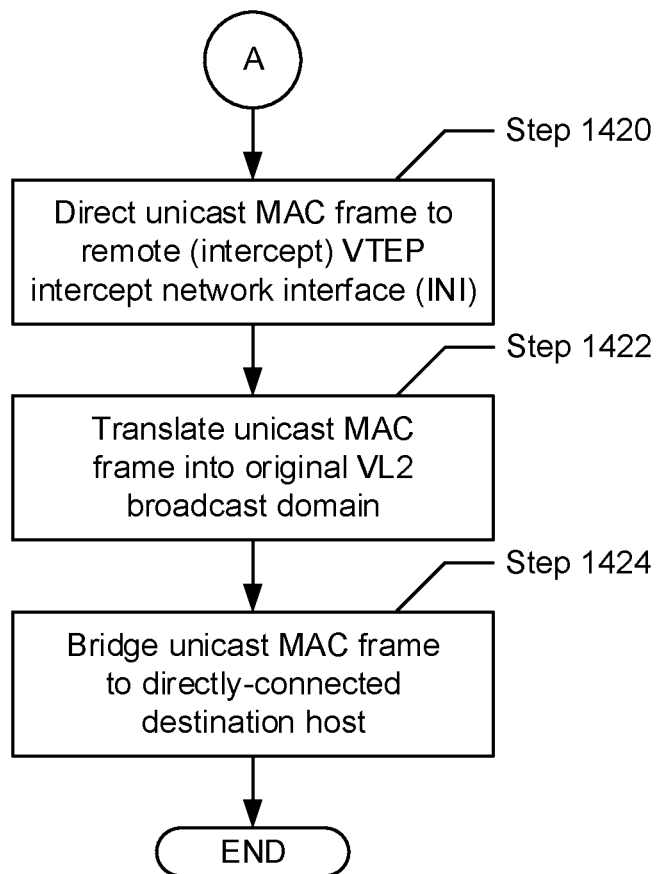
Figure 14C:
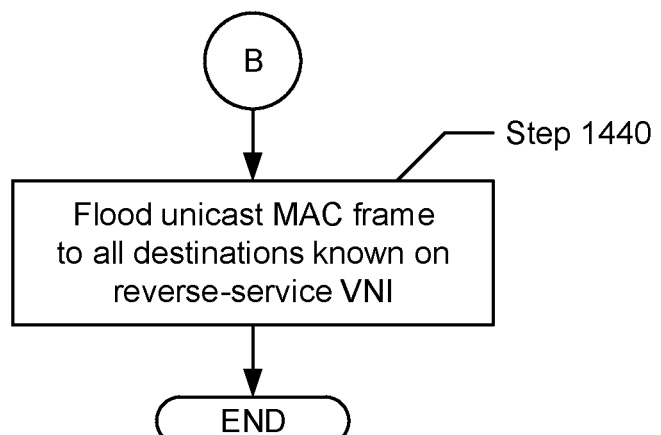

FIGS. 14A-14C show flowcharts describing a method for receiving inspected unicast network traffic within a zone in accordance with one or more embodiments of the invention. The various steps outlined below may be performed by a non-service virtual tunnel end point (VTEP) (i.e., a VTEP not directly-connected to a service device (or a remote VTEP)). Further, while the various steps in the flowcharts are presented and described sequentially, one of ordinary skill will appreciate that some or all steps may be executed in different orders, may be combined or omitted, and some or all steps may be executed in parallel.

Turning to FIG. 14A, in Step 1400, a virtual layer-3 (VL3) frame is received. In one embodiment of the invention, the VL3 frame may have originated from a service VTEP. Further, the VL3 frame may include or specify a reverse-service virtual network identifier (VNI) within header information. The reverse-service VNI may identify with a reverse-service virtual layer-2 (VL2) broadcast domain. Moreover, the reverse VL2 broadcast domain may be implemented as a unique, unidirectional overlay tunnel (e.g., a VXLAN tunnel) through which network traffic, addressed to an intercept host/virtual machine, may be directed thereto after inspection.

In Step 1402, the VL3 frame (received in Step 1400) is decapsulated. Specifically, in one embodiment of the invention, decapsulation may entail removing the L3 header information included or specified in the VL3 frame, thereby exposing a unicast media access control (MAC) frame enclosed therein. The unicast MAC frame may have originated from a remote, non-intercept source host (or non-intercept source virtual machine). The unicast MAC frame may also be addressed to an intercept destination host (or intercept virtual machine). Furthermore, the unicast MAC frame may include or specify a reverse-service VL2 broadcast domain tag (e.g., a reverse-service virtual local area network (VLAN) tag). The reverse-service VL2 broadcast domain tag may include information that identifies the unicast MAC frame as being associated with the reverse-service VL2 broadcast domain. The reverse-service VL2 broadcast domain tag may include additional information without departing from the scope of the invention.

In Step 1404, a lookup is performed on the reverse-service VNI using the intercept destination host (or intercept destination virtual machine) MAC address specified in header information of the unicast MAC frame. In one embodiment of the invention, the aforementioned lookup may entail searching through one or more entries in a MAC-to-VNI table for an entry that specifies at least the intercept destination host (or intercept destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 1406, based on the lookup (performed in Step 1404), a determination is made as to whether the intercept destination host (or intercept destination virtual machine) MAC address is known on the reverse-service VNI. In one embodiment of the invention, if it is determined that an entry in the MAC-to-VNI table maps the intercept destination host (or intercept destination virtual machine) MAC address to at least the reverse-service VNI, then the intercept destination host/virtual machine MAC address is recognized as being known on the reverse-service VNI. Accordingly, based on this determination, the process may proceed to Step 1420 (see e.g., FIG. 14B). On the other hand, in another embodiment of the invention, if it is alternatively determined that an entry in the MAC-to-VNI table fails to map the intercept destination host (or intercept destination virtual machine) MAC address to at least the reverse-service VNI, then the intercept destination host/virtual machine MAC address is recognized as being unknown on the reverse-service VNI. Accordingly, based on this determination, the process may alternatively proceed to Step 1440 (see e.g., FIG. 14C).

Turning to FIG. 14B, in Step 1420, after determining (in Step 1406) that the destination host (or destination virtual machine) MAC address is known on the reverse-service VNI, a network interface out of which the unicast MAC frame may be transmitted, towards the intercept destination host/virtual machine, is identified. In one embodiment of the invention, the aforementioned network interface, entailing either a physical or virtual network interface, may be identified through the performance of a lookup on a MAC address table using the intercept destination host (or intercept destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the abovementioned lookup on the MAC address table, it may be determined that the unicast MAC frame should be transmitted through an intercept network interface (INI) (see e.g., FIG. 2) of the non-service (remote) VTEP. Accordingly, based on this determination, the unicast MAC frame may be directed to the identified INI of the non-service (remote) VTEP.

In Step 1422, the unicast MAC frame is translated into the original VL2 broadcast domain. In one embodiment of the invention, this translation may transpire because of an intercept-specific traffic flow rule (TFR) (described above)—e.g., dictating the translation of any egress network traffic (i.e., the unicast MAC frame) traversing an intercept network interface (INI) of an intercept VTEP (i.e., the non-service (remote) VTEP) from the reverse-service VL2 broadcast domain to the original VL2 broadcast domain. Furthermore, the aforementioned translation may entail replacing the reverse-service VL2 broadcast domain tag, specified in header information of the unicast MAC frame, with an original VL2 broadcast domain tag. The original VL2 broadcast domain tag may include information that identifies the unicast MAC frame as being associated with the original VL2 broadcast domain. The original VL2 broadcast domain tag may include additional information without departing from the scope of the invention. Thereafter, in Step 1424, the unicast MAC frame is bridged across the identified INI of the non-service (remote) VTEP to the directly-connected intercept destination host (or intercept destination virtual machine).

Turning to FIG. 14C, in Step 1440, after determining (in Step 1406) that the intercept destination host (or intercept destination virtual machine) MAC address is unknown on the reverse-service VNI, the unicast MAC frame is flooded to all destinations known on the reverse-service VNI. In one embodiment of the invention, through MAC learning and/or the receipt of MAC programming instructions (MPIs) (described above), destinations known on the reverse-service VNI may include, but are not limited to: any and all INIs of the non-service (remote) VTEP, behind which at least one intercept host (or intercept virtual machine) may reside. Accordingly, a copy of the unicast MAC frame may find its way to the directly-connected intercept destination host/ virtual machine via traversal of the identified INI of the non-service (remote) VTEP.

Figure 15A:
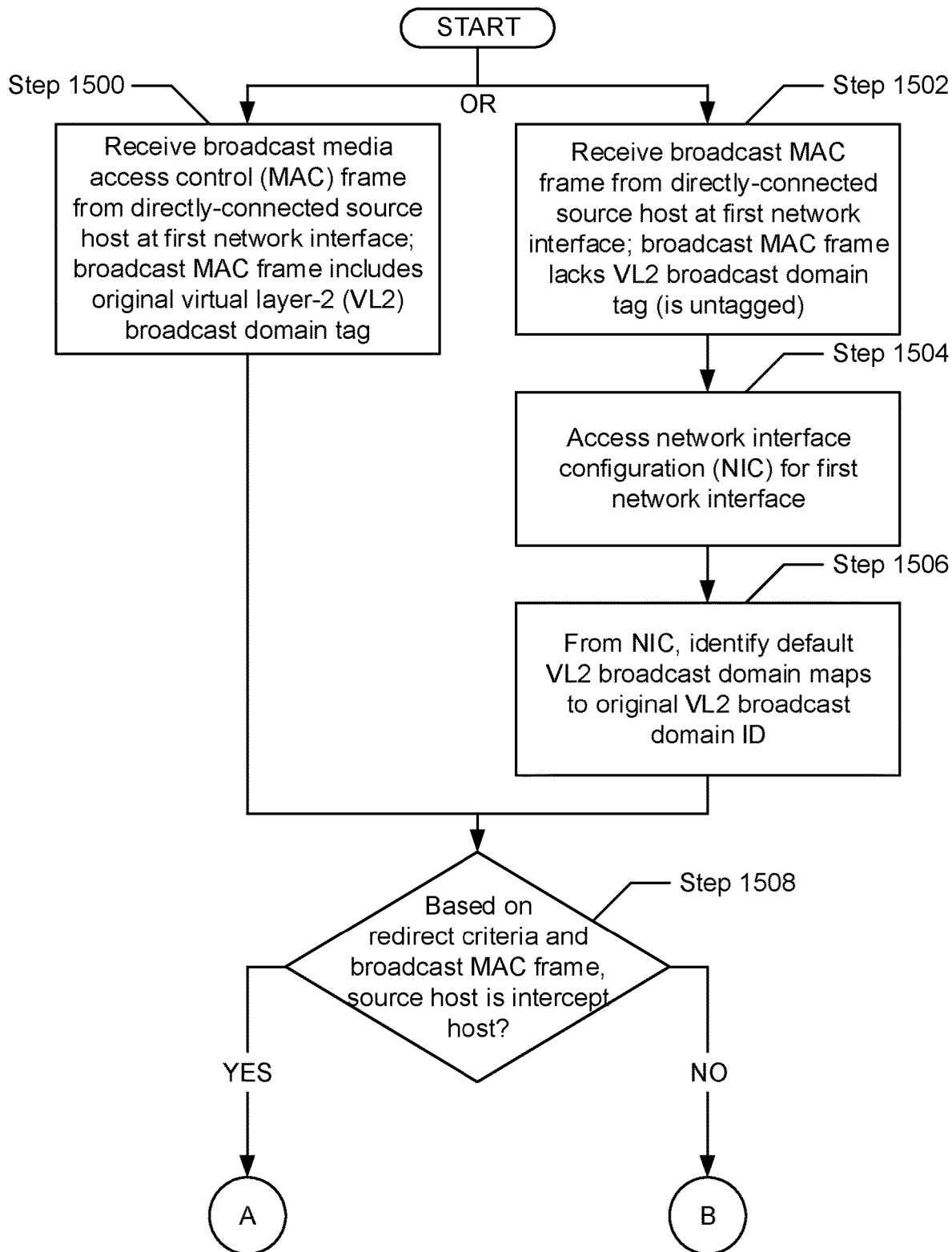
FIGS. 15A-15C show flowcharts describing a method for transmitting redirected broadcast network traffic within a zone in accordance with one or more embodiments of the invention.
Figure 15B:
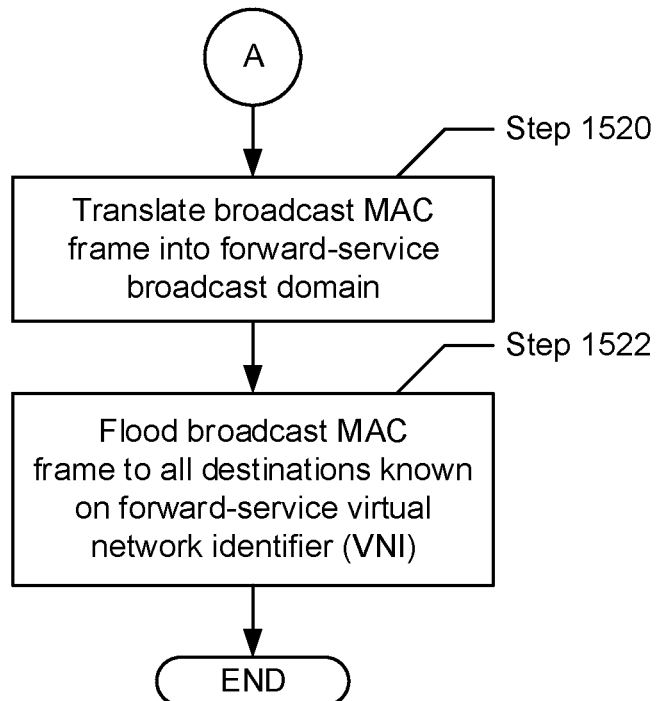
Figure 15C:
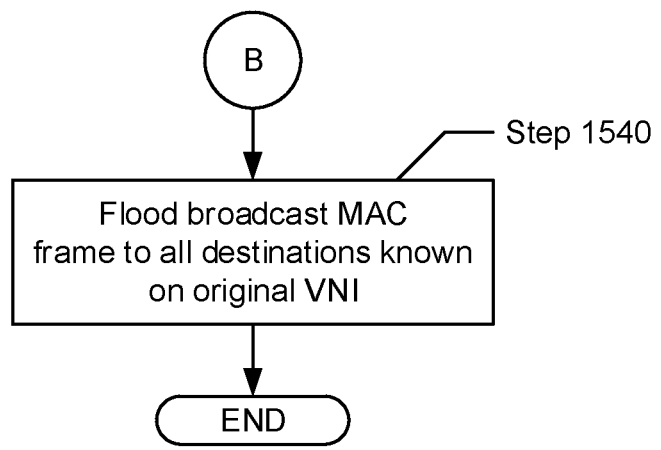

FIGS. 15A-15C show flowcharts describing a method for transmitting redirected broadcast network traffic within a zone in accordance with one or more embodiments of the invention. The various steps outlined below may be performed by a non-service virtual tunnel end point (VTEP) (i.e., a VTEP not directly-connected to a service device (or a remote VTEP)). Further, while the various steps in the flowcharts are presented and described sequentially, one of ordinary skill will appreciate that some or all steps may be executed in different orders, may be combined or omitted, and some or all steps may be executed in parallel.

Turning to FIG. 15A, in Step 1500, a broadcast media access control (MAC) frame is received. In one embodiment of the invention, a broadcast MAC frame may refer to a MAC frame addressed to multiple—e.g., any and all— destination hosts (or destination virtual machines). Further, the broadcast MAC frame may have been generated and transmitted by, and thus, may have originated from a directly-connected source host (or source virtual machine). Moreover, in one embodiment of the invention, the broadcast MAC frame may include or specify an original virtual layer-2 (VL2) broadcast domain tag (e.g., an original virtual local area network (VLAN) tag). The original VL2 broadcast domain tag may include information that identifies the broadcast MAC frame as being associated with an original VL2 broadcast domain (e.g., an original VLAN). The original VL2 broadcast domain tag may include additional information without departing from the scope of the invention.

In another embodiment of the invention, in Step 1502, a broadcast MAC frame lacking a VL2 broadcast domain tag may be received. Accordingly, the broadcast MAC frame may be received untagged. In such an embodiment, based on identifying that the broadcast MAC frame is untagged, in Step 1504, a network interface configuration (NIC) for the network interface, through which the untagged broadcast MAC frame had been received, is accessed. In one embodiment of the invention, the NIC for the network interface may track various properties (or attributes) associated with the network interface. By way an example, the NIC for the network interface may track a membership property (or attribute) belonging to the network interface, which may identify one or more virtual network identifiers (VNIs), including a default VNI, of which the network interface may be enrolled as a member.

In Step 1506, from the NIC (accessed in Step 1504), the default VNI of which the network interface (i.e., through which the untagged broadcast MAC frame had been received) is a member is identified. Specifically, as mentioned above, the default VNI may be identified by examining a membership property (or attribute) disclosed in the NIC of the network interface. Further, the default VNI may subsequently identify the corresponding default VL2 broadcast domain with which the default VNI is associated. Accordingly, in one embodiment of the invention, the identified default VNI for the network interface may identify the original VL2 broadcast domain as the default VL2 broadcast domain associated with the default VNI. In one or more other embodiments of the invention, the identified default VNI for the network interface may alternatively identify any other VL2 broadcast domain as the default VL2 broadcast domain associated with the default VNI. Hereinafter, the header field of the broadcast MAC frame associated with the VL2 broadcast domain tag may subsequently be modified to include the default VL2 broadcast domain tag (e.g., the original VL2 broadcast domain tag).

In Step 1508, after receipt of the broadcast MAC frame (either in Step 1500 or through Steps 1502 to 1506), a determination is made as to whether the source host is an intercept host. In one embodiment of the invention, an intercept host may refer to a host where network traffic therefrom and/or thereto may be intercepted and inspected by a service device. Identification of the source host as an intercept host may be determined based on one or more service policies (specified in redirect criteria (described above)) and header information specified in the broadcast MAC frame. For example, the source host may be recognized as an intercept host because the source host MAC address (specified in the header information of the broadcast MAC frame) is tied to a service policy or rule specified in the redirect criteria. By way of another example, the source host may be recognized as an intercept host because the source host IP address (specified in header information of the broadcast MAC frame) is tied to a service policy or rule specified in the redirect criteria.

In one embodiment of the invention, if it is determined that the source host (or source virtual machine) is tied to any service policy or rule specified in the redirect criteria, then the source host (or source virtual machine) is recognized as an intercept host. Accordingly, based on this determination, the process may proceed to Step 1520 (see e.g., FIG. 15B). On the other hand, in another embodiment of the invention, if it is alternatively determined that the source host (or source virtual machine) is not tied to any service policy or rule specified in the redirect criteria, then the source host (or source virtual machine) is recognized as a non-intercept host (or virtual machine). Accordingly, based on this determination, the process may alternatively proceed to Step 1540 (see e.g., FIG. 15C).

Turning to FIG. 15B, in Step 1520, after determining (in Step 1508) that the source host (or source virtual machine) is an intercept host (or virtual machine), the broadcast MAC frame (received in Step 1500 or 1502) is translated into the forward-service VL2 broadcast domain. In one embodiment of the invention, this translation may transpire because of an intercept-specific traffic flow rule (TFR) (described above)—e.g., dictating the translation of any ingress network traffic (i.e., the broadcast MAC frame) traversing an intercept network interface (INI) (see e.g., FIG. 2) of an intercept VTEP from the original VL2 broadcast domain to the forward-service VL2 broadcast domain, where the source MAC address specified in the ingress network traffic is associated with an intercept host. Furthermore, the aforementioned translation may entail replacing the original VL2 broadcast domain tag, specified in header information of the broadcast MAC frame, with a forward-service VL2 broadcast domain tag. The forward-service VL2 broadcast domain tag may include information that identifies the unicast MAC frame as being associated with a forward-service VL2 broadcast domain. The forward-service VL2 broadcast domain tag may include additional information without departing from the scope of the invention.

In Step 1522, the broadcast MAC frame is subsequently flooded to all destinations known on the forward-service VNI. In one embodiment of the invention, through MAC learning and/or the receipt of MAC programming instructions (MPIs) (described above), destinations known on the forward-service VNI may include, but are not limited to: (i) the near network interface (NNI) of a service VTEP, behind which a service device may reside; and (ii) at least one intercept network interface (INI) (see e.g., FIG. 2) of one or more intercept VTEPs, behind which at least one intercept host (or intercept virtual machine) may reside.

Turning to FIG. 15C, after determining (in Step 1508) that the source host (or source virtual machine) is a non-intercept host (or virtual machine), the broadcast MAC frame (received in Step 1500 or 1502), the broadcast MAC frame is flooded to all destinations known on the original VNI. In one embodiment of the invention, through MAC learning and/or the receipt of MAC programming instructions (MPIs) (described above), destinations known on the original VNI may include, but are not limited to: the far network interface (FNI) of a service VTEP, behind which a service device may reside.

FIGS. 16A-16D show flowcharts describing a method for receiving redirected broadcast network traffic within a zone in accordance with one or more embodiments of the invention. The various steps outlined below may be performed by a service virtual tunnel end point (VTEP) (i.e., a VTEP directly-connected to a service device). Further, while the various steps in the flowcharts are presented and described sequentially, one of ordinary skill will appreciate that some or all steps may be executed in different orders, may be combined or omitted, and some or all steps may be executed in parallel.

Figure 16A:
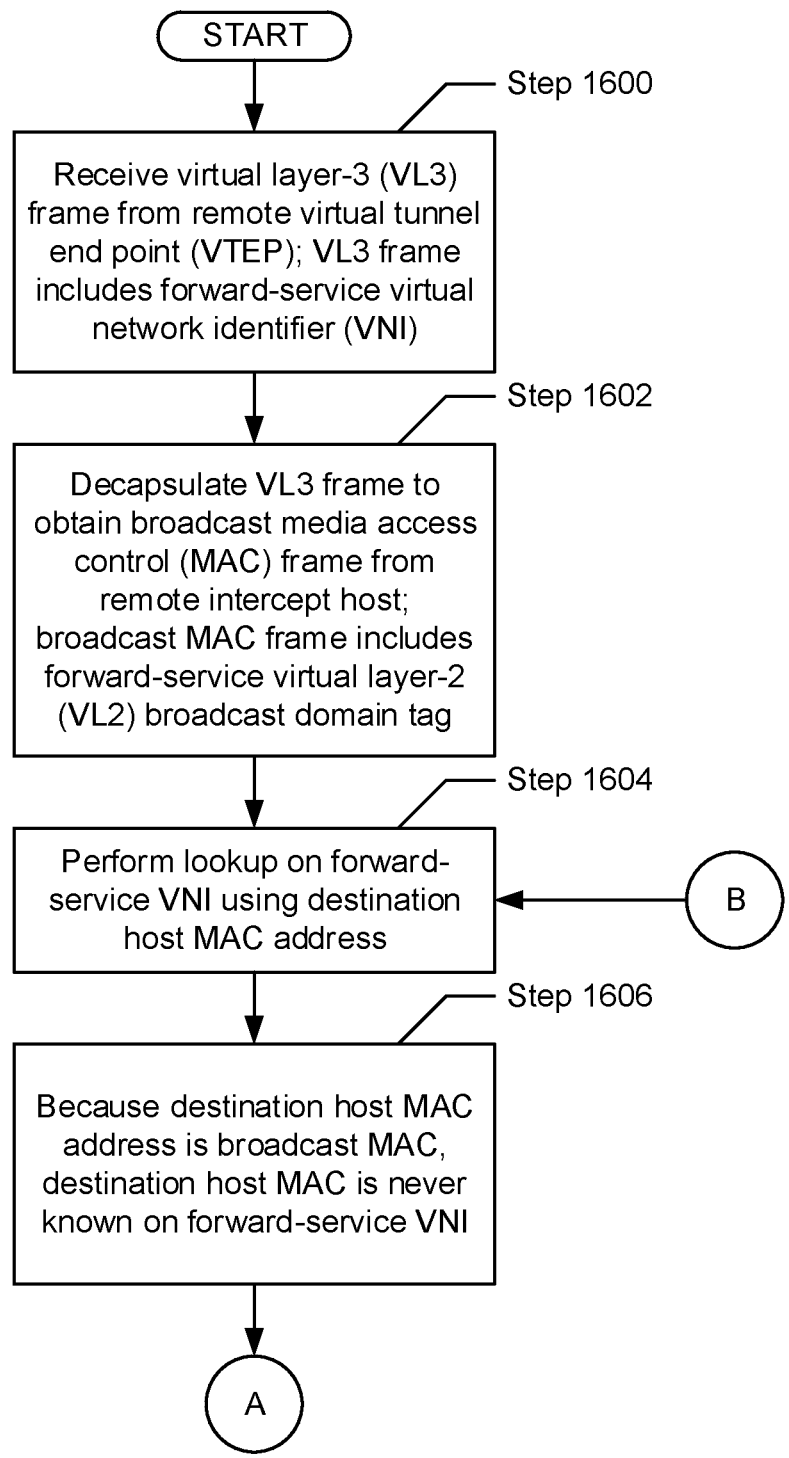

Turning to FIG. 16A, in Step 1600, a virtual layer-3 (VL3) frame is received. In one embodiment of the invention, the VL3 frame may have originated from a remote, non-service VTEP. Further, the VL3 frame may include or specify a forward-service virtual network identifier (VNI) within header information. The forward-service VNI may identify with a forward-service virtual layer-2 (VL2) broadcast domain. Moreover, the forward-service VL2 broadcast domain may be implemented as a unique, unidirectional overlay tunnel (e.g., a virtual extensible local area network (VXLAN) tunnel) through which network traffic, intercepted based on redirect criteria, may have been redirected to a service device for inspection.

In Step 1602, the VL3 frame (received in Step 1600) is decapsulated. Specifically, in one embodiment of the invention, decapsulation may entail removing the L3 header information included or specified in the VL3 frame, thereby exposing a broadcast media access control (MAC) frame enclosed therein. The broadcast MAC frame may have originated from a remote, intercept host (or intercept virtual machine). Furthermore, the broadcast MAC frame may include or specify a forward-service VL2 broadcast domain tag (e.g., a forward-service virtual local area network (VLAN) tag). The forward-service VL2 broadcast domain tag may include information that identifies the broadcast MAC frame as being associated with a forward-service VL2 broadcast domain. The forward-service VL2 broadcast domain tag may include additional information without departing from the scope of the invention.

In Step 1604, a lookup is performed on a forward-service virtual network identifier (VNI) using a destination host (or destination virtual machine) MAC address specified in header information of the broadcast MAC frame. In one embodiment of the invention, the forward-service VNI may identify with the forward-service VL2 broadcast domain. Moreover, the aforementioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 1606, based on the lookup (performed in Step 1604), it is determined that the destination host (or destination virtual machine) MAC address is unknown on the forward-service VNI. That is, in one embodiment of the invention, the destination host (or destination virtual machine) MAC address specific to any given broadcast MAC frame (e.g., the broadcast MAC frame obtained in Step 1602) is a unique broadcast MAC address—i.e., FF:FF:FF:FF:FF:FF. Further, this unique broadcast MAC address may be configured such that it is never known to at least the forward-service VNI. Subsequently, the destination host/ virtual machine MAC address is recognized as being unknown on the forward-service VNI. Accordingly, based on this determination, the process proceeds to Step 1640 (see e.g., FIG. 16C).

Figure 16B:
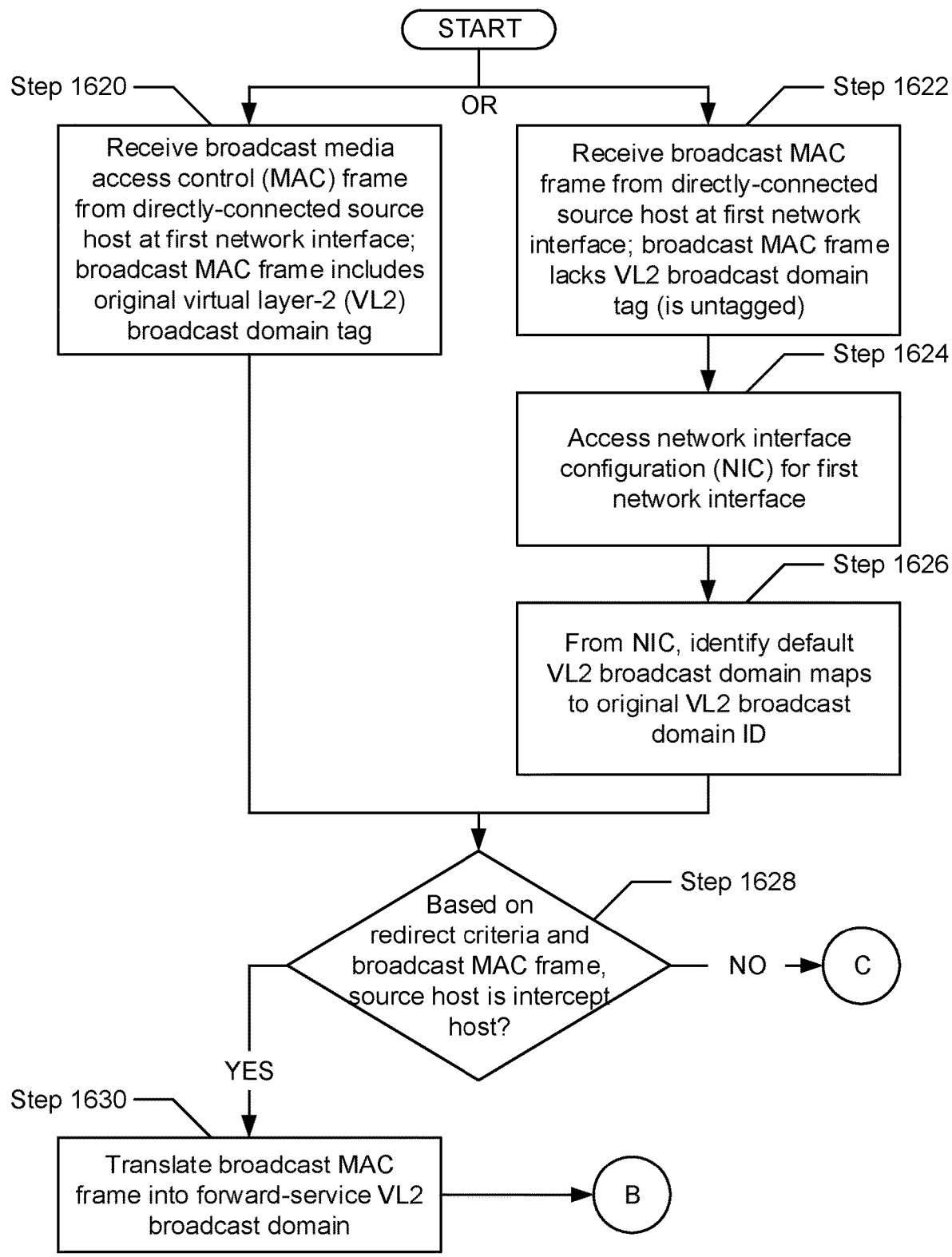

Turning to FIG. 16B, rather than receiving a VL3 frame (in Step 1600), in another embodiment of the invention and in Step 1620, a broadcast MAC frame is received. In one embodiment of the invention, the broadcast MAC frame may have been generated and transmitted by, and thus, may have originated from a directly-connected source host (or source virtual machine). Moreover, in one embodiment of the invention, the broadcast MAC frame may include or specify an original virtual layer-2 (VL2) broadcast domain tag (e.g., an original virtual local area network (VLAN) tag). The original VL2 broadcast domain tag may include information that identifies the broadcast MAC frame as being associated with an original VL2 broadcast domain (e.g., an original VLAN). The original VL2 broadcast domain tag may include additional information without departing from the scope of the invention.

Further, in another embodiment of the invention, in Step 1622, a broadcast MAC frame lacking a VL2 broadcast domain tag may be received. Accordingly, the broadcast MAC frame may be received untagged. In such an embodiment, based on identifying that the broadcast MAC frame is untagged, in Step 1624, a network interface configuration (NIC) for the network interface, through which the untagged broadcast MAC frame had been received, is accessed. In one embodiment of the invention, the NIC for the network interface may track various properties (or attributes) associated with the network interface. By way an example, the NIC for the network interface may track a membership property (or attribute) belonging to the network interface, which may identify one or more virtual network identifiers (VNIs), including a default VNI, of which the network interface may be enrolled as a member.

In Step 1626, from the NIC (accessed in Step 1624), the default VNI of which the network interface (i.e., through which the untagged broadcast MAC frame had been received) is a member is identified. Specifically, as mentioned above, the default VNI may be identified by examining a membership property (or attribute) disclosed in the NIC of the network interface. Further, the default VNI may subsequently identify the corresponding default VL2 broadcast domain with which the default VNI is associated. Accordingly, in one embodiment of the invention, the identified default VNI for the network interface may identify the original VL2 broadcast domain as the default VL2 broadcast domain associated with the default VNI. In one or more other embodiments of the invention, the identified default VNI for the network interface may alternatively identify any other VL2 broadcast domain as the default VL2 broadcast domain associated with the default VNI. Hereinafter, the header field of the broadcast MAC frame associated with the VL2 broadcast domain tag may subsequently be modified to include the default VL2 broadcast domain tag (e.g., the original VL2 broadcast domain tag).

In Step 1628, after receipt of the broadcast MAC frame (either in Step 1620 or through Steps 1622 to 1626), a determination is made as to whether the source host is an intercept host. In one embodiment of the invention, an intercept host may refer to a host where network traffic therefrom and/or thereto may be intercepted and inspected by a service device. Identification of the source host as an intercept host may be determined based on one or more service policies (specified in redirect criteria (described above)) and header information specified in the broadcast MAC frame. For example, the source host may be recognized as an intercept host because the source host MAC address (specified in the header information of the broadcast MAC frame) is tied to a service policy or rule specified in the redirect criteria. By way of another example, the source host may be recognized as an intercept host because the source host IP address (specified in header information of the broadcast MAC frame) is tied to a service policy or rule specified in the redirect criteria.

In one embodiment of the invention, if it is determined that the source host (or source virtual machine) is tied to any service policy or rule specified in the redirect criteria, then the source host (or source virtual machine) is recognized as an intercept host. Accordingly, based on this determination, the process may proceed to Step 1630. On the other hand, in another embodiment of the invention, if it is alternatively determined that the source host (or source virtual machine) is not tied to any service policy or rule specified in the redirect criteria, then the source host (or source virtual machine) is recognized as a non-intercept host (or virtual machine). Accordingly, based on this determination, the process may alternatively proceed to Step 1660 (see e.g., FIG. 16D).

In Step 1630, after determining (in Step 1628) that the source host (or source virtual machine) is an intercept host/virtual machine, the broadcast MAC frame (received in Step 1620 or 1622) is translated into the forward-service VL2 broadcast domain. In one embodiment of the invention, this translation may transpire because of an intercept-specific traffic flow rule (TFR) (described above)—e.g., dictating the translation of any ingress network traffic (i.e., the broadcast MAC frame) traversing an intercept network interface (INI) (see e.g., FIG. 2) of an intercept VTEP from the original VL2 broadcast domain to the forward-service VL2 broadcast domain, where the source MAC address specified in the ingress network traffic is associated with an intercept host. Furthermore, the aforementioned translation may entail replacing the original VL2 broadcast domain tag, specified in header information of the broadcast MAC frame, with a forward-service VL2 broadcast domain tag. The forward-service VL2 broadcast domain tag may include information that identifies the unicast MAC frame as being associated with a forward-service VL2 broadcast domain. The forward-service VL2 broadcast domain tag may include additional information without departing from the scope of the invention. Hereinafter, the process may proceed to Step 1604 (see e.g., FIG. 16A).

Turning to FIG. 16C, in Step 1640, based on the determination (in Step 1606) that the destination host (or destination virtual machine) MAC address is unknown on the forward-service VNI, a network interface out of which the broadcast MAC frame may be transmitted, towards the service device, is identified. In one embodiment of the invention, the aforementioned network interface, entailing either a physical or virtual network interface, may be identified through the performance of a lookup on a MAC address table using the destination host (or destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the broadcast MAC frame should be transmitted through the near network interface (NNI) of the service VTEP. Accordingly, based on this determination, the unicast MAC frame may be directed to the NNI of the service VTEP.

In Step 1642, the broadcast MAC frame is subsequently translated into the original VL2 broadcast domain. In one embodiment of the invention, this translation may transpire because of a service-specific traffic flow rule (TFR) (described above)—e.g., dictating the translation of any egress network traffic (i.e., the broadcast MAC frame) traversing the NNI of the service VTEP from the forward-service VL2 broadcast domain to the original VL2 broadcast domain. Furthermore, the aforementioned translation may entail replacing the forward-service VL2 broadcast domain tag, specified in header information of the broadcast MAC frame, with an original VL2 broadcast domain tag. The original VL2 broadcast domain tag may include information that identifies the broadcast MAC frame as being associated with the original VL2 broadcast domain. The original VL2 broadcast domain tag may include additional information without departing from the scope of the invention. In Step 1644, after the translation (performed in Step 1642), the broadcast MAC frame is bridged across the NNI of the service VTEP to a directly-connected service device.

Turning to FIG. 16D, in Step 1660, after determining (in Step 1628) that the source host (or source virtual machine) is a non-intercept host/virtual machine, a network interface out of which the broadcast MAC frame may be transmitted, towards the service device, is identified. In one embodiment of the invention, the aforementioned network interface, entailing either a physical or virtual network interface, may be identified through the performance of a lookup on a MAC address table using the destination host (or destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the broadcast MAC frame should be transmitted through the far network interface (FNI) of the service VTEP. Accordingly, based on this determination, the broadcast MAC frame may be directed to the FNI of the service VTEP. Thereafter, in Step 1662, the broadcast MAC frame is subsequently bridged across the FNI of the service VTEP to a directly-connected service device.

Figure 17A:
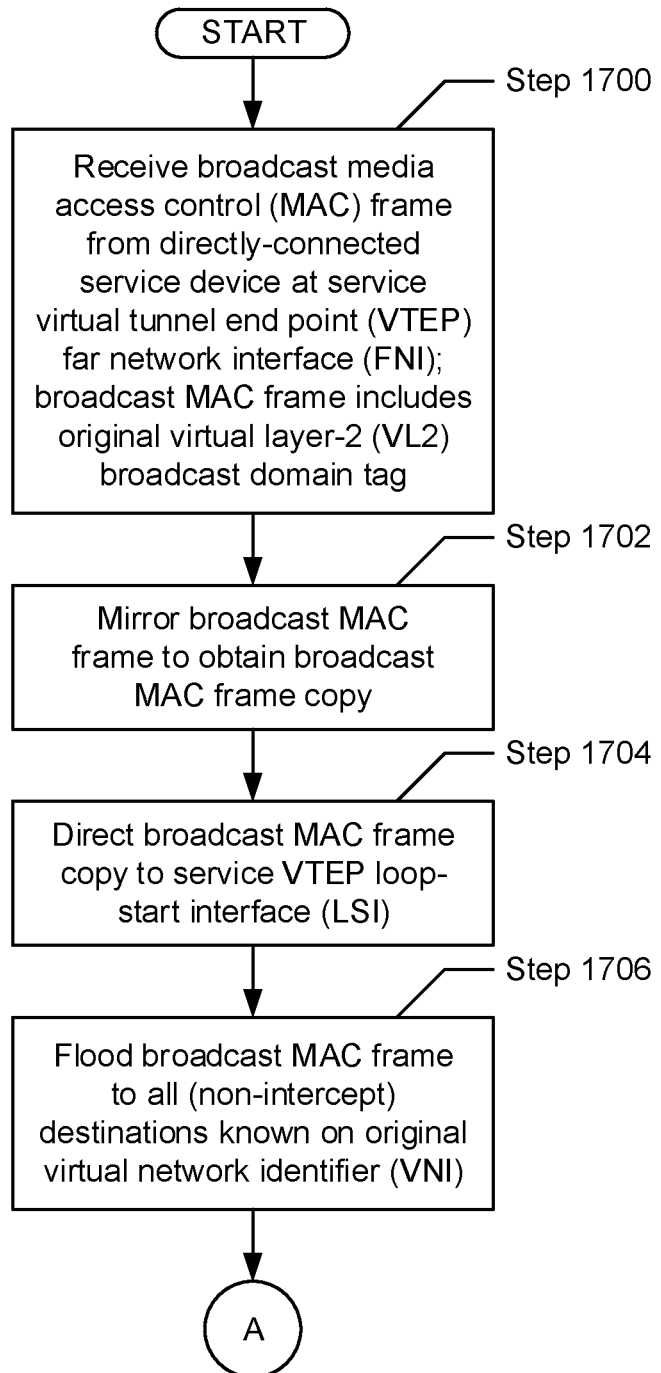
FIGS. 17A and 17B show flowcharts describing a method for transmitting inspected broadcast network traffic within a zone in accordance with one or more embodiments of the invention.
Figure 17B:
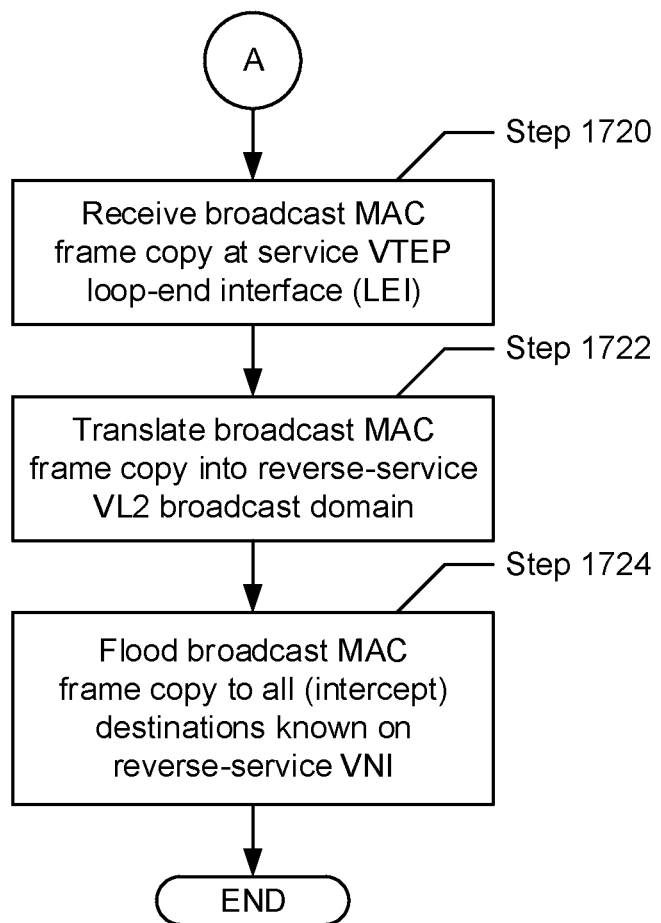

FIGS. 17A and 17B show flowcharts describing a method for transmitting inspected broadcast network traffic within a zone in accordance with one or more embodiments of the invention. The various steps outlined below may be performed by a service virtual tunnel end point (VTEP) (i.e., a VTEP directly-connected to a service device). Further, while the various steps in the flowcharts are presented and described sequentially, one of ordinary skill will appreciate that some or all steps may be executed in different orders, may be combined or omitted, and some or all steps may be executed in parallel.

Turning to FIG. 17A, a broadcast media access control (MAC) frame is received from a directly-connected service device. In one embodiment of the invention, the broadcast MAC frame may arrive through a far network interface (FNI) (see e.g., FIG. 2) of the service VTEP. Further, the broadcast MAC frame may include or specify an original virtual layer-2 (VL2) broadcast domain tag within its L2 header information. The original VL2 broadcast domain tag may include information that identifies the broadcast MAC frame as being associated with an original VL2 broadcast domain. The original VL2 broadcast domain tag may include additional information without departing from the scope of the invention.

In Step 1702, a broadcast MAC frame copy is obtained through port mirroring. In one embodiment of the invention, port mirroring may refer to the replication of network traffic seen on one network interface to yield a copy of that network traffic, which may then be directed to another network interface. Furthermore, the port mirroring may transpire because of a service-specific network interface configuration (NIC) (described above)—e.g., dictating the configuration of a mirroring property (or attribute) belonging to the FNI of the service VTEP such that the FNI mirrors any ingress network traffic at the FNI to the loop-start interface (LSI) (see e.g., FIG. 2) of the service VTEP. Accordingly, in Step 1704, based on the aforementioned service-specific NIC, the broadcast MAC frame copy (obtained in Step 1702) is directed to the LSI of the service VTEP.

In Step 1706, the broadcast MAC frame (received in Step 1700) is subsequently flooded to all destinations known on an original virtual network identifier (VNI). In one embodiment of the invention, the original VNI may identify with the original VL2 broadcast domain. Further, through MAC learning and/or the receipt of MAC programming instructions (MPIs) (described above), destinations known on the original VNI may include, but are not limited to: any and all non-intercept hosts (or non-intercept virtual machines). Accordingly, a copy of the broadcast MAC frame may find its way to all non-intercept destination hosts (or non-intercept destination virtual machines), which may lie behind one or more remote VTEPs or may be directly-connected to the service VTEP.

Turning to FIG. 17B, after the broadcast MAC frame copy (obtained in Step 1702) is directed to the LSI of the service VTEP (in Step 1704), the broadcast MAC frame copy is received at a loop-end interface (LEI) (see e.g., FIG. 2) of the service VTEP. In one embodiment of the invention, the LSI and the LEI may be connected together using a physical loopback cable. Accordingly, any egress network traffic traversing the LSI becomes ingress network traffic arriving at the LEI.

In Step 1722, the unicast MAC frame copy is translated into the reverse-service VL2 broadcast domain. In one embodiment of the invention, this translation may transpire because of a service-specific traffic flow rule (TFR) (described above)—e.g., dictating the translation of any ingress network traffic (i.e., the broadcast MAC frame copy) traversing the LEI of the service VTEP from the original VL2 broadcast domain to the reverse-service VL2 broadcast domain. Furthermore, the aforementioned translation may entail replacing the original VL2 broadcast domain tag, specified in header information of the broadcast MAC frame copy, with a reverse-service VL2 broadcast domain tag. The reverse-service VL2 broadcast domain tag may include information that identifies the broadcast MAC frame copy as being associated with a reverse-service VL2 broadcast domain. The reverse-service VL2 broadcast domain tag may include additional information without departing from the scope of the invention.

In Step 1724, the broadcast MAC frame copy (received in Step 1720) is subsequently flooded to all destinations known on a reverse-service VNI. In one embodiment of the invention, the reverse-service VNI may identify with the reverse-service VL2 broadcast domain. Further, through MAC learning and/or the receipt of MAC programming instructions (MPIs) (described above), destinations known on the reverse-service VNI may include, but are not limited to: any and all intercept hosts (or intercept virtual machines). Accordingly, a copy of the broadcast MAC frame copy may find its way to all intercept destination hosts (or intercept destination virtual machines), which may lie behind one or more remote VTEPs or may be directly-connected to the service VTEP.

Figure 18:
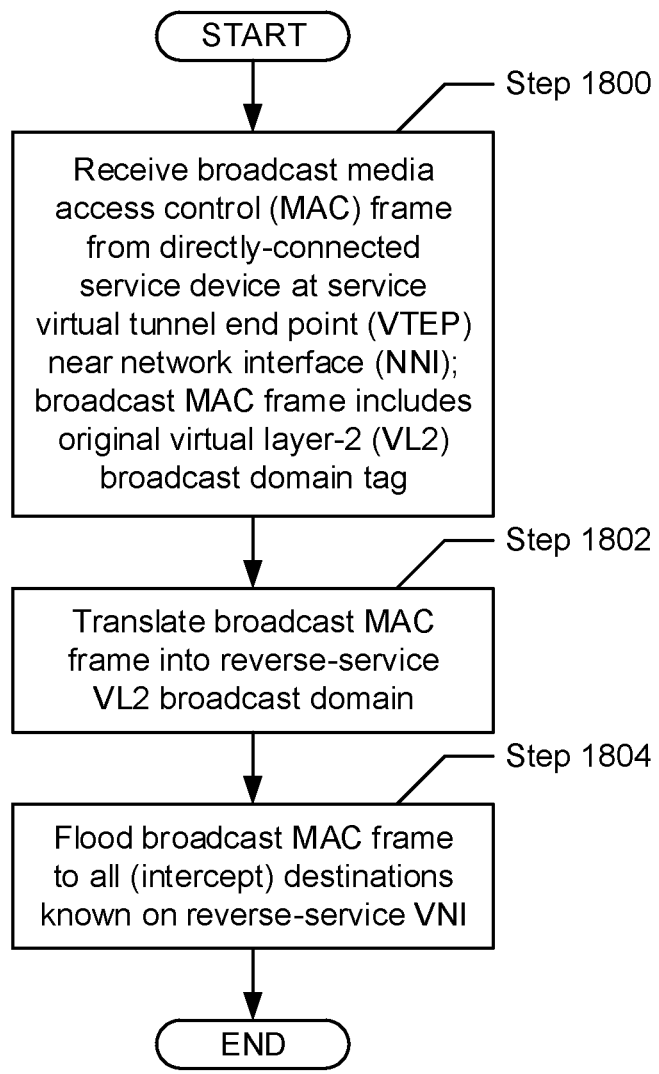
FIG. 18 shows a flowchart describing a method for transmitting inspected broadcast network traffic within a zone in accordance with one or more embodiments of the invention.

FIG. 18 shows a flowchart describing a method for transmitting inspected broadcast network traffic within a zone in accordance with one or more embodiments of the invention. The various steps outlined below may be performed by a service virtual tunnel end point (VTEP) (i.e., a VTEP directly-connected to a service device). Further, while the various steps in the flowcharts are presented and described sequentially, one of ordinary skill will appreciate that some or all steps may be executed in different orders, may be combined or omitted, and some or all steps may be executed in parallel.

Turning to FIG. 18, in Step 1800, a broadcast media access control (MAC) frame is received from a directly-connected service device. In one embodiment of the invention, the broadcast MAC frame may arrive through a near network interface (NNI) (see e.g., FIG. 2) of the service VTEP. Further, the broadcast MAC frame may include or specify an original virtual layer-2 (VL2) broadcast domain tag within its L2 header information. The original VL2 broadcast domain tag may include information that identifies the broadcast MAC frame as being associated with an original VL2 broadcast domain. The original VL2 broadcast domain tag may include additional information without departing from the scope of the invention.

In Step 1802, the broadcast MAC frame is translated into the reverse-service VL2 broadcast domain. In one embodiment of the invention, this translation may transpire because of a service-specific traffic flow rule (TFR) (described above)—e.g., dictating the translation of any egress network traffic (i.e., the broadcast MAC frame) traversing the NNI of the service VTEP from the original VL2 broadcast domain to the reverse-service VL2 broadcast domain. Furthermore, the aforementioned translation may entail replacing the original VL2 broadcast domain tag, specified in header information of the broadcast MAC frame, with a reverse-service VL2 broadcast domain tag. The reverse-service VL2 broadcast domain tag may include information that identifies the broadcast MAC frame as being associated with the reverse-service VL2 broadcast domain. The reverse-service VL2 broadcast domain tag may include additional information without departing from the scope of the invention.

In Step 1804, the broadcast MAC frame (received in Step 1800) is subsequently flooded to all destinations known on a reverse-service VNI. In one embodiment of the invention, the reverse-service VNI may identify with the reverse-service VL2 broadcast domain. Further, through MAC learning and/or the receipt of MAC programming instructions (MPIs) (described above), destinations known on the reverse-service VNI may include, but are not limited to: any and all intercept hosts (or intercept virtual machines). Accordingly, a copy of the broadcast MAC frame may find its way to all intercept destination hosts (or intercept destination virtual machines), which may lie behind one or more remote VTEPs or may be directly-connected to the service VTEP.

Figure 19A:
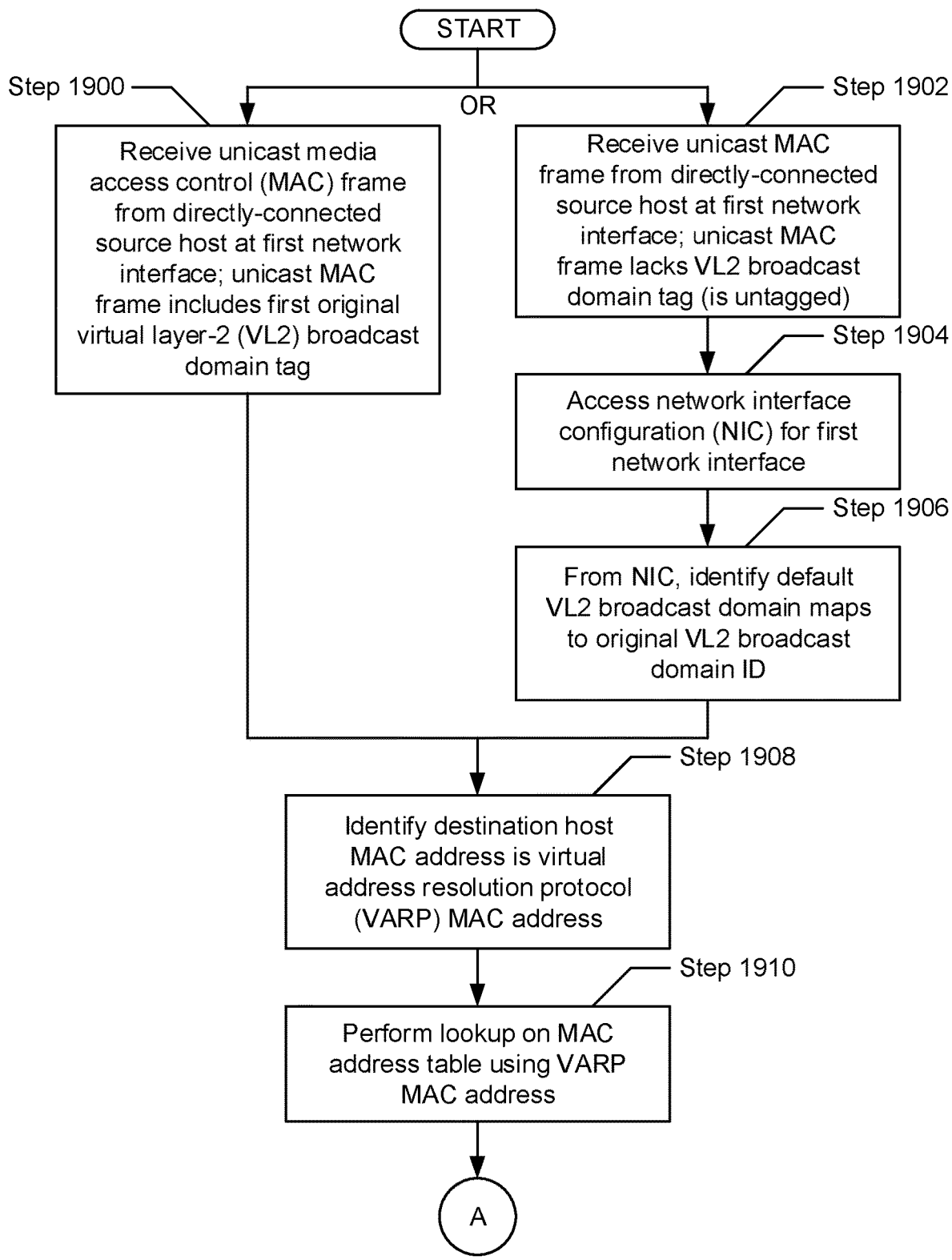
FIGS. 19A and 19B show flowcharts describing a method for transmitting redirected unicast network traffic within a first zone in accordance with one or more embodiments of the invention.
Figure 19B:
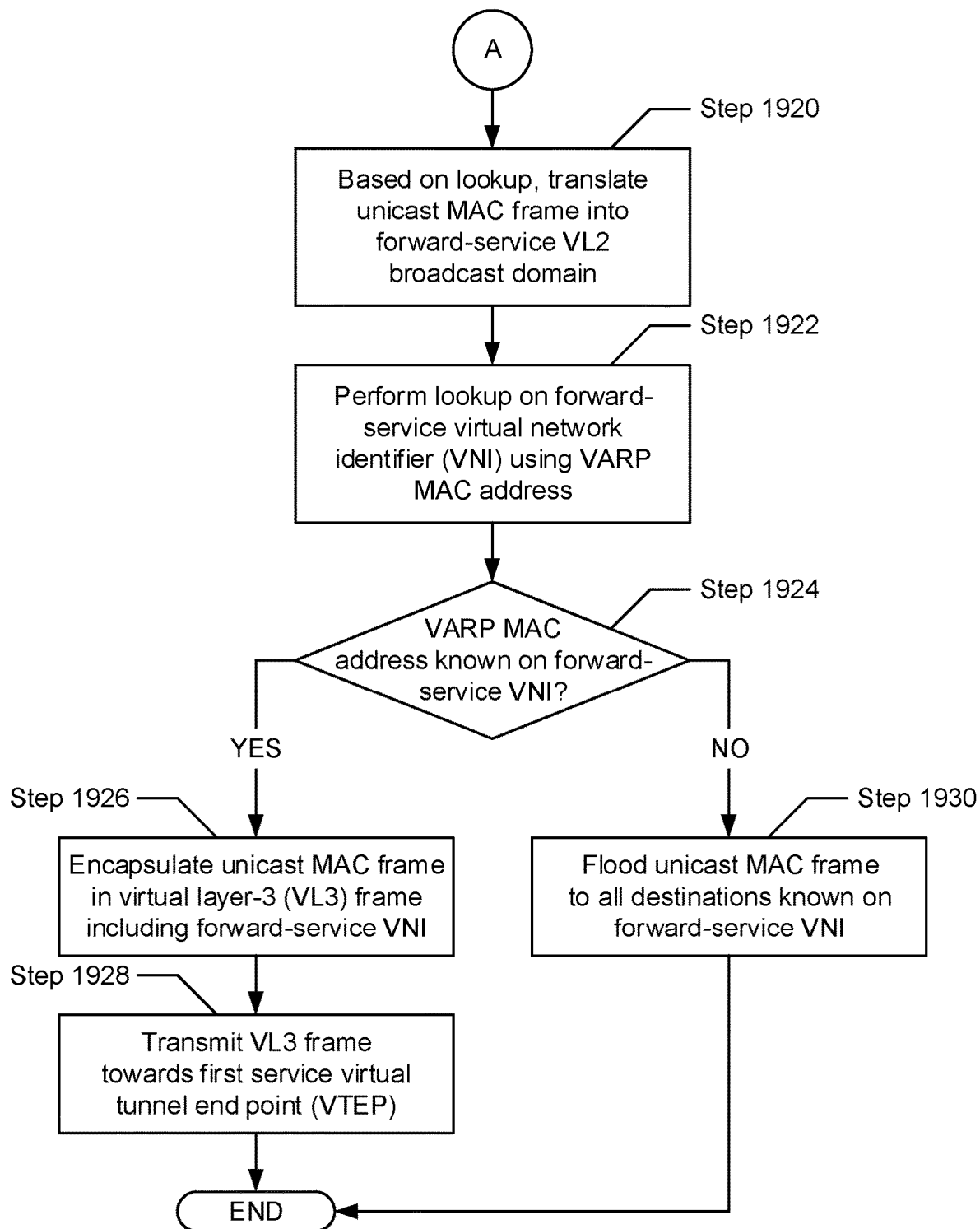

FIGS. 19A and 19B show flowcharts describing a method for transmitting redirected unicast network traffic within a first zone in accordance with one or more embodiments of the invention. The various steps outlined below may be performed by a first non-service virtual tunnel end point (VTEP) (i.e., a VTEP not directly-connected to a service device (or a remote VTEP)) residing within a first subnet or zone. Further, while the various steps in the flowcharts are presented and described sequentially, one of ordinary skill will appreciate that some or all steps may be executed in different orders, may be combined or omitted, and some or all steps may be executed in parallel.

Turning to FIG. 19A, in Step 1900, a unicast media access control (MAC) frame is received. In one embodiment of the invention, a unicast MAC frame may refer to a MAC frame addressed to a single destination host (or destination virtual machine). Further, the unicast MAC frame may have been generated and transmitted by, and thus, may have originated from a directly-connected source host (or source virtual machine). Moreover, in one embodiment of the invention, the unicast MAC frame may include or specify an original virtual layer-2 (VL2) broadcast domain tag (e.g., an original virtual local area network (VLAN) tag). The original VL2 broadcast domain tag may include information that identifies the unicast MAC frame as being associated with an original VL2 broadcast domain (e.g., an original VLAN). The original VL2 broadcast domain tag may include additional information without departing from the scope of the invention.

In another embodiment of the invention, in Step 1902, a unicast MAC frame lacking a VL2 broadcast domain tag may be received. Accordingly, the unicast MAC frame may be received untagged. In such an embodiment, based on identifying that the unicast MAC frame is untagged, in Step 1904, a network interface configuration (NIC) for the network interface, through which the untagged unicast MAC frame had been received, is accessed. In one embodiment of the invention, the NIC for the network interface may track various properties (or attributes) associated with the network interface. By way an example, the NIC for the network interface may track a membership property (or attribute)

belonging to the network interface, which may identify one or more virtual network identifiers (VNIs), including a default VNI, of which the network interface may be enrolled as a member.

In Step 1906, from the NIC (accessed in Step 1904), the default VNI of which the network interface (i.e., through which the untagged unicast MAC frame had been received) is a member is identified. Specifically, as mentioned above, the default VNI may be identified by examining a membership property (or attribute) disclosed in the NIC of the network interface. Further, the default VNI may subsequently identify the corresponding default VL2 broadcast domain with which the default VNI is associated. Accordingly, in one embodiment of the invention, the identified default VNI for the network interface may identify the original VL2 broadcast domain as the default VL2 broadcast domain associated with the default VNI. In one or more other embodiments of the invention, the identified default VNI for the network interface may alternatively identify any other VL2 broadcast domain as the default VL2 broadcast domain associated with the default VNI. Hereinafter, the header field of the unicast MAC frame associated with the VL2 broadcast domain tag may subsequently be modified to include the default VL2 broadcast domain tag (e.g., the original VL2 broadcast domain tag).

In Step 1908, after receipt of the unicast MAC frame (either in Step 1900 or through Steps 1902 to 1906), the destination host MAC address is identified as a virtual address resolution protocol (VARP) MAC address. In one embodiment of the invention, the VARP may be directed to optimizing L3 forwarding across a network. Specifically, the VARP may be implemented by configuring multiple network elements with a shared virtual IP address (i.e., a VARP IP address) that may resolve to a shared virtual MAC address (i.e., the VARP MAC address). Further, when a host transmits a MAC frame specifying the shared virtual MAC address, any one of the multiple network elements may intercept the MAC frame and, subsequently, may perform L3 routing.

Accordingly, in Step 1910, a lookup is performed on a MAC address table using the VARP MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

Turning to FIG. 19B, in Step 1920, based on the above-mentioned lookup on the MAC address table (performed in Step 1910), it may be determined that that the unicast MAC frame should be transmitted to a first service VTEP (i.e., the service VTEP servicing the local subnet or zone). Accordingly, based on this determination, the unicast MAC frame may be translated into the forward-service VL2 broadcast domain. In one embodiment of the invention, the aforementioned translation may entail replacing the first original VL2 broadcast domain tag, specified in header information of the unicast MAC frame, with a forward-service VL2 broadcast domain tag. The forward-service VL2 broadcast domain tag may include information that identifies the unicast MAC frame as being associated with a forward-service VL2 broadcast domain. The forward-service VL2 broadcast domain tag may include additional information without departing from the scope of the invention.

In Step 1922, a lookup is performed on a forward-service virtual network identifier (VNI) using the VARP MAC address specified in header information of the unicast MAC frame. In one embodiment of the invention, the forward-service VNI may identify with the forward-service VL2 broadcast domain. Moreover, the aforementioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 1924, based on the lookup (performed in Step 1922), a determination is made as to whether the VARP MAC address is known on the forward-service VNI. In one embodiment of the invention, if it is determined that an entry in the MAC-to-VNI table maps VARP MAC address to at least the forward-service VNI, then the VARP MAC address is recognized as being known on the forward-service VNI. Accordingly, based on this determination, the process may proceed to Step 1926. On the other hand, in another embodiment of the invention, if it is alternatively determined that an entry in the MAC-to-VNI table fails to map the VARP MAC address to at least the forward-service VNI, then the VARP MAC address is recognized as being unknown on the forward-service VNI. Accordingly, based on this determination, the process may alternatively proceed to Step 1930.

In Step 1926, after determining (in Step 1924) that the VARP MAC address is known on the forward-service VNI, a network interface out of which the unicast MAC frame may be transmitted, towards the first service VTEP, is identified. In one embodiment of the invention, the aforementioned network interface, entailing either a physical or virtual network interface, may be identified through the performance of a lookup on a MAC address table using the VARP MAC address.

In one embodiment of the invention, based on the above-mentioned lookup on the MAC address table, it may be determined that the unicast MAC frame should be transmitted through a certain network interface, which leads to the first service VTEP, and using an overlay tunnel that implements the forward-service VL2 broadcast domain. Subsequently, the unicast MAC frame may be encapsulated in a virtual layer-3 (VL3) frame such as, for example, a VXLAN frame, where the VL3 frame may include header information that specifies, at least in part, the forward-service VNI.

In Step 1928, the VL3 frame (obtained in Step 1926) is transmitted, through an L3 fabric (see e.g., FIG. 1), towards the first service VTEP. Specifically, in one embodiment of the invention, the VL3 frame may traverse through an overlay tunnel—i.e., representative of the forward-service VL2 broadcast domain—that originates at the first non-service VTEP (which had obtained the unicast MAC frame in Step 1900 or 1902) and, subsequently, terminates at the first service VTEP, behind which a first service device (i.e., the service device servicing the local subnet or zone) resides.

In Step 1930, after determining (in Step 1924) that the VARP MAC address is unknown on the forward-service VNI, the unicast MAC frame is flooded to all destinations known on the forward-service VNI. In one embodiment of the invention, through MAC learning and/or the receipt of MAC programming instructions (MPIs) (described above), destinations known on the forward-service VNI may include, but are not limited to: (i) the near network interface (NNI) of the first service VTEP, behind which the first service device may reside; and (ii) at least one intercept network interface (INI) (see e.g., FIG. 2) of one or more intercept VTEPs, behind which at least one intercept host (or intercept virtual machine) may reside. Furthermore, based on the imposition of intercept-specific traffic flow rules (TFRs), copies of the unicast MAC frame, intended to be flooded to the at least one INI of one or more intercept VTEPs, may be dropped in order to reduce duplicate network traffic delivery. Accordingly, only the copy of the unicast MAC frame, intended to be flooded to the NNI of the first service VTEP, may find its way thereto.

Figure 20A:
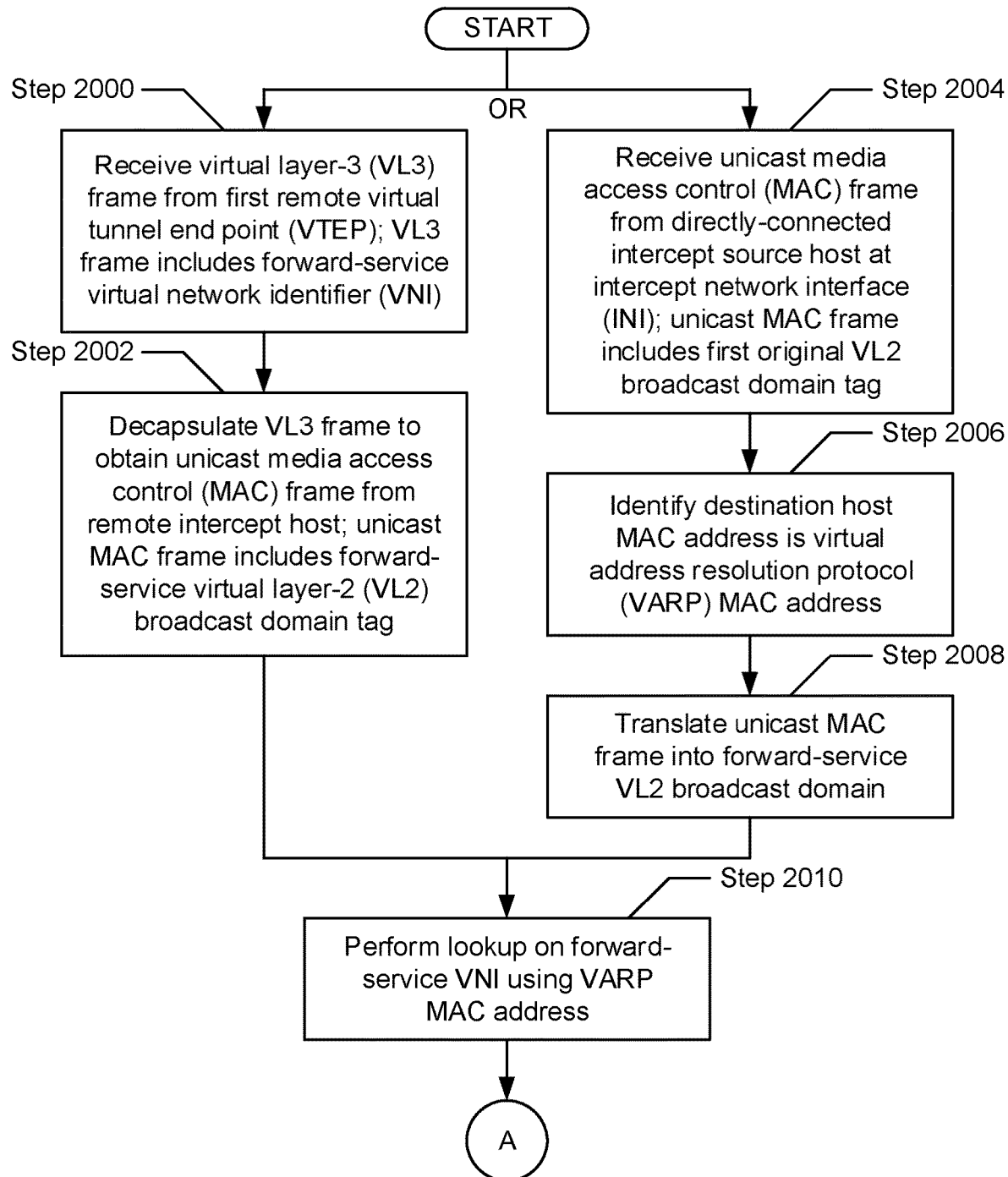
FIGS. 20A and 20B show flowcharts describing a method for receiving redirected unicast network traffic within a first zone in accordance with one or more embodiments of the invention.
Figure 20B:
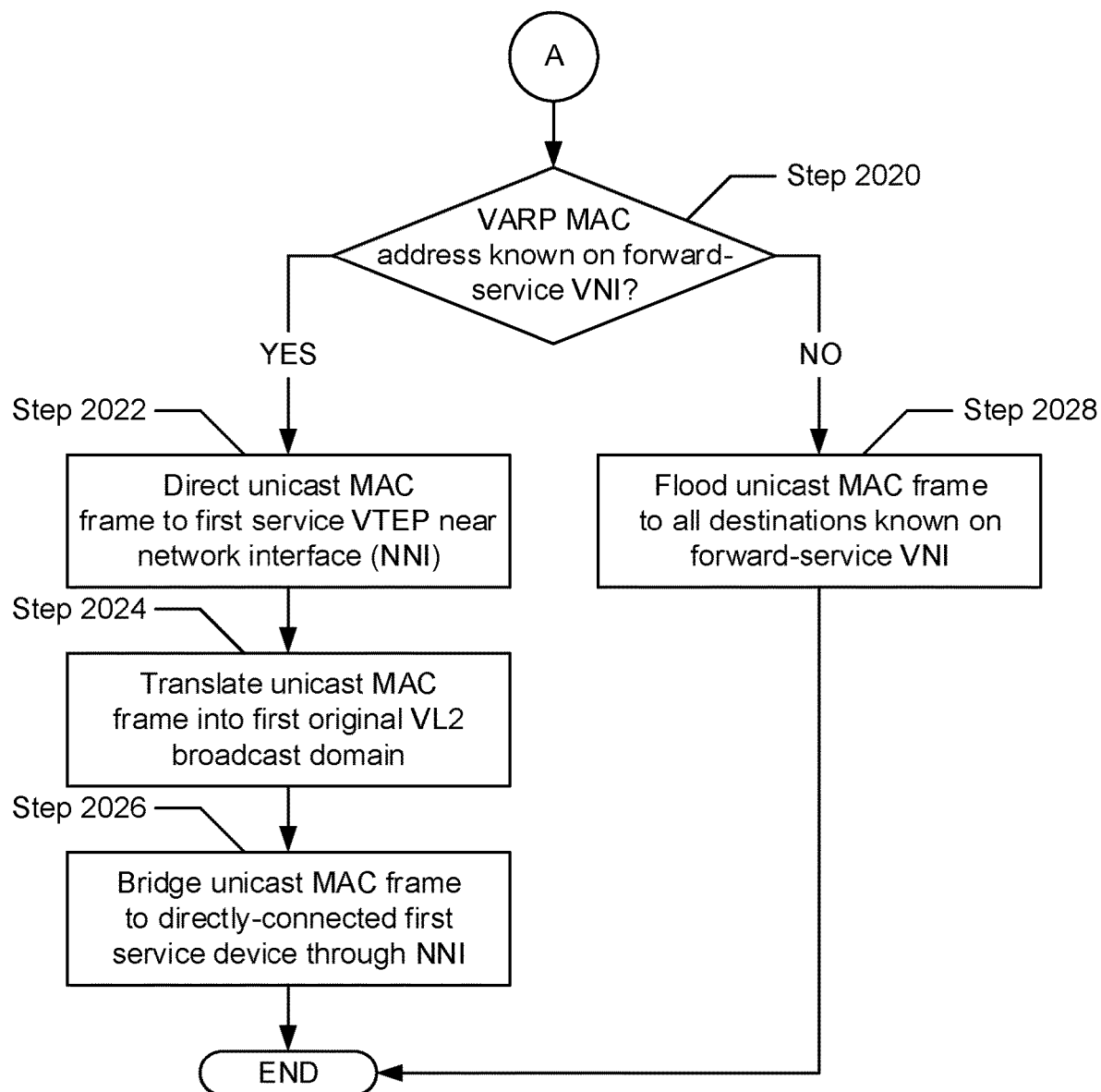

FIGS. 20A and 20B show flowcharts describing a method for receiving redirected unicast network traffic within a first zone in accordance with one or more embodiments of the invention. The various steps outlined below may be performed by a first service virtual tunnel end point (VTEP) (i.e., a VTEP directly-connected to a first service device) residing within a first subnet or zone. Further, while the various steps in the flowcharts are presented and described sequentially, one of ordinary skill will appreciate that some or all steps may be executed in different orders, may be combined or omitted, and some or all steps may be executed in parallel.

Turning to FIG. 20A, in Step 2000 and in one embodiment of the invention, a virtual layer-3 (VL3) frame is received. In one embodiment of the invention, the VL3 frame may have originated from a first remote, non-service VTEP (residing within a first subnet or zone). Further, the VL3 frame may include or specify a forward-service virtual network identifier (VNI) within header information. The forward-service VNI may identify with a forward-service virtual layer-2 (VL2) broadcast domain.

In Step 2002, the VL3 frame (received in Step 2000) is decapsulated. Specifically, in one embodiment of the invention, decapsulation may entail removing the L3 header information included or specified in the VL3 frame, thereby exposing a unicast media access control (MAC) frame enclosed therein. The unicast MAC frame may have originated from a first remote, intercept host (or intercept virtual machine). Furthermore, the unicast MAC frame may include or specify a forward-service VL2 broadcast domain tag (e.g., a forward-service virtual local area network (VLAN) tag). The forward-service VL2 broadcast domain tag may include information that identifies the unicast MAC frame as being associated with a forward-service VL2 broadcast domain. The forward-service VL2 broadcast domain tag may include additional information without departing from the scope of the invention.

In Step 2004 and in another embodiment of the invention, rather than a VL3 frame (as was the case in Step 2000), a unicast MAC frame is received. In one embodiment of the invention, the unicast MAC frame may have been generated and transmitted by, and thus, may have originated from a directly-connected source host (or source virtual machine). Moreover, the unicast MAC frame may include or specify a first original VL2 broadcast domain tag (e.g., an original virtual local area network (VLAN) tag). The original VL2 broadcast domain tag may include information that identifies the unicast MAC frame as being associated with the first original VL2 broadcast domain (e.g., an original VLAN). The first original VL2 broadcast domain tag may include additional information without departing from the scope of the invention.

In Step 2006, the destination host MAC address, specified in header information of the unicast MAC frame (received in Step 2004) is identified as a virtual address resolution protocol (VARP) MAC address. In one embodiment of the invention, the VARP may be directed to optimizing L3 forwarding across a network. Specifically, the VARP may be implemented by configuring multiple network elements with a shared virtual IP address (i.e., a VARP IP address) that may resolve to a shared virtual MAC address (i.e., the VARP MAC address). Further, when a host transmits a MAC frame specifying the shared virtual MAC address, any one of the multiple network elements may intercept the MAC frame and, subsequently, may perform L3 routing. Accordingly, hereinafter, a lookup is performed on a MAC address table using the VARP MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In Step 2008, based on the above-mentioned lookup on the MAC address table, it may be determined that that the unicast MAC frame should be transmitted to a first service VTEP (i.e., the service VTEP servicing the local subnet or zone). Accordingly, based on this determination, the unicast MAC frame may be translated into the forward-service VL2 broadcast domain. In one embodiment of the invention, the aforementioned translation may entail replacing the first original VL2 broadcast domain tag, specified in header information of the unicast MAC frame, with a forward-service VL2 broadcast domain tag. The forward-service VL2 broadcast domain tag may include information that identifies the unicast MAC frame as being associated with a forward-service VL2 broadcast domain. The forward-service VL2 broadcast domain tag may include additional information without departing from the scope of the invention.

In Step 2010, a lookup is performed on a forward-service virtual network identifier (VNI) using VARP MAC address specified in header information of the unicast MAC frame. In one embodiment of the invention, the forward-service VNI may identify with the forward-service VL2 broadcast domain. Moreover, the aforementioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

Turning to FIG. 20B, in Step 2020, based on the lookup (performed in Step 2010), a determination is made as to whether the VARP MAC address is known on the forward-service VNI. In one embodiment of the invention, if it is determined that an entry in the MAC-to-VNI table maps the VARP MAC address to at least the forward-service VNI, then the VARP MAC address is recognized as being known on the forward-service VNI. Accordingly, based on this determination, the process may proceed to Step 2022. On the other hand, in another embodiment of the invention, if it is alternatively determined that an entry in the MAC-to-VNI table fails to map the VARP MAC address to at least the forward-service VNI, then the VARP MAC address is recognized as being unknown on the forward-service VNI.

Accordingly, based on this determination, the process may alternatively proceed to Step 2028.

In Step 2022, after determining (in Step 2020) that the VARP MAC address is known on the forward-service VNI, a network interface out of which the unicast MAC frame may be transmitted, towards the first service device, is identified. In one embodiment of the invention, the aforementioned network interface, entailing either a physical or virtual network interface, may be identified through the performance of a lookup on a MAC address table using the VARP MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through the near network interface (NNI) of the first service VTEP. Accordingly, based on this determination, the unicast MAC frame may be directed to the NNI of the first service VTEP.

In Step 2024, the unicast MAC frame is subsequently translated into the first original VL2 broadcast domain. In one embodiment of the invention, this translation may transpire because of a service-specific traffic flow rule (TFR) (described above)—e.g., dictating the translation of any egress network traffic (i.e., the unicast MAC frame) traversing the NNI of the first service VTEP from the forward-service VL2 broadcast domain to the first original VL2 broadcast domain. Furthermore, the aforementioned translation may entail replacing the forward-service VL2 broadcast domain tag, specified in header information of the unicast MAC frame, with a first original VL2 broadcast domain tag. The first original VL2 broadcast domain tag may include information that identifies the unicast MAC frame as being associated with the first original VL2 broadcast domain. The first original VL2 broadcast domain tag may include additional information without departing from the scope of the invention. In Step 2026, after the translation (performed in Step 2024), the unicast MAC frame is bridged across the NNI of the first service VTEP to a directly-connected first service device.

In Step 2028, after determining (in Step 2020) that the VARP MAC address is unknown on the forward-service VNI, the unicast MAC frame is flooded to all destinations known on the forward-service VNI. Accordingly, a copy of the unicast MAC frame may find its way to the directly-connected first service device via traversal of the NNI of the first service VTEP.

Figure 21A:
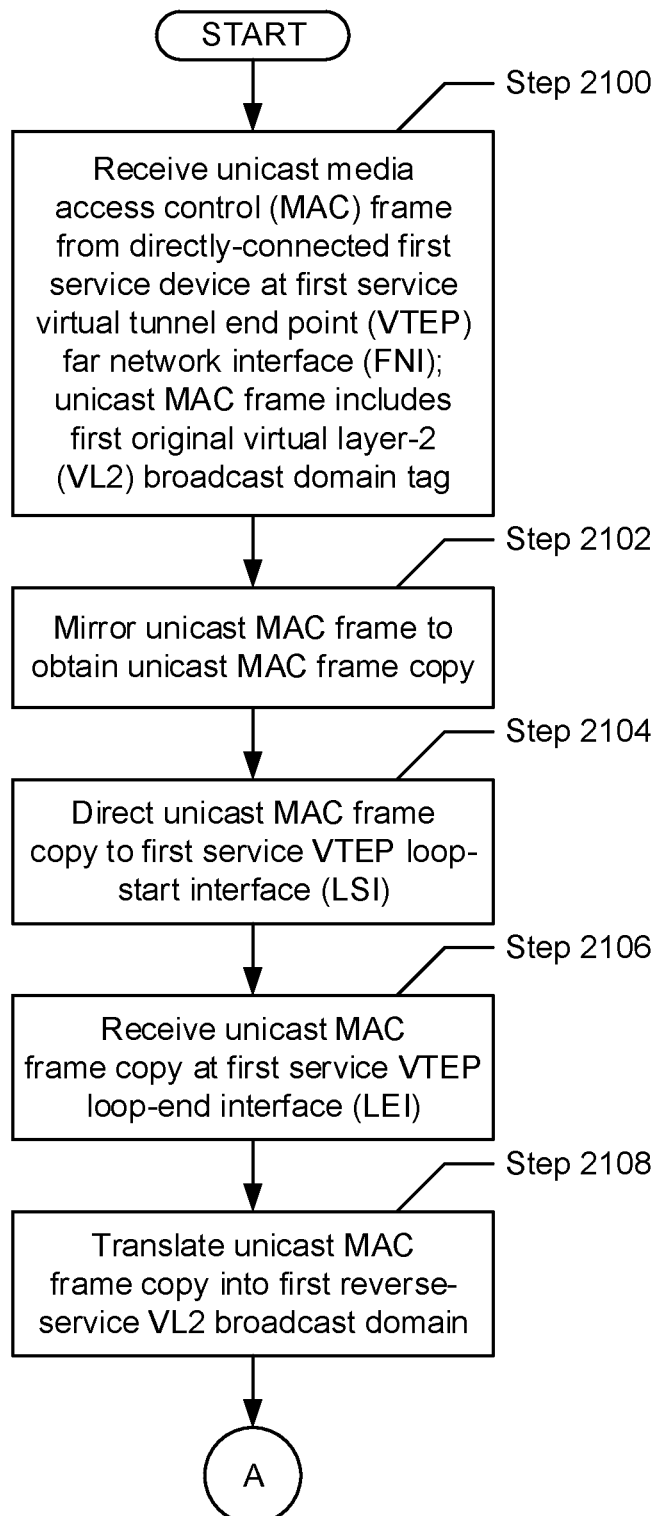
FIGS. 21A-21C show flowcharts describing a method for transmitting inspected unicast network traffic from a first zone to a second zone in accordance with one or more embodiments of the invention.
Figure 21B:
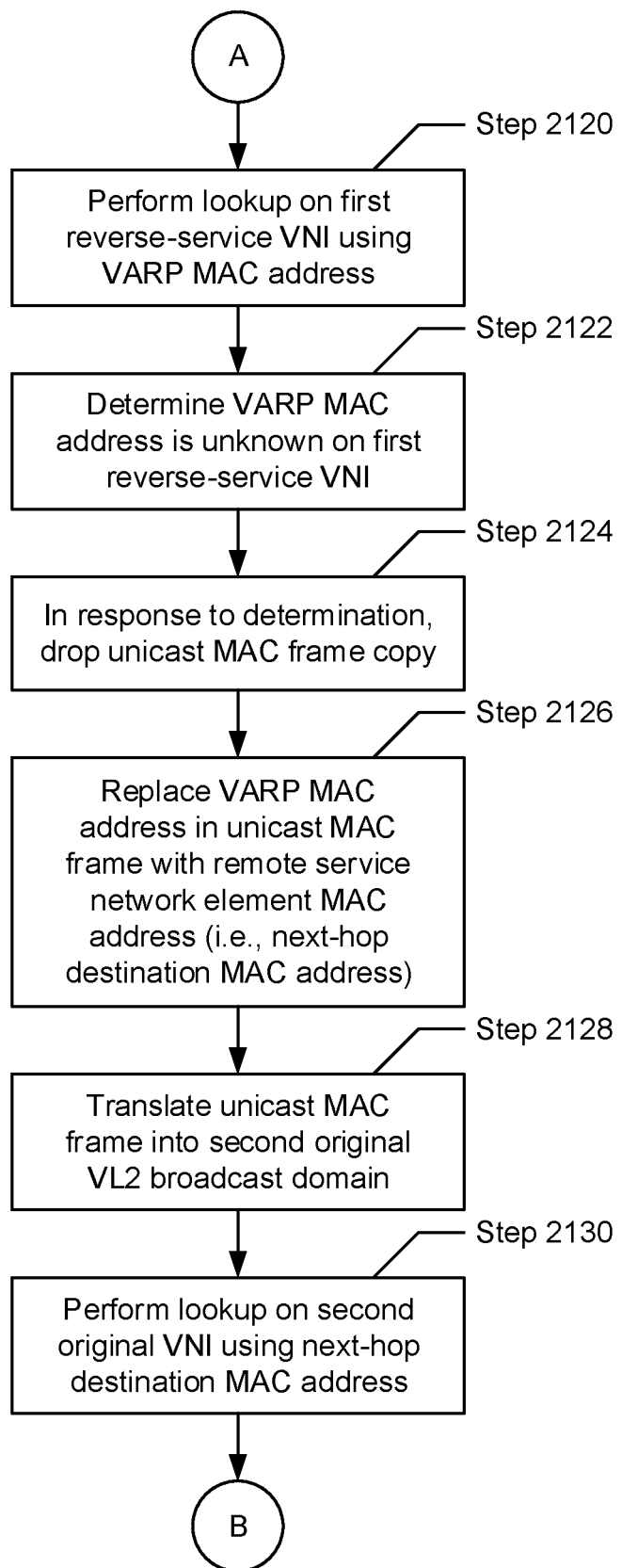
Figure 21C:
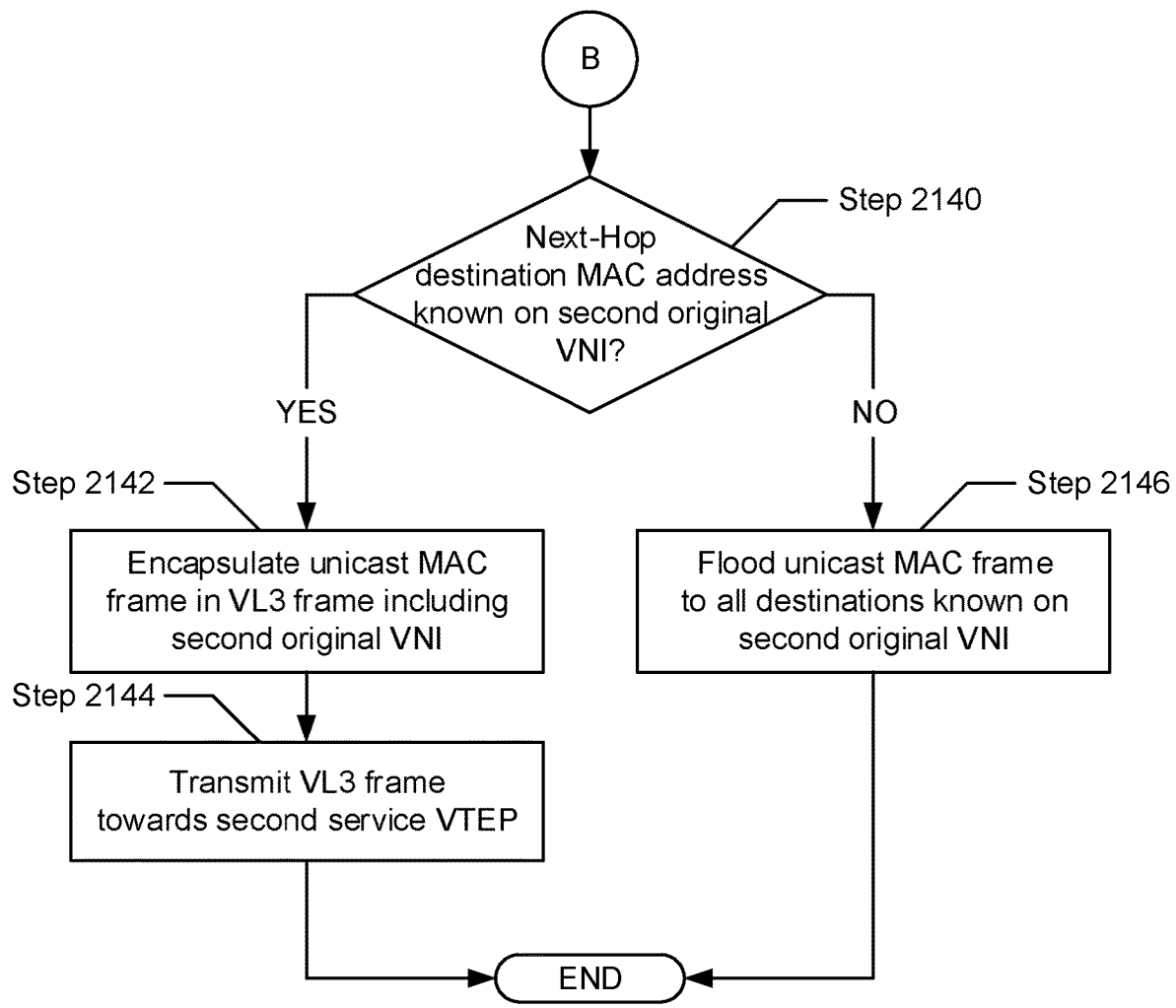

FIGS. 21A-21C show flowcharts describing a method for transmitting inspected unicast network traffic from a first zone to a second zone in accordance with one or more embodiments of the invention. The various steps outlined below may be performed by a first service virtual tunnel end point (VTEP) (i.e., a VTEP directly-connected to a first service device) residing within a first subnet or zone. Further, while the various steps in the flowcharts are presented and described sequentially, one of ordinary skill will appreciate that some or all steps may be executed in different orders, may be combined or omitted, and some or all steps may be executed in parallel.

Turning to FIG. 21A, in Step 2100, a unicast media access control (MAC) frame is received from a directly-connected first service device. In one embodiment of the invention, the unicast MAC frame may arrive through a far network interface (FNI) (see e.g., FIG. 2) of the first service VTEP. Further, the unicast MAC frame may include or specify a first original virtual layer-2 (VL2) broadcast domain tag within its L2 header information. The first original VL2 broadcast domain tag may include information that identifies the unicast MAC frame as being associated with a first original VL2 broadcast domain. The first original VL2 broadcast domain tag may include additional information without departing from the scope of the invention.

In Step 2102, a unicast MAC frame copy is obtained through port mirroring. In one embodiment of the invention, port mirroring may refer to the replication of network traffic seen on one network interface to yield a copy of that network traffic, which may then be directed to another network interface. Furthermore, the port mirroring may transpire because of a service-specific network interface configuration (NIC) (described above)—e.g., dictating the configuration of a mirroring property (or attribute) belonging to the FNI of the first service VTEP such that the FNI mirrors any ingress network traffic at the FNI to the loop-start interface (LSI) (see e.g., FIG. 2) of the first service VTEP. Accordingly, in Step 2104, based on the aforementioned service-specific NIC, the unicast MAC frame copy (obtained in Step 2102) is directed to the LSI of the first service VTEP.

In Step 2106, after the unicast MAC frame copy is directed to the LSI of the first service VTEP (in Step 2104), the unicast MAC frame copy is received at a loop-end interface (LEI) (see e.g., FIG. 2) of the first service VTEP. In one embodiment of the invention, the LSI and the LEI may be connected together using a physical loopback cable. Accordingly, any egress network traffic traversing the LSI becomes ingress network traffic arriving at the LEI.

In Step 2108, the unicast MAC frame copy is translated into a first reverse-service VL2 broadcast domain. In one embodiment of the invention, this translation may transpire because of a service-specific traffic flow rule (TFR) (described above)—e.g., dictating the translation of any ingress network traffic (i.e., the unicast MAC frame copy) traversing the LEI of the first service VTEP from the first original VL2 broadcast domain to the first reverse-service VL2 broadcast domain. Furthermore, the aforementioned translation may entail replacing the first original VL2 broadcast domain tag, specified in header information of the unicast MAC frame copy, with a first reverse-service VL2 broadcast domain tag. The first reverse-service VL2 broadcast domain tag may include information that identifies the unicast MAC frame copy as being associated with a first reverse-service VL2 broadcast domain. The first reverse-service VL2 broadcast domain tag may include additional information without departing from the scope of the invention.

Turning to FIG. 21B, in Step 2120, a lookup is performed on a first reverse-service virtual network identifier (VNI) using VARP MAC address specified in header information of the unicast MAC frame copy. In one embodiment of the invention, the first reverse-service VNI may identify with a reverse-service VL2 broadcast domain. Further, the aforementioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 2122, based on the lookup (performed in Step 2120), it is determined that an entry in the MAC-to-VNI table fails to map the VARP MAC address to at least the first reverse-service VNI. Based on this determination, the VARP MAC address is subsequently unknown on the first reverse-service VNI. Accordingly, in Step 2124, the unicast MAC frame copy is dropped. This may be the case because, in one embodiment of the invention, a service-specific network interface configuration (NIC) (described above) may have previously configured a flooding property (or attribute) belonging to the LEI of the service VTEP such that unknown unicast flooding at the LEI is disabled.

In Step 2126, returning to the unicast MAC frame (received at the FNI of the first service VTEP in Step 2100), the VARP MAC address, specified in header information, is replaced with a remote service network element MAC address (i.e., belonging to the network element on which a second service VTEP may be executing). Specifically, in one embodiment of the invention, with L3 routing enabled, the first service VTEP may route the unicast MAC frame to a next-hop destination. Further, the next-hop destination, based on a MAC address table, may be identified as the second service VTEP (i.e., a remote service VTEP servicing a second, remote subnet or zone).

In Step 2128, based on identifying that the next-hop destination of the unicast MAC frame lies on a different subnet/zone, the unicast MAC frame is translated into a second original VL2 broadcast domain. In one embodiment of the invention, the second original VL2 broadcast domain may represent the overlay tunnel through which network traffic must traverse to reach the second service VTEP (residing in the second zone) from the first zone. Furthermore, the aforementioned translation may entail replacing the first original VL2 broadcast domain tag, specified in header information of the unicast MAC frame, with a second original VL2 broadcast domain tag. The second original VL2 broadcast domain tag may include information that identifies the unicast MAC frame as being associated with the second original VL2 broadcast domain. The second original VL2 broadcast domain tag may include additional information without departing from the scope of the invention.

In Step 2130, a lookup is performed on a second original VNI using the next-hop destination MAC address (i.e., the second service network element MAC address) specified in header information of the unicast MAC frame. In one embodiment of the invention, the second original VNI may identify with the second original VL2 broadcast domain. Moreover, in one embodiment of the invention, the aforementioned lookup may entail searching through one or more entries in a MAC-to-VNI table for an entry that specifies at least the next-hop destination MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

Turning to FIG. 21C, in Step 2140, based on the lookup (performed in Step 2130), a determination is made as to whether the next-hop destination MAC address is known on the second original VNI. In one embodiment of the invention, if it is determined that an entry in the MAC-to-VNI table maps the next-hop destination MAC address to at least the second original VNI, then the next-hop destination MAC address is recognized as being known on the second original VNI. Accordingly, based on this determination, the process may proceed to Step 2142. On the other hand, in another embodiment of the invention, if it is alternatively determined that an entry in the MAC-to-VNI table fails to map the next-hop destination MAC address to at least the second original VNI, then the next-hop destination MAC address is recognized as being unknown on the second original VNI. Accordingly, based on this determination, the process may alternatively proceed to Step 2146.

In Step 2142, after determining (in Step 2140) that the next-hop destination MAC address is known on the second original VNI, a network interface out of which the unicast MAC frame may be transmitted, towards the second service VTEP, is identified. In one embodiment of the invention, the aforementioned network interface, entailing either a physical or virtual network interface, may be identified through the performance of a lookup on a MAC address table using the next-hop destination MAC address.

In one embodiment of the invention, based on the above-mentioned lookup on the MAC address table, it may be determined that the unicast MAC frame should be transmitted through a certain network interface, which leads to the second service VTEP, and using an overlay tunnel that implements the second original VL2 broadcast domain. Subsequently, the unicast MAC frame may be encapsulated in a virtual layer-3 (VL3) frame such as, for example, a VXLAN frame, where the VL3 frame may include header information that specifies, at least in part, the second original VNI.

In Step 2144, the VL3 frame (obtained in Step 2142) is transmitted, through an L3 fabric (see e.g., FIG. 1), towards the second service VTEP. Specifically, in one embodiment of the invention, the VL3 frame may traverse through an overlay tunnel—i.e., representative of the second original VL2 broadcast domain—that originates at the first service VTEP and, subsequently, terminates at the second service VTEP, behind which a second service device (i.e., the service device servicing a remote subnet or zone) resides.

In Step 2146, after determining (in Step 2140) that the next-hop destination MAC address is unknown on the second original VNI, the unicast MAC frame is flooded to all destinations known on the second original VNI. Accordingly, a copy of the unicast MAC frame may find its way to the second service VTEP.

Figure 22A:
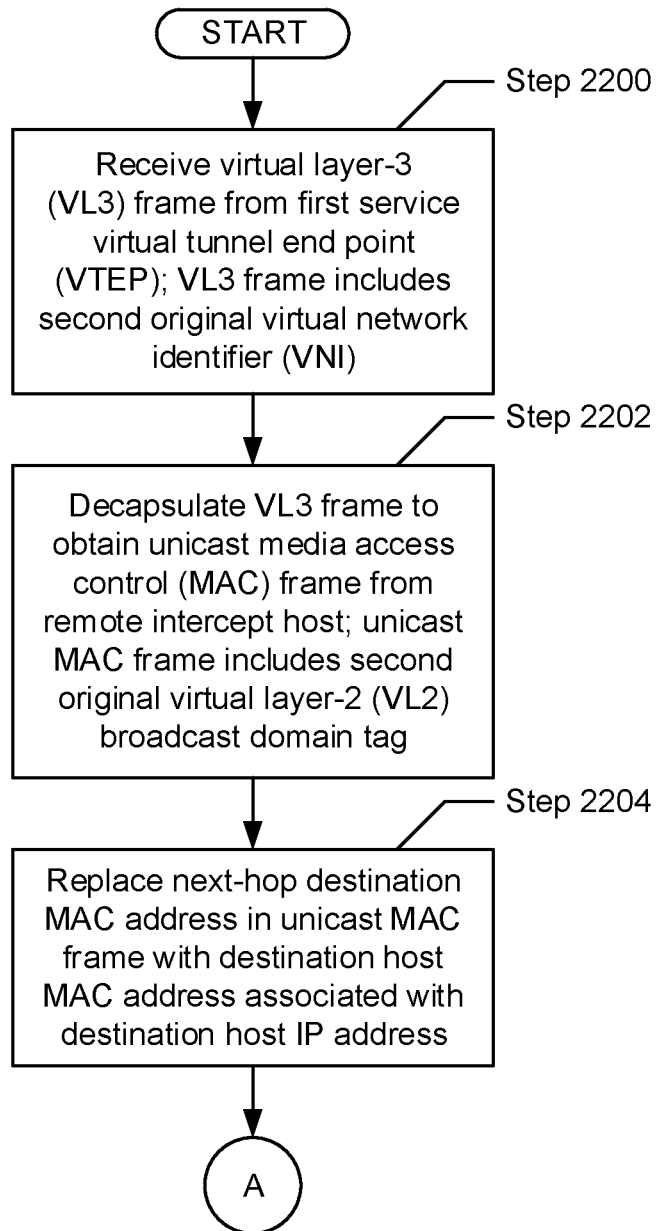
FIGS. 22A and 22B show flowcharts describing a method for receiving inspected unicast network traffic within a second zone in accordance with one or more embodiments of the invention.
Figure 22B:
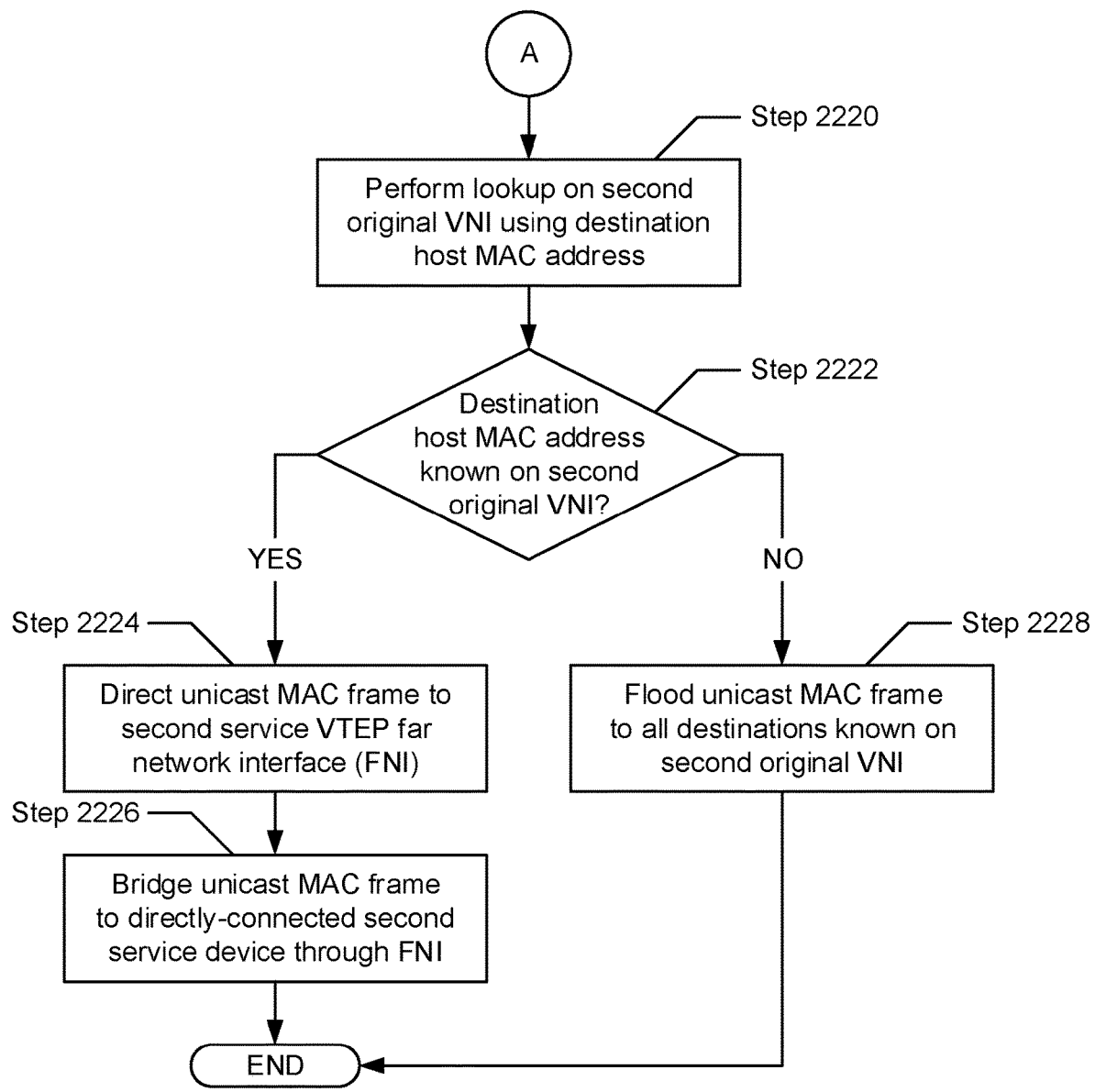

FIGS. 22A and 22B show flowcharts describing a method for receiving inspected unicast network traffic within a second zone in accordance with one or more embodiments of the invention. The various steps outlined below may be performed by a second service virtual tunnel end point (VTEP) (i.e., a VTEP directly-connected to a second service device) residing within a second subnet or zone. Further, while the various steps in the flowcharts are presented and described sequentially, one of ordinary skill will appreciate that some or all steps may be executed in different orders, may be combined or omitted, and some or all steps may be executed in parallel.

Turning to FIG. 22A, in Step 2200, a virtual layer-3 (VL3) frame is received. In one embodiment of the invention, the VL3 frame may have originated from a first service VTEP (residing within a first subnet or zone—i.e., a different subnet/zone within which the second service VTEP resides). Further, the VL3 frame may include or specify a second original virtual network identifier (VNI) within header information. The second original VNI may identify with a second original virtual layer-2 (VL2) broadcast domain.

In Step 2202, the VL3 frame (received in Step 2200) is decapsulated. Specifically, in one embodiment of the invention, decapsulation may entail removing the L3 header information included or specified in the VL3 frame, thereby exposing a unicast media access control (MAC) frame enclosed therein. The unicast MAC frame may have originated from a first remote, intercept host (or intercept virtual machine). Furthermore, the unicast MAC frame may include or specify a second original VL2 broadcast domain tag (e.g., a second original virtual local area network (VLAN) tag). The second original VL2 broadcast domain tag may include information that identifies the unicast MAC frame as being associated with a second original VL2 broadcast domain. The second original VL2 broadcast domain tag may include additional information without departing from the scope of the invention.

In Step 2204, the next-hop destination MAC address (i.e., a second service network element MAC address), specified in header information, is replaced with a destination host (or destination virtual machine) MAC address. Specifically, in one embodiment of the invention, the destination host/virtual machine Internet Protocol (IP) address, specified in header information, may be resolved to identify the destination host/virtual machine MAC address for the destination host/virtual machine residing within the second subnet or zone.

Turning to FIG. 22B, in Step 2220, a lookup is performed on the second original VNI using the destination host (or destination virtual machine) MAC address specified in header information of the unicast MAC frame. In one embodiment of the invention, the second original VNI may identify with the second original VL2 broadcast domain. Further, the aforementioned lookup may entail searching through one or more entries in a MAC-to-VNI table for an entry that specifies at least the destination host (or destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 2222, based on the lookup (performed in Step 2220), a determination is made as to whether the destination host (or destination virtual machine) MAC address is known on the second original VNI. In one embodiment of the invention, if it is determined that an entry in the MAC-to-VNI table maps the destination host (or destination virtual machine) MAC address to at least the second original VNI, then the destination host/virtual machine MAC address is recognized as being known on the second original VNI. Accordingly, based on this determination, the process may proceed to Step 2224. On the other hand, in another embodiment of the invention, if it is alternatively determined that an entry in the MAC-to-VNI table fails to map the destination host (or destination virtual machine) MAC address to at least the second original VNI, then the destination host/virtual machine MAC address is recognized as being unknown on the second original VNI. Accordingly, based on this determination, the process may alternatively proceed to Step 2228.

In Step 2224, after determining (in Step 2222) that the destination host (or destination virtual machine) MAC address is known on the second original VNI, a network interface out of which the unicast MAC frame may be transmitted, towards a second service device, is identified. In one embodiment of the invention, the aforementioned network interface, entailing either a physical or virtual network interface, may be identified through the performance of a lookup on a MAC address table using the destination host (or destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through the far network interface (FNI) of the second service VTEP. Accordingly, based on this determination, the unicast MAC frame may be directed to the FNI of the second service VTEP. Thereafter, in Step 2226, the unicast MAC frame is subsequently bridged across the FNI of the second service VTEP to a directly-connected second service device.

In Step 2228, after determining (in Step 2222) that the destination host (or destination virtual machine) MAC address is unknown on the second original VNI, the unicast MAC frame is flooded to all destinations known on the second original VNI. In one embodiment of the invention, through MAC learning and/or the receipt of MAC programming instructions (MPIs) (described above), destinations known on the second original VNI may include, but are not limited to: the FNI of the second service VTEP, behind which a second service device may reside. Accordingly, a copy of the unicast MAC frame may find its way to the directly-connected second service device via traversal of the FNI of the second service VTEP.

Figure 23A:
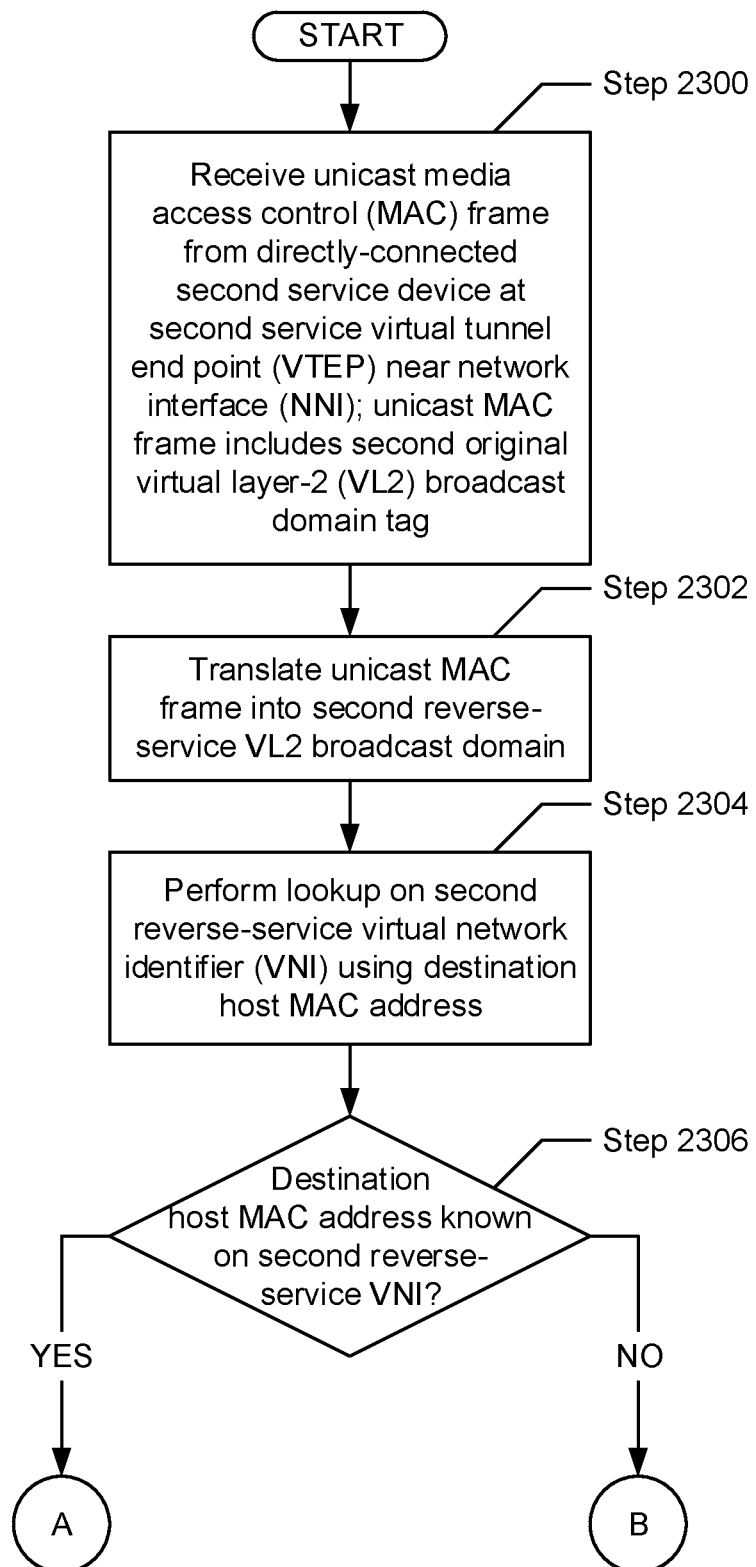
FIGS. 23A-23C show flowcharts describing a method for transmitting inspected unicast network traffic within a second zone in accordance with one or more embodiments of the invention.
Figure 23B:
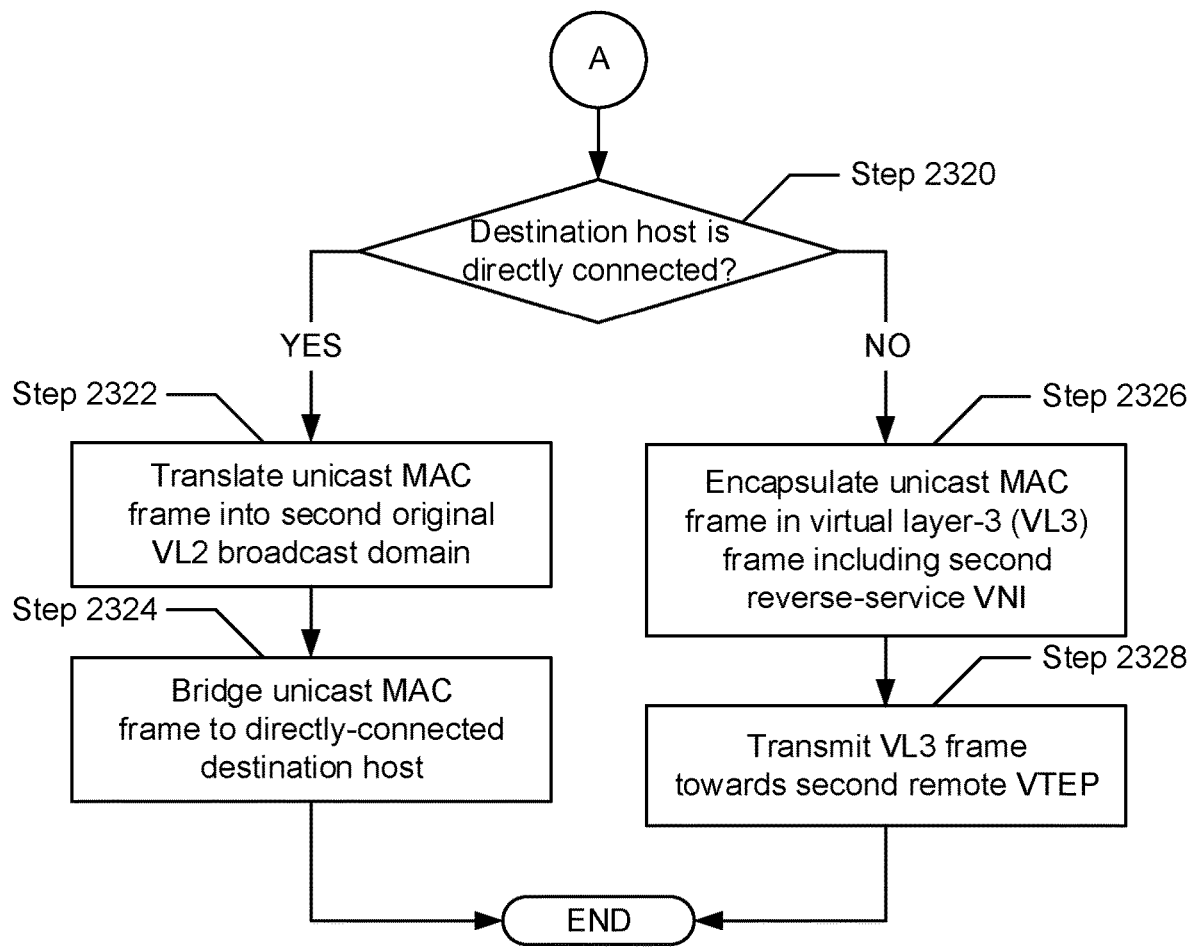
Figure 23C:
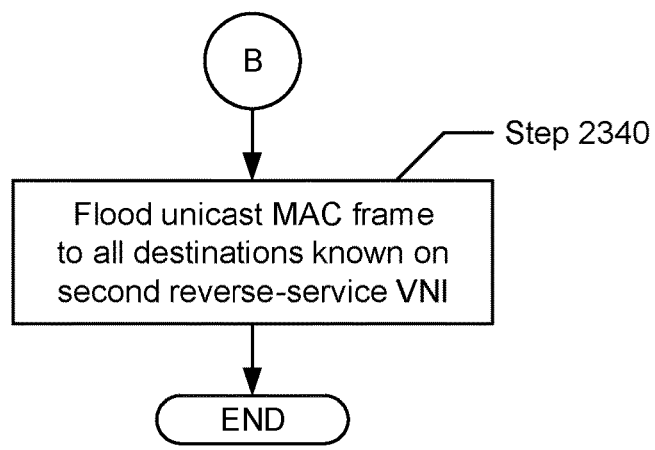

FIGS. 23A-23C show flowcharts describing a method for transmitting inspected unicast network traffic within a second zone in accordance with one or more embodiments of the invention. The various steps outlined below may be performed by a second service virtual tunnel end point (VTEP) (i.e., a VTEP directly-connected to a second service device) residing within a second subnet or zone. Further, while the various steps in the flowcharts are presented and described sequentially, one of ordinary skill will appreciate that some or all steps may be executed in different orders, may be combined or omitted, and some or all steps may be executed in parallel.

Turning to FIG. 23A, in Step 2300, a unicast media access control (MAC) frame is received from a directly-connected second service device. In one embodiment of the invention, the unicast MAC frame may arrive through a near network interface (NNI) (see e.g., FIG. 2) of the second service VTEP. Further, the unicast MAC frame may include or specify a second original virtual layer-2 (VL2) broadcast domain tag within its L2 header information. The second original VL2 broadcast domain tag may include information that identifies the unicast MAC frame as being associated with a second original VL2 broadcast domain. The second original VL2 broadcast domain tag may include additional information without departing from the scope of the invention.

In Step 2302, the unicast MAC frame is translated into a second reverse-service VL2 broadcast domain. In one embodiment of the invention, this translation may transpire because of a service-specific traffic flow rule (TFR) (described above)—e.g., dictating the translation of any egress network traffic (i.e., the unicast MAC frame) traversing the NNI of the second service VTEP from the second original VL2 broadcast domain to the second reverse-service VL2 broadcast domain. Furthermore, the aforementioned translation may entail replacing the second original VL2 broadcast domain tag, specified in header information of the unicast MAC frame, with a second reverse-service VL2 broadcast domain tag. The second reverse-service VL2 broadcast domain tag may include information that identifies the unicast MAC frame as being associated with the second reverse-service VL2 broadcast domain. The second reverse-service VL2 broadcast domain tag may include additional information without departing from the scope of the invention.

In Step 2304, a lookup is performed on a second reverse-service virtual network identifier (VNI) using a destination host (or destination virtual machine) MAC address specified in header information of the unicast MAC frame. In one embodiment of the invention, the second reverse-service VNI may identify with the reverse-service VL2 broadcast domain.

In Step 2306, based on the lookup (performed in Step 2304), a determination is made as to whether the destination host (or destination virtual machine) MAC address is known on the second reverse-service VNI. In one embodiment of the invention, if it is determined that an entry in the MAC-to-VNI table maps the destination host (or destination virtual machine) MAC address to at least the second reverse-service VNI, then the destination host/virtual machine MAC address is recognized as being known on the second reverse-service VNI. Accordingly, based on this determination, the process may proceed to Step 2320 (see e.g., FIG. 23B). On the other hand, in another embodiment of the invention, if it is alternatively determined that an entry in the MAC-to-VNI table fails to map the destination host (or destination virtual machine) MAC address to at least the second reverse-service VNI, then the destination host/virtual machine MAC address is recognized as being unknown on the second reverse-service VNI. Accordingly, based on this determination, the process may alternatively proceed to Step 2340 (see e.g., FIG. 23C).

Turning to FIG. 23B, in Step 2320, after determining (in Step 2306) that the destination host (or destination virtual machine) MAC address is known on the second reverse-service VNI, another determination is made as to whether the destination host/virtual machine is directly-connected. In one embodiment of the invention, identifying whether the destination host/virtual machine is directly-connected may entail performing a lookup on a MAC address table using the destination host/virtual machine MAC address specified in header information of the unicast MAC frame. In one embodiment of the invention, if it is determined, based on the aforementioned lookup on the MAC address table, that the destination host/virtual machine is directly-connected, the process may proceed to Step 2322. On the other hand, in another embodiment of the invention, if it is alternatively determined, based on the lookup, that the destination host/virtual machine is not directly-connected (i.e., indicative of a remote destination), the process may alternatively proceed to Step 2326.

In Step 2322, after determining (in Step 2320) that the destination host (or destination virtual machine) is directly-connected, the unicast MAC frame is translated into the second original VL2 broadcast domain. In one embodiment of the invention, this translation may transpire because of an intercept-specific traffic flow rule (TFR) (described above)—e.g., dictating the translation of any egress network traffic (i.e., the unicast MAC frame copy) traversing an intercept network interface (INI) of an intercept VTEP (i.e., which the second service VTEP also is in this case) from the second reverse-service VL2 broadcast domain to the second original VL2 broadcast domain. Furthermore, the aforementioned translation may entail replacing the second reverse-service VL2 broadcast domain tag, specified in header information of the unicast MAC frame, with a second original VL2 broadcast domain tag. The second original VL2 broadcast domain tag may include information that identifies the unicast MAC frame as being associated with the second original VL2 broadcast domain. The second original VL2 broadcast domain tag may include additional information without departing from the scope of the invention. Thereafter, in Step 2324, the unicast MAC frame is bridged across an INI of the second service (intercept) VTEP to the directly-connected destination host (or destination virtual machine).

In Step 2326, after determining (in Step 2320) that the destination host (or destination virtual machine) is not directly-connected, an entry in the MAC address table may specify that the unicast MAC frame should be transmitted through a certain network interface, leading to a second remote VTEP, and using an overlay tunnel that implements the second reverse-service VL2 broadcast domain. Subsequently, the unicast MAC frame may be encapsulated in a VL3 frame such as, for example, a VXLAN frame, where the VL3 frame may include header information that specifies, at least in part, the second reverse-service VNI.

In Step 2328, the VL3 frame (obtained in Step 2326) is transmitted, through an L3 fabric (see e.g., FIG. 1), towards the second remote VTEP. Specifically, in one embodiment of the invention, the VL3 frame may traverse through an overlay tunnel—i.e., representative of the second reverse-service VL2 broadcast domain—that originates at the second service VTEP and, subsequently, terminates at the second remote VTEP, behind which the destination host/virtual machine resides.

Turning to FIG. 23C, in Step 2340, after determining (in Step 2306) that the destination host (or destination virtual machine) is unknown on the second reverse-service VNI, the unicast MAC frame is flooded to all destinations known on the second reverse-service VNI. In one embodiment of the invention, through MAC learning and/or the receipt of MAC programming instructions (MPIs) (described above), destinations known on the second reverse-service VNI may include, but are not limited to: at least one intercept network interface (INI) (see e.g., FIG. 2) of one or more intercept VTEPs, behind which at least one intercept host (or intercept virtual machine) may reside. Accordingly, a copy of the unicast MAC frame may find its way to the destination host/virtual machine, which may or may be directly-connected.

Figure 24A:
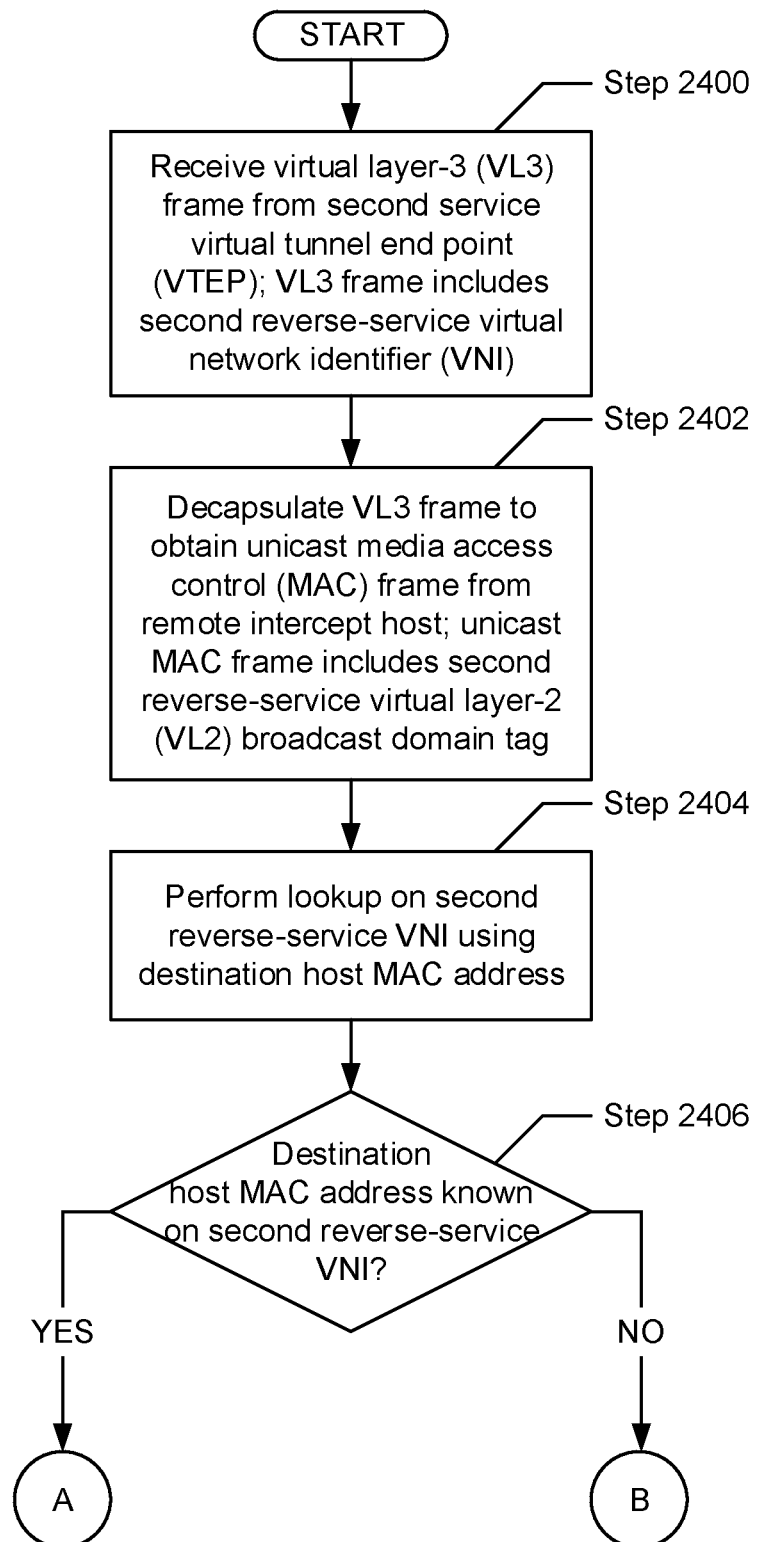
FIGS. 24A-24C show flowcharts describing a method for delivering inspected unicast network traffic within a second zone in accordance with one or more embodiments of the invention.
Figure 24B:
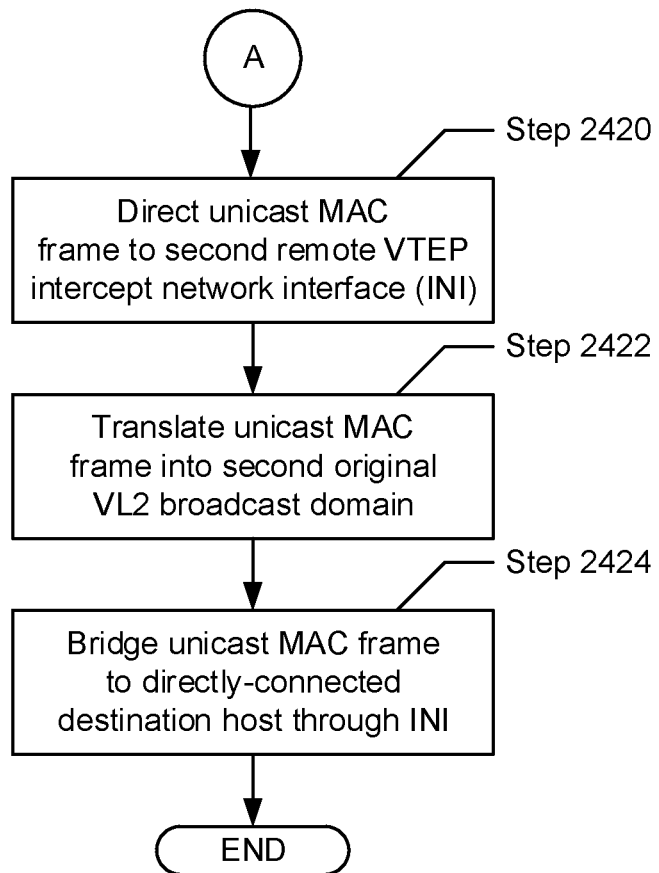
Figure 24C:
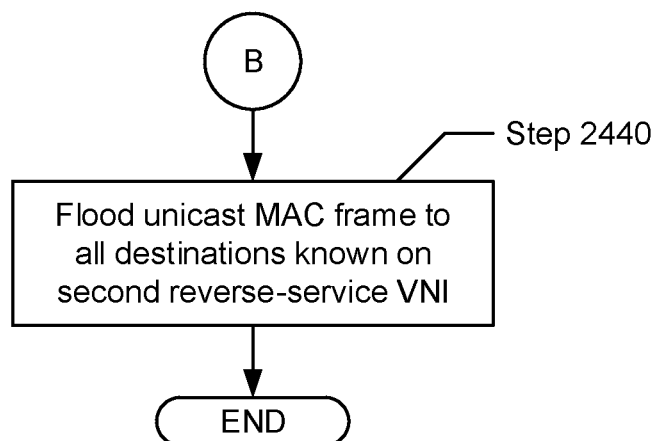

FIGS. 24A-24C show flowcharts describing a method for delivering inspected unicast network traffic within a second zone in accordance with one or more embodiments of the invention. The various steps outlined below may be performed by a second non-service virtual tunnel end point (VTEP) (i.e., a VTEP not directly-connected to a second service device (or a second remote VTEP)) residing within a second subnet or zone. Further, while the various steps in the flowcharts are presented and described sequentially, one of ordinary skill will appreciate that some or all steps may be executed in different orders, may be combined or omitted, and some or all steps may be executed in parallel.

Turning to FIG. 24A, in Step 2400, a virtual layer-3 (VL3) frame is received. In one embodiment of the invention, the VL3 frame may have originated from a second service VTEP. Further, the VL3 frame may include or specify a second reverse-service virtual network identifier (VNI) within header information. The second reverse-service VNI may identify with a second reverse-service virtual layer-2 (VL2) broadcast domain.

In Step 2402, the VL3 frame (received in Step 2400) is decapsulated. Specifically, in one embodiment of the invention, decapsulation may entail removing the L3 header information included or specified in the VL3 frame, thereby exposing a unicast media access control (MAC) frame enclosed therein. The unicast MAC frame may have originated from a remote, intercept source host (or non-intercept source virtual machine) that resides in a different (i.e., the first) subnet or zone. The unicast MAC frame may also be addressed to an intercept destination host (or intercept virtual machine) within the second subnet/zone. Furthermore, the unicast MAC frame may include or specify a second reverse-service VL2 broadcast domain tag (e.g., a second reverse-service virtual local area network (VLAN) tag). The second reverse-service VL2 broadcast domain tag may include information that identifies the unicast MAC frame as being associated with the second reverse-service VL2 broadcast domain. The second reverse-service VL2 broadcast domain tag may include additional information without departing from the scope of the invention.

In Step 2404, a lookup is performed on the second reverse-service VNI using the intercept destination host (or intercept destination virtual machine) MAC address specified in header information of the unicast MAC frame. In one embodiment of the invention, the aforementioned lookup may entail searching through one or more entries in a MAC-to-VNI table for an entry that specifies at least the intercept destination host (or intercept destination virtual machine) MAC address. The aforementioned MAC-to-VNI table may maintain one or more entries, where each entry may include or specify one MAC address and one or more VNIs to which the one MAC address is mapped. Therefore, in one embodiment of the invention, the MAC-to-VNI table may consolidate information mapping which MAC addresses (representative of hosts or virtual machines) are associated with or known on which VNIs (representative of VL2 broadcast domains).

In Step 2406, based on the lookup (performed in Step 2404), a determination is made as to whether the intercept destination host (or intercept destination virtual machine) MAC address is known on the second reverse-service VNI. In one embodiment of the invention, if it is determined that an entry in the MAC-to-VNI table maps the intercept destination host (or intercept destination virtual machine) MAC address to at least the second reverse-service VNI, then the intercept destination host/virtual machine MAC address is recognized as being known on the second reverse-service VNI. Accordingly, based on this determination, the process may proceed to Step 2420 (see e.g., FIG. 24B). On the other hand, in another embodiment of the invention, if it is alternatively determined that an entry in the MAC-to-VNI table fails to map the intercept destination host (or intercept destination virtual machine) MAC address to at least the second reverse-service VNI, then the intercept destination host/virtual machine MAC address is recognized as being unknown on the second reverse-service VNI. Accordingly, based on this determination, the process may alternatively proceed to Step 2440 (see e.g., FIG. 24C).

Turning to FIG. 24B, in Step 2420, after determining (in Step 2406) that the destination host (or destination virtual machine) MAC address is known on the second reverse-service VNI, a network interface out of which the unicast MAC frame may be transmitted, towards the intercept destination host/virtual machine, is identified. In one embodiment of the invention, the aforementioned network interface, entailing either a physical or virtual network interface, may be identified through the performance of a lookup on a MAC address table using the intercept destination host (or intercept destination virtual machine) MAC address. The MAC address table may refer to a data structure that maintains one or more entries, where each entry not only specifies out which network interface to forward network traffic, but also through which overlay tunnel, if any, should the network traffic be transmitted through in order to reach their desired destination or a next hop along the way.

In one embodiment of the invention, based on the above-mentioned lookup on the MAC address table, it may be determined that the unicast MAC frame should be transmitted through an intercept network interface (INI) (see e.g., FIG. 2) of the second non-service (remote) VTEP. Accordingly, based on this determination, the unicast MAC frame may be directed to the identified INI of the second non-service (remote) VTEP.

In Step 2422, the unicast MAC frame is translated into the second original VL2 broadcast domain. In one embodiment of the invention, this translation may transpire because of an intercept-specific traffic flow rule (TFR) (described above)—e.g., dictating the translation of any egress network traffic (i.e., the unicast MAC frame) traversing an intercept network interface (INI) of an intercept VTEP (i.e., the second non-service (remote) VTEP) from the second reverse-service VL2 broadcast domain to the second original VL2 broadcast domain. Furthermore, the aforementioned translation may entail replacing the second reverse-service VL2 broadcast domain tag, specified in header information of the unicast MAC frame, with a second original VL2 broadcast domain tag. The second original VL2 broadcast domain tag may include information that identifies the unicast MAC frame as being associated with the second original VL2 broadcast domain. The second original VL2 broadcast domain tag may include additional information without departing from the scope of the invention. Thereafter, in Step 2424, the unicast MAC frame is bridged across the identified INI of the second non-service (remote) VTEP to the directly-connected intercept destination host (or intercept destination virtual machine).

Turning to FIG. 24C, in Step 2440, after determining (in Step 2406) that the intercept destination host (or intercept destination virtual machine) MAC address is unknown on the second reverse-service VNI, the unicast MAC frame is flooded to all destinations known on the second reverse-service VNI. In one embodiment of the invention, through MAC learning and/or the receipt of MAC programming instructions (MPIs) (described above), destinations known on the second reverse-service VNI may include, but are not limited to: any and all INIs of the second non-service (remote) VTEP, behind which at least one intercept host (or intercept virtual machine) may reside. Accordingly, a copy of the unicast MAC frame may find its way to the directly-connected intercept destination host/virtual machine via traversal of the identified INI of the second non-service (remote) VTEP.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing network traffic, comprising:
receiving, from a first remote virtual tunnel end point (VTEP), a first virtual layer-3 (VL3) frame comprising a forward-service virtual network identifier (VNI);
decapsulating the first VL3 frame to obtain a first unicast media access control (MAC) frame originating from a first source, wherein the first unicast MAC frame comprises a forward-service virtual layer-2 (VL2) broadcast domain tag associated with a forward-service VL2 broadcast domain;
making a first determination, using a first destination MAC address associated with a first destination, that the first destination MAC address is known on the forward-service VNI;
translating, based on the first determination, the first unicast MAC frame into an original VL2 broadcast domain, to obtain a second unicast MAC frame; and
bridging, through a near network interface (NNI), the second unicast MAC frame to a service device.

2. The method of claim 1, wherein the first source is an intercept host or an intercept virtual machine.

3. The method of claim 1, wherein the first VL3 frame is a virtual extensible local area network (VXLAN) frame.

4. The method of claim 1, further comprising:
receiving, from the service device through a far network interface (FNI) and after the service device performs a service function, the second unicast MAC frame;
making a second determination, using the first destination MAC address, that the first destination MAC address is known on an original VNI;
making a third determination, based at least on redirect criteria and the second determination, that the first destination is an intercept host or an intercept virtual machine; and
dropping, based on the third determination, the second unicast MAC frame.

5. The method of claim 1, further comprising:
receiving, from the service device through a far network interface (FNI) and after the service device performs a service function, the second unicast MAC frame;
making a second determination, using the first destination MAC address, that the first destination MAC address is known on an original VNI; and
making a third determination, based at least on redirect criteria and the second determination, that the first destination is a non-intercept host or a non-intercept virtual machine.

6. The method of claim 5, further comprising:
making a fourth determination, based on the third determination, that the first destination is directly-connected; and
bridging, based on the fourth determination, the second unicast MAC frame to the first destination.

7. The method of claim 5, further comprising:
making a fourth determination, based on the third determination, that the first destination is not directly-connected;
encapsulating, based on the fourth determination, the second unicast MAC frame in a second VL3 frame comprising the original VNI; and
transmitting the second VL3 frame towards a second remote VTEP, wherein the first destination resides behind the second remote VTEP.

8. The method of claim 1, further comprising:
receiving, from the service device through a far network interface (FNI) and after the service device performs a service function, the second unicast MAC frame;
mirroring the second unicast MAC frame to obtain a first unicast MAC frame copy;
transmitting the first unicast MAC frame copy through a loop-start interface (LSI);
receiving the first unicast MAC frame copy through a loop-end interface (LEI), wherein the LEI is connected to the LSI; and
translating the first unicast MAC frame copy into a reverse-service VL2 broadcast domain, to obtain a second unicast MAC frame copy.

9. The method of claim 8, further comprising:
making a second determination, using the first destination MAC address, that the first destination MAC address is known on a reverse-service VNI;
making a third determination, based on the second determination, that the first destination is directly-connected;
translating, based on the third determination, the second unicast MAC frame copy into the original VL2 broadcast domain; and
bridging, after the translating, the second unicast MAC frame copy to the first destination.

10. The method of claim 8, further comprising:
making a second determination, using the first destination MAC address, that the first destination MAC address is known on a reverse-service VNI;
making a third determination, based on the second determination, that the first destination is not directly-connected;
encapsulating, based on the third determination, the second unicast MAC frame copy in a second VL3 frame comprising the reverse-service VNI; and
transmitting the second VL3 frame towards a second remote VTEP, wherein the first destination resides behind the second remote VTEP.

11. The method of claim 8, further comprising:
making a second determination, using the first destination MAC address, that the first destination MAC address is unknown on a reverse-service VNI; and
dropping, based on the second determination, the second unicast MAC frame copy.

12. The method of claim 1, further comprising:
receiving, from the first remote VTEP, a second VL3 frame comprising an original VNI;
decapsulating the second VL3 frame to obtain a third unicast MAC frame originating from a second source, wherein the third unicast MAC frame comprises an original VL2 broadcast domain tag associated with the original VL2 broadcast domain;
making a second determination, using a second destination MAC address associated with a second destination, that the second destination MAC address is known on the original VNI; and
bridging, based on the second determination, the third unicast MAC frame to the service device through a far network interface (FNI).

13. The method of claim 12, further comprising:
receiving, from the service device through the NNI and after the service device performs a service function, the third unicast MAC frame;
translating the third unicast MAC frame into a reverse-service VL2 broadcast domain, to obtain a fourth unicast MAC frame; and making a third determination, using the second destination MAC address, that the second destination MAC address is known on a reverse-service VNI.

14. The method of claim 13, further comprising:
making a fourth determination, based on the third determination, that the second destination is directly-connected;
translating, based on the fourth determination, the fourth unicast MAC frame into the original VL2 broadcast domain, to obtain a fifth unicast MAC frame; and
bridging the fifth unicast MAC frame to the second destination.

15. The method of claim 13, further comprising:
making a fourth determination, based on the third determination, that the second destination is not directly-connected;
encapsulating, based on the fourth determination, the fourth unicast MAC frame in a third VL3 frame comprising the reverse-service VNI; and
transmitting the third VL3 frame towards a second remote VTEP, wherein the second destination resides behind the second remote VTEP.

16. A non-transitory computer readable medium (CRM) comprising computer readable program code, which when executed by a computer processor, enables the computer processor to:
receive, from a first remote virtual tunnel end point (VTEP), a first virtual layer-3 (VL3) frame comprising a forward-service virtual network identifier (VNI);
decapsulate the first VL3 frame to obtain a first unicast media access control (MAC) frame originating from a first source, wherein the first unicast MAC frame comprises a forward-service virtual layer-2 (VL2) broadcast domain tag associated with a forward-service VL2 broadcast domain;
make a first determination, using a first destination MAC address associated with a first destination, that the first destination MAC address is known on the forward-service VNI;
translate, based on the first determination, the first unicast MAC frame into an original VL2 broadcast domain, to obtain a second unicast MAC frame; and
bridge, through a near network interface (NNI), the second unicast MAC frame to a service device.

17. The non-transitory CRM of claim 16, wherein the first source is an intercept host or an intercept virtual machine.

18. The non-transitory CRM of claim 16, wherein the first VL3 frame is a virtual extensible local area network (VX-LAN) frame.

19. The non-transitory CRM of claim 16, further comprising computer readable program code, which when executed by the computer processor, enables the computer processor to:
receive, from the service device through a far network interface (FNI) and after the service device performs a service function, the second unicast MAC frame;
make a second determination, using the first destination MAC address, that the first destination MAC address is known on an original VNI;
make a third determination, based at least on redirect criteria and the second determination, that the first destination is an intercept host or an intercept virtual machine; and
drop, based on the third determination, the second unicast MAC frame.

20. The non-transitory CRM of claim 16, further comprising computer readable program code, which when executed by the computer processor, enables the computer processor to:
receive, from the first remote VTEP, a second VL3 frame comprising an original VNI;
decapsulate the second VL3 frame to obtain a third unicast MAC frame originating from a second source, wherein the third unicast MAC frame comprises an original VL2 broadcast domain tag associated with the original VL2 broadcast domain;
make a second determination, using a second destination MAC address associated with a second destination, that the second destination MAC address is known on the original VNI; and
bridge, based on the second determination, the third unicast MAC frame to the service device through a far network interface (FNI).

* * * * *